(12) United States Patent
Kim et al.

(10) Patent No.: US 12,312,105 B2
(45) Date of Patent: May 27, 2025

(54) BASE STATION FOR DRONE ALIGNMENT

(71) Applicant: Brookhurst Garage, Inc., San Jose, CA (US)

(72) Inventors: Young Joon Kim, San Jose, CA (US); Jessie Sanchez, San Jose, CA (US); Jinkeun Kim, Seongnam (KR)

(73) Assignee: Brookhurst Garage, Inc., San Jose, CA (US)

( * ) Notice: Subject to any disclaimer, the term of this patent is extended or adjusted under 35 U.S.C. 154(b) by 26 days.

(21) Appl. No.: 18/224,977

(22) Filed: Jul. 21, 2023

(65) Prior Publication Data

US 2025/0011005 A1 Jan. 9, 2025

Related U.S. Application Data

(60) Provisional application No. 63/525,563, filed on Jul. 7, 2023.

(51) Int. Cl.
| | | |
|---|---|---|
| *B64U 70/90* | (2023.01) | |
| *B64U 60/50* | (2023.01) | |
| *B64U 70/00* | (2023.01) | |
| *B64U 50/39* | (2023.01) | |

(52) U.S. Cl.
CPC ............ *B64U 70/90* (2023.01); *B64U 60/50* (2023.01); *B64U 70/00* (2023.01); *B64U 50/39* (2023.01)

(58) Field of Classification Search
CPC ...... G08G 5/00; G08G 5/0013; G08G 5/0069; G08G 5/0086; B60L 53/18; B60L 53/36; B06L 53/66; B06L 53/68; B64C 39/02; B64C 39/024; B64U 80/25; B64U 50/39;

(Continued)

(56) References Cited

U.S. PATENT DOCUMENTS

| | | |
|---|---|---|
| 3,548,194 A | 12/1970 | Astheimer |
| 9,139,310 B1 | 9/2015 | Wang |
| 10,850,838 B2 | 12/2020 | Castleman et al. |

(Continued)

FOREIGN PATENT DOCUMENTS

| | | |
|---|---|---|
| CN | 107065896 A | 8/2017 |
| CN | 111422081 A | 7/2020 |

(Continued)

OTHER PUBLICATIONS

PCT International Search Report and Written Opinion, PCT Application No. PCT/US2023/028385, May 20, 2024, 13 pages.

(Continued)

*Primary Examiner* — Van T Trieu
(74) *Attorney, Agent, or Firm* — Fenwick & West LLP

(57) ABSTRACT

A base station may include a parking plate on which the drone is to be landed. The base station may include a plurality of pushers slidable on the parking plate, the plurality of pushers configured to push the legs of the drone to move the drone towards a reference location on the parking plate. The base station may include a gripper carried by the parking plate, the gripper configured to removably secure the body of the drone in place relative to the reference location. The base station may include an alignment sensor carried by the parking plate and positioned at the reference location, the alignment sensor configured to detect whether a marker on the drone is in alignment with the reference location.

20 Claims, 50 Drawing Sheets

(58) Field of Classification Search
CPC ........ B64U 70/00; B64U 70/90; B64U 60/50; G05D 1/02
See application file for complete search history.

(56) References Cited

U.S. PATENT DOCUMENTS

| | | |
|---|---|---|
| 11,175,655 B1 | 11/2021 | Mestler |
| 11,687,086 B2 | 6/2023 | Kim et al. |
| 2009/0234815 A1 | 9/2009 | Boerries et al. |
| 2012/0323365 A1 | 12/2012 | Taylor et al. |
| 2014/0336928 A1 | 11/2014 | Scott |
| 2015/0032252 A1 | 1/2015 | Galluzzo et al. |
| 2016/0039300 A1 | 2/2016 | Wang et al. |
| 2016/0124434 A1 | 5/2016 | Gariepy et al. |
| 2017/0096075 A1 | 4/2017 | Henry et al. |
| 2017/0210470 A1* | 7/2017 | Pardell .................. H02S 40/10 |
| 2018/0150713 A1 | 5/2018 | Farooqi et al. |
| 2018/0150970 A1 | 5/2018 | Benini et al. |
| 2018/0253108 A1 | 9/2018 | Heinla et al. |
| 2018/0370046 A1 | 12/2018 | Hance et al. |
| 2019/0307106 A1 | 10/2019 | Hartung et al. |
| 2020/0039427 A1 | 2/2020 | Chen et al. |
| 2020/0125830 A1 | 4/2020 | Lei et al. |
| 2020/0231054 A1* | 7/2020 | Resnick ................ B60L 53/36 |
| 2021/0147076 A1 | 5/2021 | Stearns et al. |
| 2021/0284335 A1 | 9/2021 | McLaughlin et al. |
| 2021/0374659 A1 | 12/2021 | Ganapathi et al. |
| 2022/0299995 A1 | 9/2022 | Ganapathi et al. |
| 2023/0135344 A1* | 5/2023 | Kim .................... B64C 39/024 191/12 R |
| 2023/0140387 A1* | 5/2023 | Infanti .................. B64C 25/62 244/114 R |
| 2023/0142394 A1 | 5/2023 | Henry et al. |
| 2023/0257139 A1 | 8/2023 | Straus et al. |
| 2023/0348122 A1* | 11/2023 | Fehler .................. B64F 1/32 |
| 2023/0415997 A1 | 12/2023 | Fosnight |
| 2024/0076065 A1 | 3/2024 | Torgersen |

FOREIGN PATENT DOCUMENTS

| | | |
|---|---|---|
| CN | 112572215 A | 3/2021 |
| KR | 10-2019-0094303 A | 8/2019 |
| KR | 10-2077545 B1 | 2/2020 |
| KR | 10-2020-0027087 A | 3/2020 |
| KR | 10-20230001001 A | 1/2023 |
| KR | 10-2496528 B1 | 2/2023 |
| WO | WO 2019/040490 A1 | 2/2019 |
| WO | WO-2020/022264 A1 | 1/2020 |
| WO | WO 2022/014787 A1 | 1/2022 |
| WO | WO-2022/261691 A1 | 12/2022 |
| WO | WO-2024/025163 A1 | 2/2024 |

OTHER PUBLICATIONS

PCT International Search Report and Written Opinion, PCT Application No. PCT/US2021/039357, Oct. 14, 2021, 11 pages.

McNabb, M. "Automated Warehouse Drones: Inventory Audits with 99.7% Accuracy [Video]," dronelife.com, Jan. 3, 2023, two pages, Retrieved from the internet <URL:https://dronelife.com/2023/01/03/automated-warehouse-drones-inventory-audits-with-99-7-accuracy-video/>.

PCT Invitation to Pay Additional Fees, PCT Application No. PCT/US2023/028385, Mar. 13, 2024, 3 pages.

* cited by examiner

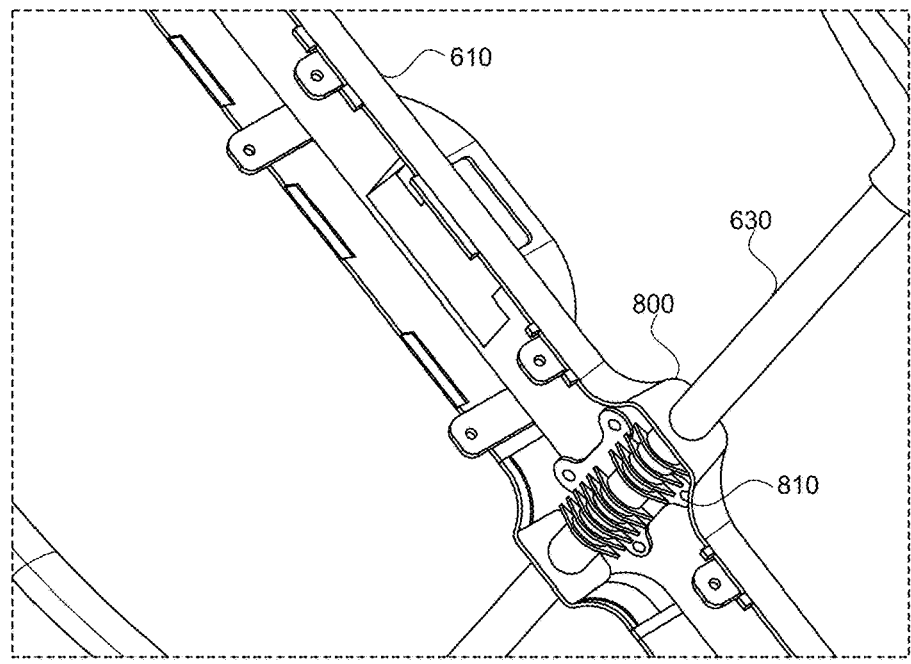
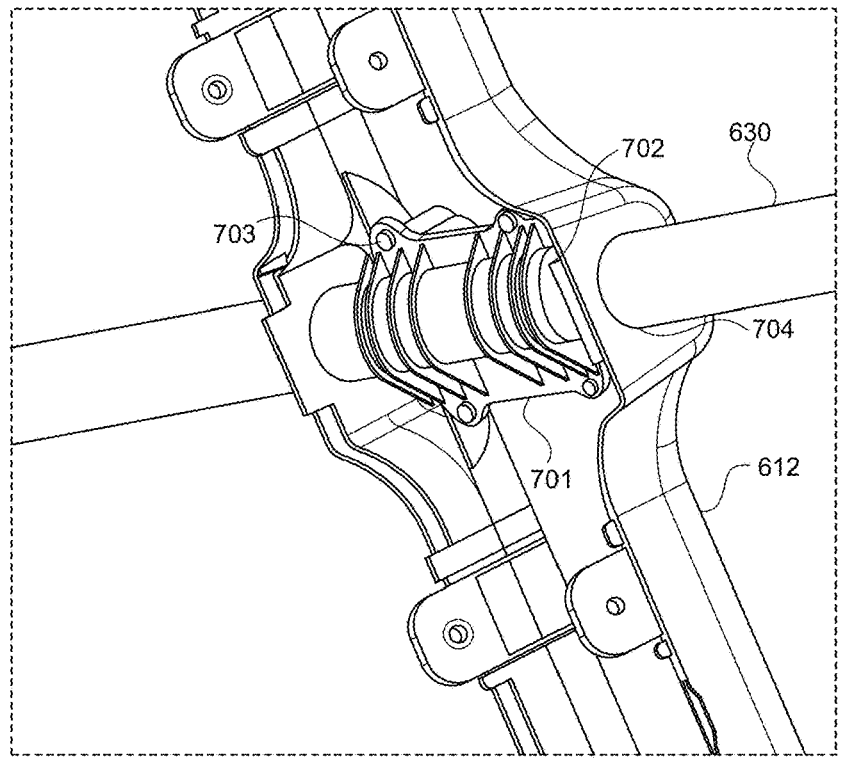
FIG. 7B

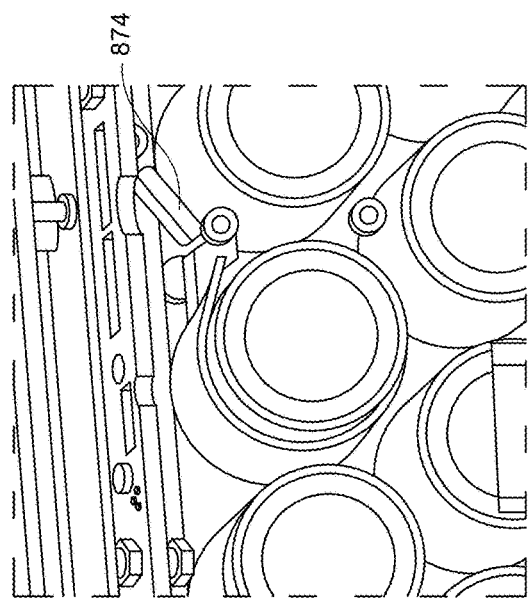
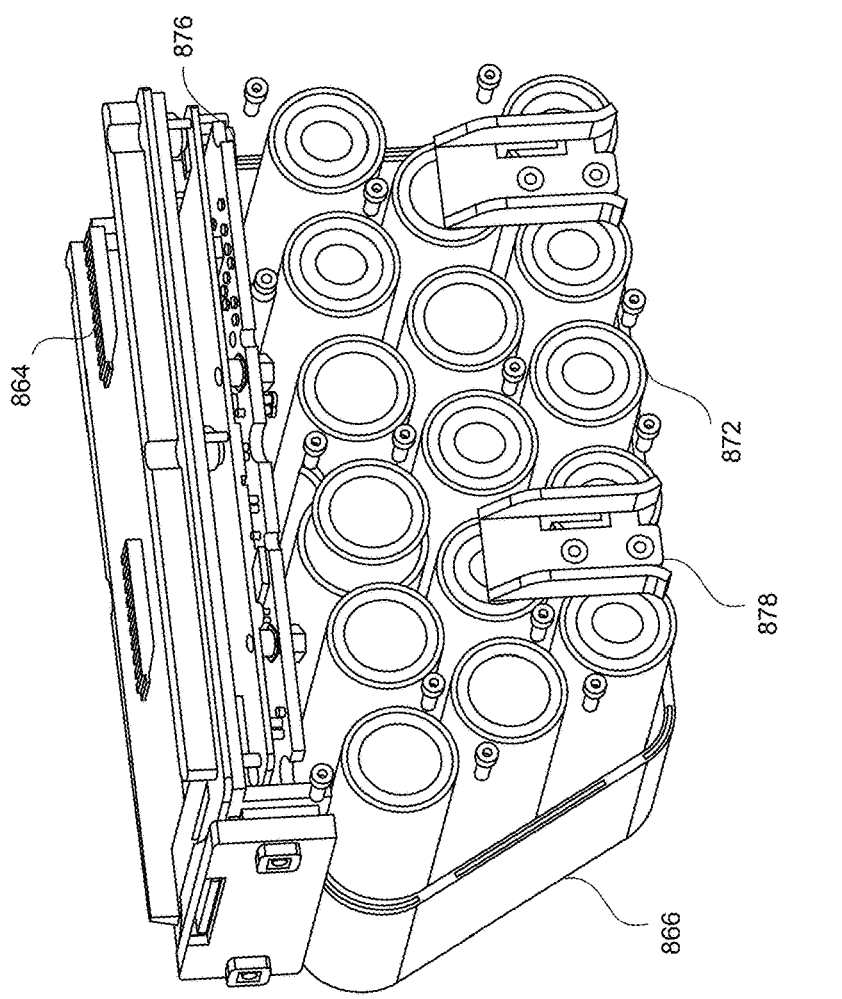
FIG. 8H

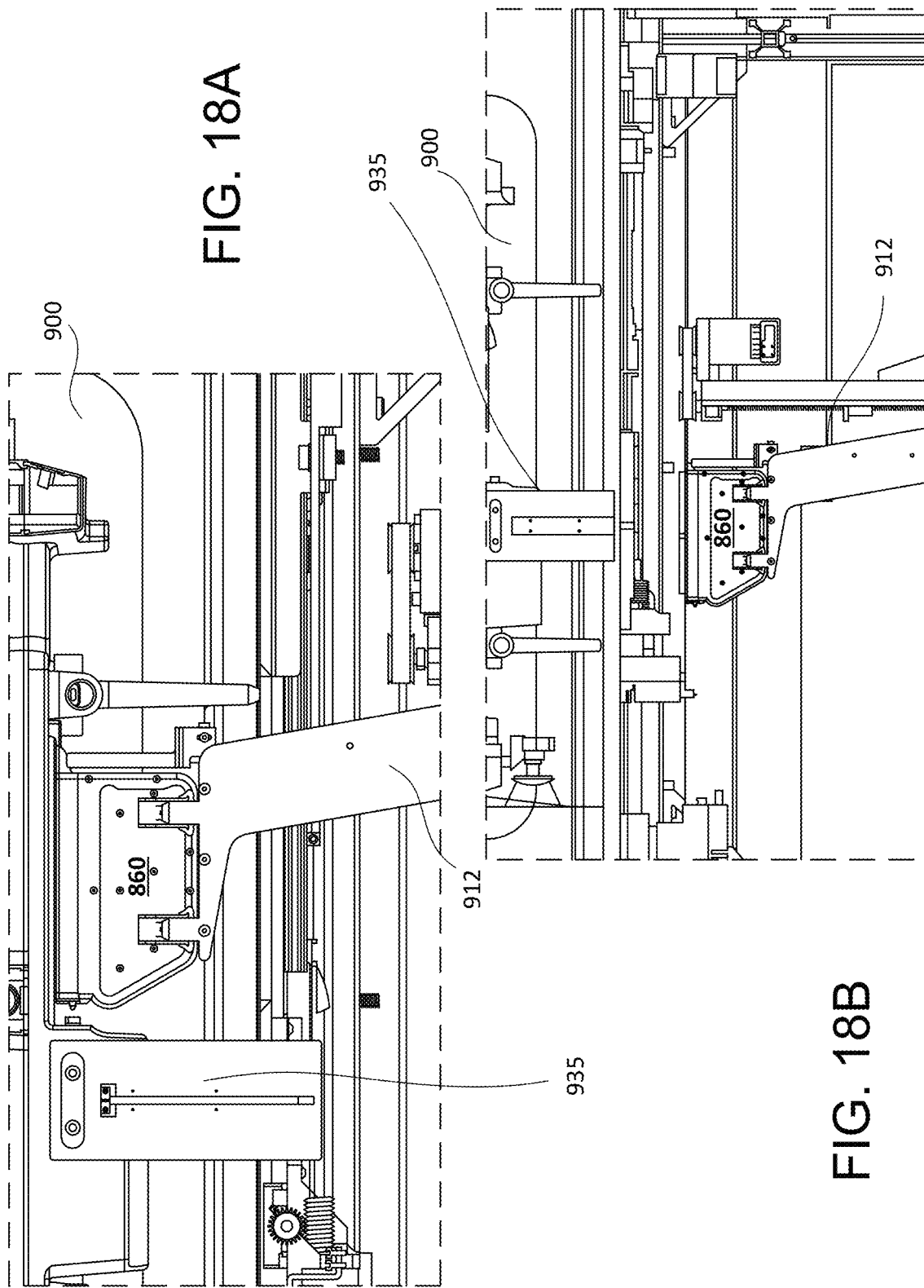

BASE STATION FOR DRONE ALIGNMENT

CROSS-REFERENCE TO RELATED APPLICATION

The present application claims the benefit of U.S. Provisional Patent Application No. 63/525,563 filed on Jul. 7, 2023, which is hereby incorporated by reference in its entirety.

TECHNICAL FIELD

The disclosure generally relates to drone and base station designs for receiving drones, more specifically, to a drone and a base station that may provide various battery services such as battery charging or swapping.

BACKGROUND

Inventory management in a storage site such as a warehouse can be a complex and labor-intensive process. Inventory items are usually placed at their designated locations with barcodes of the items readily scannable to quickly locate the items. However, in some cases, items can be misplaced and become difficult to be found. Also, misplaced items may occupy space that is reserved for incoming inventory, causing storage site personnel to spend time relocating items and tracking missing items. As such, the use of an autonomous system may be desired to automate some of the storage site management process. However, for an autonomous system to be implemented, power management may become an issue that will need to be resolved in an effective way.

SUMMARY

In some embodiments, this disclosure is related to a base station for receiving a drone including a body and a plurality of legs, the base station including: a parking plate on which the drone is to be landed; a plurality of pushers slidable on the parking plate, the plurality of pushers configured to push the legs of the drone to move the drone towards a reference location on the parking plate; a gripper carried by the parking plate, the gripper configured to removably secure the body of the drone in place relative to the reference location; and an alignment sensor carried by the parking plate and positioned at the reference location, the alignment sensor configured to detect whether a marker on the drone is in alignment with the reference location.

In some embodiments, this disclosure is related to a method for receiving a drone at a base station, the drone including a body and a plurality of legs, the method including: receiving the drone on a parking plate of the base station; pushing a plurality of pushers that are slidable on the parking plate from an expanded configuration to a contracted configuration to push the legs of the drone to move the drone towards a reference location on the parking plate; using an alignment sensor to detect whether a marker on the drone is in alignment with the reference location, the alignment sensor carried by the parking plate and positioned at the reference location; and securing, using a gripper carried on the parking plate, the body of the drone in place relative to the reference location.

In some embodiments, this disclosure is related to a base station for performing a battery pack swap for a drone, the base station including: a parking plate for receiving the drone; a gripper carried by the parking plate, the gripper configured to secure the drone in place at a parking position at the parking plate; a plurality of chargers, each charger including a battery latch and a power port, the battery latch configured to mechanically hold a battery pack in place with the charger and the power port configured to provide power to the battery pack being charged; and a battery pack carrier movable among the plurality of chargers and the parking position, the battery pack carrier configured to: remove a first battery pack from the drone and move the first battery pack to a first charger, and carry a second battery pack from a second charger to the drone and install the second battery pack to the drone.

In some embodiments, this disclosure is related to a system including: a drone carrying a first battery pack; a base station for performing a battery pack swap for the drone, the base station including: a parking plate for receiving the drone; a gripper carried by the parking plate, the gripper configured to secure the drone in place at a parking position at the parking plate; a plurality of chargers, each charger including a battery latch and a power port, the battery latch configured to mechanically hold a battery pack in place with the charger and the power port configured to provide power to the battery pack being charged; and a battery pack carrier movable among the plurality of chargers and the parking position, the battery pack carrier configured to: remove a first battery pack from the drone and move the first battery pack to a first charger, and carry a second battery pack from a second charger to the drone and install the second battery pack to the drone.

In some embodiments, this disclosure is related to a method for performing a battery pack swap for a drone that carries a first battery pack, the method including: holding, using a battery latch, a second battery pack in place with a charger carried by a base station; providing power to the second battery pack through a power port of the charger; receiving the drone on a parking plate of the base station; securing, using a gripper carried by the parking plate, the drone in place at a parking position at the parking plate; removing, using a battery pack carrier, the first battery pack from the drone, wherein the battery pack carrier is movable between the charger and the parking position; carrying, using the battery pack carrier, from the charger to the drone; and installing the second battery pack to the drone.

In some embodiments, this disclosure is related to a base station for performing a battery pack swap for a drone, the base station including: a frame configured to provide mechanical support to the base station; a parking plate carried by the frame, the parking plate including a landing surface configured to be in contact with the drone when the drone is landed and a component-carrying surface opposing the landing surface; a plurality of chargers carried on the component-carrying surface of the parking plate; a battery pack carrier carried on the component-carrying surface of the parking plate, the battery pack carrier movable to carry a battery pack connected to one of the chargers to the drone; and a shutter on the parking plate, the shutter openable to provide access of the battery pack carrier from the component-carrying surface to the landing surface.

In some embodiments, this disclosure is related to the system including: a drone carrying a battery pack; and a base station for performing a battery pack swap for the drone, the base station including: a frame configured to provide mechanical support to the base station; a parking plate carried by the frame, the parking plate including a landing surface configured to be in contact with the drone when the drone is landed and a component-carrying surface opposing the landing surface; a plurality of chargers carried on the component-carrying surface of the parking plate; a battery pack carrier carried on the component-carrying surface of the parking plate, the battery pack carrier movable to carry a battery pack connected to one of the chargers to the drone; and a shutter on the parking plate, the shutter openable to provide access of the battery pack carrier from the component-carrying surface to the landing surface.

In some embodiments, this disclosure is related to a base station for receiving a drone, the base station including: a cabinet including a parking plate and one or more walls forming an enclosure for one or more internal components of the base station, the parking plate configured to receive the drone; a plurality of chargers carried within the enclosure, each charger configured to provide power to a battery pack being charged at the charger; a temperature sensor carried within the enclosure, the temperature sensor configured to measure a temperature within the enclosure; and a temperature regulator configured to regulate the temperature within the enclosure to maintain the temperature of a plurality of battery packs charged at the plurality of chargers within a temperature range.

In some embodiments, this disclosure is related to a method for regulating temperature of drone battery packs, the method including: enclosing a plurality of chargers carried within an enclosure formed from a parking plate and one or more walls of a base station that is configured to receive a drone; providing power to a battery pack that is being charged one of the charger; measuring a temperature within the enclosure of the base station using a temperature sensor carried within the enclosure; and regulating, using a temperature regulator, the temperature with the enclosure to maintain the temperature of a plurality of battery packs charged at the plurality of chargers within a temperature range.

In some embodiments, this disclosure is related to an aerial drone, including: a drone body having a longitudinal housing carrying a processing circuit and a battery, the longitudinal housing extending in a first direction; a sensor rod carried by the drone body and extending from the drone body in a second direction different from the first direction, the sensor rod carrying a sensor at a distal end of the sensor rod; and a propeller guard connected to the distal end of the sensor rod and supported at least partially by the sensor rod, the propeller guard forming part of a periphery of the aerial drone.

In some embodiments, this disclosure is related to a system including: a base station for performing battery swap operation; and an aerial drone, including: a drone body having a longitudinal housing carrying a processing circuit and a battery, the longitudinal housing extending in a first direction; a sensor rod carried by the drone body and extending from the drone body in a second direction different from the first direction, the sensor rod carrying a sensor at a distal end of the sensor rod; and a propeller guard connected to the distal end of the sensor rod and supported at least partially by the sensor rod, the propeller guard forming part of a periphery of the aerial drone.

In some embodiments, this disclosure is related to an aerial drone, including: a drone body for carrying a battery pack; a slide guide carried by the drone body, wherein the slide guide suspends from a surface of the drone body and creates a channel between the slide guide and the surface, and wherein the battery pack is slidable along the channel; a slide-guide contact sensor carried on the surface of the drone body, the slide-guide contact sensor configured to detect whether the battery pack is in contact with the surface; a connection port carried by the drone body; and a port contact sensor carried by the drone body, the port contact sensor is configured to detect whether the battery pack is slid in to the connection port.

In some embodiments, this disclosure is related to a system including: a base station including a battery pack carrier; and an aerial drone, the aerial drone including: a drone body for carrying a battery pack; a slide guide carried by the drone body, wherein the slide guide suspends from a surface of the drone body and creates a channel between the slide guide and the surface, and wherein the battery pack is slidable along the channel; a slide-guide contact sensor carried on the surface of the drone body, the slide-guide contact sensor configured to detect whether the battery pack is in contact with the surface; a connection port carried by the drone body; and a port contact sensor carried by the drone body, the port contact sensor is configured to detect whether the battery pack is slid in to the connection port.

In some embodiments, this disclosure is related to a method for installing a battery pack including a plurality of tabs to an aerial drone, the method including: aligning the tabs of the battery pack to slots of a slide guide carried by a drone body of the aerial drone, wherein the slide guide suspends from a surface of the drone body and creates a channel between the slide guide and the surface; pushing the battery pack towards the drone body of the aerial drone; detecting, by a slide-guide contact sensor of the aerial drone, that the battery pack is in contact with the slide-guide contact sensor; and sliding the battery pack towards a connection port through the channel.

BRIEF DESCRIPTION OF THE DRAWINGS

FIG. 7B is an internal view of the upper housing illustrating how the sensor rod is mounted to the upper housing, in accordance with some embodiments.

FIGS. 7I and 7J are exploded views of various components of the propeller assembly, in accordance with some embodiments.

FIG. 8H is an internal view of the battery pack, in accordance with some embodiments.

FIGS. 18A and 18B are conceptual side views showing how a battery pack is removed from a drone, in accordance with some embodiments.

The figures depict, and the detailed description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a robot that navigates through a storage site carrying a swappable battery pack and a base station that may reserve battery packs for the robot. A base station may include a parking plate on which the drone is to be landed. The base station may include pushers slidable on the parking plate. The pushers may be configured to push the legs of the drone to move the drone towards a reference location on the parking plate. The base station may include a gripper carried by the parking plate. The gripper may removably secure the body of the drone in place relative to the reference location. The base station may include an alignment sensor that detects whether a marker on the drone is in alignment with the reference location. A base station may also include a battery swapping system to replace the battery of the drone after drone is secured.

System Overview

Figure 1:
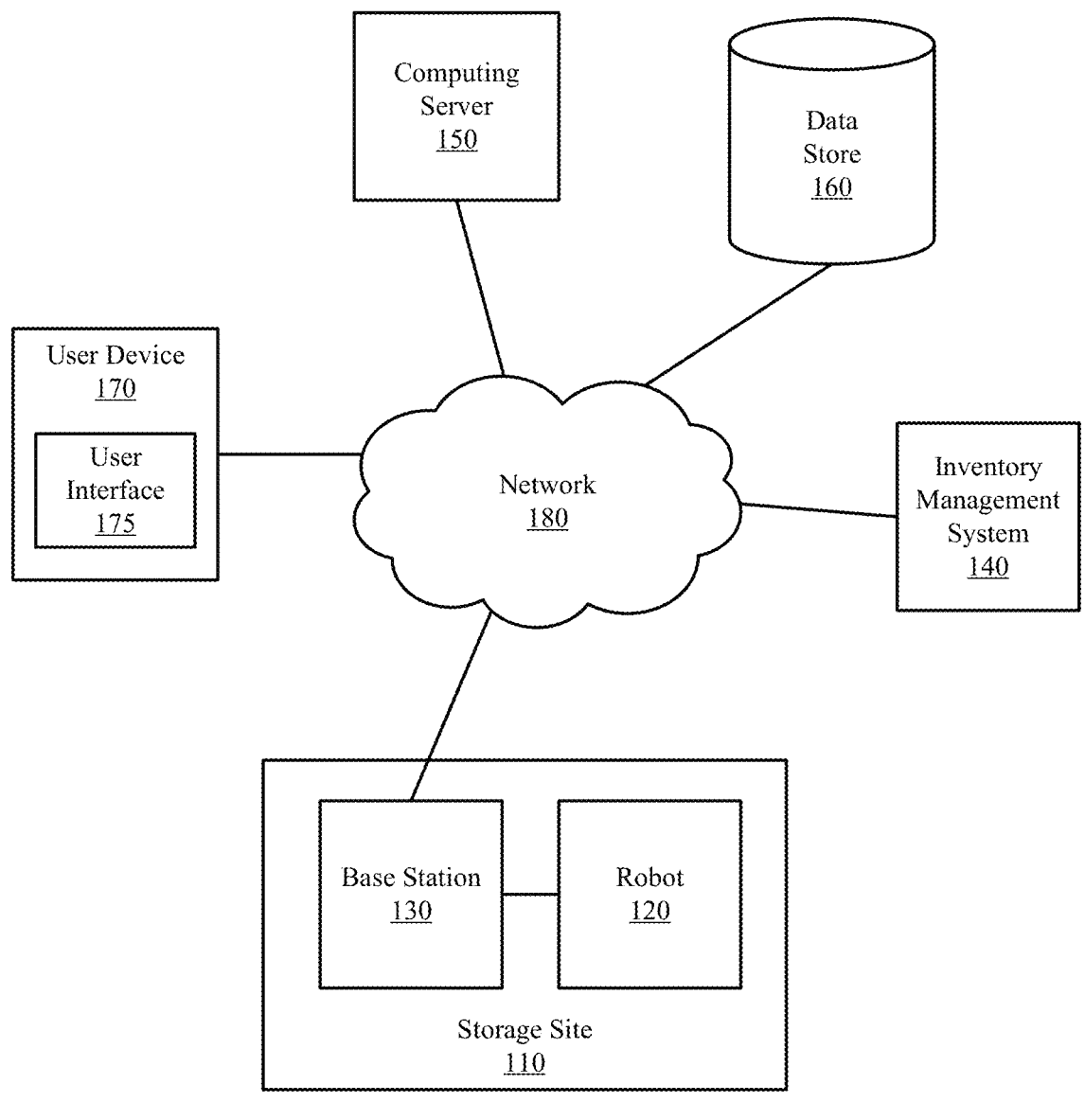
FIG. 1 is a block diagram that illustrates a system environment of an example storage site, in accordance with some embodiments.

FIG. (FIG. 1 is a block diagram that illustrates a system environment 100 of an example robotically-assisted or fully autonomous storage site, in accordance with some embodiments. By way of example, the system environment 100 includes a storage site 110, a robot 120, a base station 130, an inventory management system 140, a computing server 150, a data store 160, and a user device 170. The entities and components in the system environment 100 communicate with each other through the network 180. In various embodiments, the system environment 100 may include different, fewer, or additional components. Also, while each of the components in the system environment 100 is described in a singular form, the system environment 100 may include one or more of each of the components. For example, the storage site 110 may include one or more robots 120 and one or more base stations 130. Each robot 120 may have a corresponding base station 130 or multiple robots 120 may share a base station 130.

A storage site 110 may be any suitable facility that stores, sells, or displays inventories such as goods, merchandise, groceries, articles and collections. Example storage sites 110 may include warehouses, inventory sites, bookstores, shoe stores, outlets, other retail stores, libraries, museums, etc. A storage site 110 may include a number of regularly shaped structures. Regularly shaped structures may be structures, fixtures, equipment, furniture, frames, shells, racks, or other suitable things in the storage site 110 that have a regular shape or outline that can be readily identifiable, whether the things are permanent or temporary, fixed or movable, weight-bearing or not. The regularly shaped structures are often used in a storage site 110 for storage of inventory. For example, racks (including metallic racks, shells, frames, or other similar structures) are often used in a warehouse for the storage of goods and merchandise. However, not all regularly shaped structures may need to be used for inventory storage. A storage site 110 may include a certain layout that allows various items to be placed and stored systematically. For example, in a warehouse, the racks may be grouped by sections and separated by aisles. Each rack may include multiple pallet locations that can be identified using a row number and a column number. A storage site may include high racks and low racks, which may, in some case, largely carry most of the inventory items near the ground level.

A storage site 110 may include one or more robots 120 that are used to keep track of the inventory and to manage the inventory in the storage site 110. For the ease of reference, the robot 120 may be referred to in a singular form, even though more than one robot 120 may be used. Also, in some embodiments, there can be more than one type of robot 120 in a storage site 110. For example, some robots 120 may specialize in scanning inventory in the storage site 110, while other robots 120 may specialize in moving items. A robot 120 may also be referred to as an autonomous robot, an inventory cycle-counting robot, an inventory survey robot, an inventory detection robot, or an inventory management robot. An inventory robot may be used to track inventory items, move inventory items, and carry out other inventory management tasks. The degree of autonomy may vary from embodiments to embodiments. For example, in some embodiments, the robot 120 may be fully autonomous so that the robot 120 automatically performs assigned tasks. In another embodiment, the robot 120 may be semi-autonomous such that it can navigate through the storage site 110 with minimal human commands or controls. In some embodiments, no matter what the degree of autonomy it has, a robot 120 may also be controlled remotely and may be switched to a manual mode. The robot 120 may take various forms such as an aerial drone, a ground robot, a vehicle, a forklift, and a mobile picking robot.

A base station 130 may be a device for the robot 120 to return and, for an aerial robot, to land. The base station 130 may include more than one return site. The base station 130 may be used to repower the robot 120. Various ways to repower the robot 120 may be used in different embodiments. For example, in some embodiments, the base station 130 serves as a battery-swapping station that exchanges batteries on a robot 120 as the robot arrives at the base station to allow the robot 120 to quickly resume duty. The replaced batteries may be charged at the base station 130, wired or wirelessly. In another embodiment, the base station 130 serves as a charging station that has one or more charging terminals to be coupled to the charging terminal of the robot 120 to recharge the batteries of the robot 120. In yet another embodiment, the robot 120 may use fuel for power and the base station 130 may repower the robot 120 by filling its fuel tank.

The base station 130 may also serve as a communication station for the robot 120. For example, for certain types of storage sites 110 such as warehouses, network coverage may not be present or may only be present at certain locations. The base station 130 may communicate with other components in the system environment 100 using wireless or wired communication channels such as Wi-Fi or an Ethernet cable. The robot 120 may communicate with the base station 130 when the robot 120 returns to the base station 130. The base station 130 may send inputs such as commands to the robot 120 and download data captured by the robot 120. In embodiments where multiple robots 120 are used, the base station 130 may be equipped with a swarm control unit or algorithm to coordinate the movements among the robots. The base station 130 and the robot 120 may communicate in any suitable ways such as radio frequency (e.g., Wi-Fi), Bluetooth, near-field communication (NFC), or wired communication. While, in some embodiments, the robot 120 mainly communicates to the base station, in other embodiments the robot 120 may also have the capability to directly communicate with other components in the system environment 100. In some embodiments, the base station 130 may serve as a wireless signal amplifier for the robot 120 to directly communicate with the network 180.

The inventory management system 140 may be a computing system that is operated by the administrator (e.g., a company that owns the inventory, a warehouse management administrator, a retailer selling the inventory) using the storage site 110. The inventory management system 140 may be a system used to manage the inventory items. The inventory management system 140 may include a database that stores data regarding inventory items and the items' associated information, such as quantities in the storage site 110, metadata tags, asset type tags, barcode labels and location coordinates of the items. The inventory management system 140 may provide both front-end and back-end software for the administrator to access a central database and point of reference for the inventory and to analyze data, generate reports, forecast future demands, and manage the locations of the inventory items to ensure items are correctly placed. An administrator may rely on the item coordinate data in the inventory management system 140 to ensure that items are correctly placed in the storage site 110 so that the items can be readily retrieved from a storage location. This prevents an incorrectly placed item from occupying a space that is reserved for an incoming item and also reduces time to locate a missing item at an outbound process.

The computing server 150 may be a server that is tasked with analyzing data provided by the robot 120 and provide commands for the robot 120 to perform various inventory recognition and management tasks. The robot 120 may be controlled by the computing server 150, the user device 170, or the inventory management system 140. For example, the computing server 150 may direct the robot 120 to scan and capture pictures of inventory stored at various locations at the storage site 110. Based on the data provided by the inventory management system 140 and the ground truth data captured by the robot 120, the computing server 150 may identify discrepancies in two sets of data and determine whether any items may be misplaced, lost, damaged, or otherwise should be flagged for various reasons. In turn, the computing server 150 may direct a robot 120 to remedy any potential issues such as moving a misplaced item to the correct position. In some embodiments, the computing server 150 may also generate a report of flagged items to allow site personnel to manually correct the issues.

The computing server 150 may include one or more computing devices that operate at different locations. For example, a part of the computing server 150 may be a local server that is located at the storage site 110. The computing hardware such as the processor may be associated with a computer on site or may be included in the base station 130. Another part of the computing server 150 may be a cloud server that is geographically distributed. The computing server 150 may serve as a ground control station (GCS), provide data processing, and maintain end-user software that may be used in a user device 170. A GCS may be responsible for the control, monitor and maintenance of the robot 120. In some embodiments, GCS is located on-site as part of the base station 130. The data processing pipeline and end-user software server may be located remotely or on-site.

The computing server 150 may maintain software applications for users to manage the inventory, the base station 130, and the robot 120. The computing server 150 and the inventory management system 140 may or may not be operated by the same entity. In some embodiments, the computing server 150 may be operated by an entity separated from the administrator of the storage site. For example, the computing server 150 may be operated by a robotic service provider that supplies the robot 120 and related systems to modernize and automate a storage site 110. The software application provided by the computing server 150 may take several forms. In some embodiments, the software application may be integrated with or as an add-on to the inventory management system 140. In another embodiment, the software application may be a separate application that supplements or replaces the inventory management system 140. In some embodiments, the software application may be provided as software as a service (SaaS) to the administrator of the storage site 110 by the robotic service provider that supplies the robot 120.

The data store 160 includes one or more storage units such as memory that takes the form of non-transitory and non-volatile computer storage medium to store various data that may be uploaded by the robot 120 and inventory management system 140. For example, the data stored in data store 160 may include pictures, sensor data, and other data captured by the robot 120. The data may also include inventory data that is maintained by the inventory management system 140. The computer-readable storage medium is a medium that does not include a transitory medium such as a propagating signal or a carrier wave. The data store 160 may take various forms. In some embodiments, the data store 160 communicates with other components by the network 180. This type of data store 160 may be referred to as a cloud storage server. Example cloud storage service providers may include AWS, AZURE STORAGE, GOOGLE CLOUD STORAGE, etc. In another embodiment, instead of a cloud storage server, the data store 160 is a storage device that is controlled and connected to the computing server 150. For example, the data store 160 may take the form of memory (e.g., hard drives, flash memories, discs, ROMs, etc.) used by the computing server 150 such as storage devices in a storage server room that is operated by the computing server 150.

The user device 170 may be used by an administrator of the storage site 110 to provide commands to the robot 120 and to manage the inventory in the storage site 110. For example, using the user device 170, the administrator can provide task commands to the robot 120 for the robot to automatically complete the tasks. In one case, the administrator can specify a specific target location or a range of storage locations for the robot 120 to scan. The administrator may also specify a specific item for the robot 120 to locate or to confirm placement. Examples of user devices 170 include personal computers (PCs), desktop computers, laptop computers, tablet computers, smartphones, wearable electronic devices such as smartwatches, or any other suitable electronic devices.

The user device 170 may include a user interface 175, which may take the form of a graphical user interface (GUI). Software application provided by the computing server 150 or the inventory management system 140 may be displayed as the user interface 175. The user interface 175 may take different forms. In some embodiments, the user interface 175 is part of a front-end software application that includes a GUI displayed at the user device 170. In one case, the front-end software application is a software application that can be downloaded and installed at user devices 170 via, for example, an application store (e.g., App Store) of the user device 170. In another case, the user interface 175 takes the form of a Web interface of the computing server 150 or the inventory management system 140 that allows clients to perform actions through web browsers. In another embodiment, user interface 175 does not include graphical elements but communicates with the computing server 150 or the inventory management system 140 via other suitable ways such as command windows or application program interfaces (APIs).

The communications among the robot 120, the base station 130, the inventory management system 140, the computing server 150, the data store 160, and the user device 170 may be transmitted via a network 180, for example, via the Internet. In some embodiments, the network 180 uses standard communication technologies and/or protocols. Thus, the network 180 can include links using technologies such as Ethernet, 902.11, worldwide interoperability for microwave access (WiMAX), 3G, 4G, LTE, 5G, digital subscriber line (DSL), asynchronous transfer mode (ATM), InfiniBand, PCI Express, etc. Similarly, the networking protocols used on the network 180 can include multiprotocol label switching (MPLS), the transmission control protocol/

Internet protocol (TCP/IP), the user datagram protocol (UDP), the hypertext transport protocol (HTTP), the simple mail transfer protocol (SMTP), the file transfer protocol (FTP), etc. The data exchanged over the network 180 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet protocol security (IPsec), etc. The network 180 also includes links and packet switching networks such as the Internet. In some embodiments, two computing servers, such as computing server 150 and inventory management system 140, may communicate through APIs. For example, the computing server 150 may retrieve inventory data from the inventory management system 140 via an API.

Example Robot and Base Station

Figure 2:
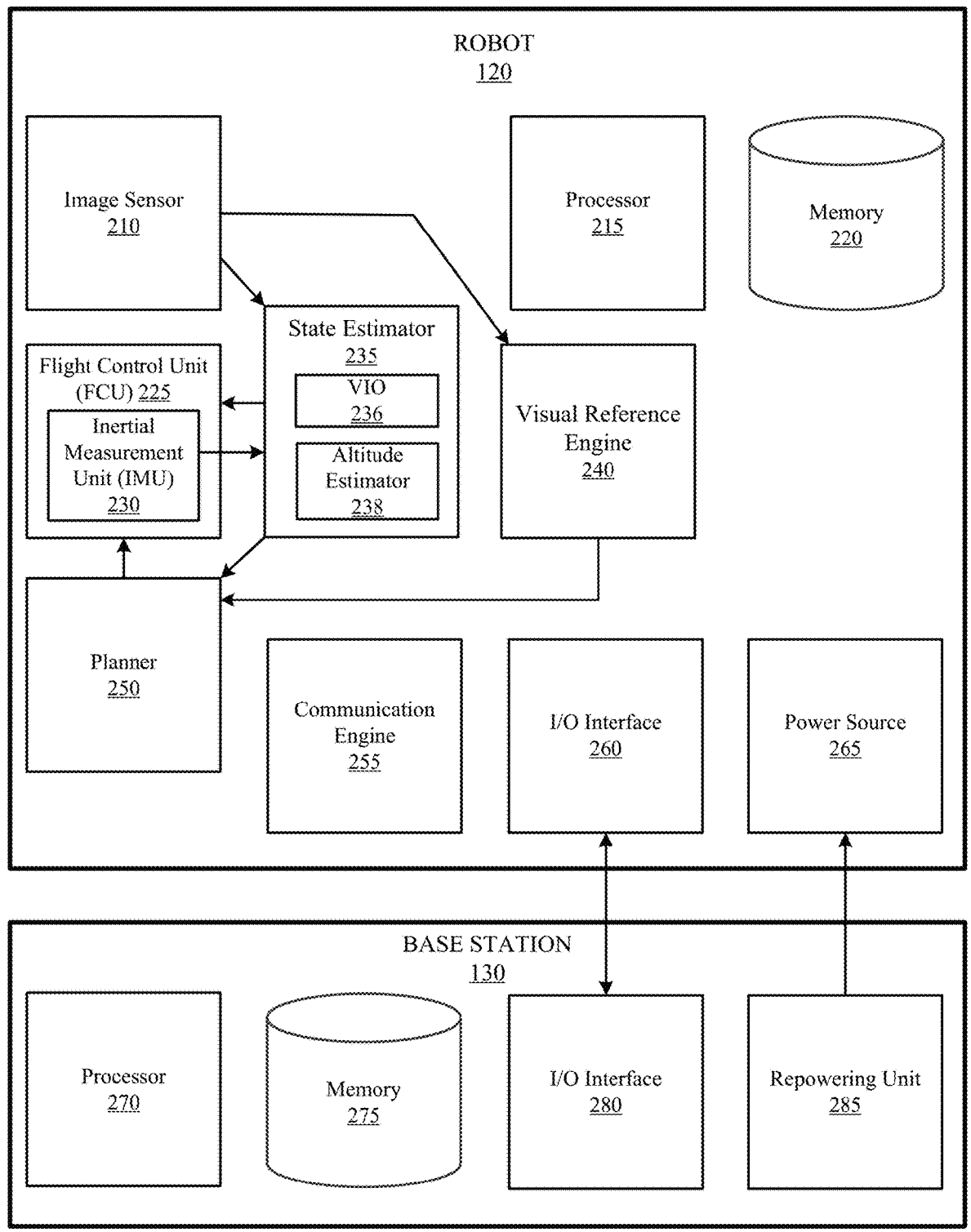
FIG. 2 is a block diagram that illustrates components of an example robot and an example base station, in accordance with some embodiments.

FIG. 2 is a block diagram illustrating components of an example robot 120 and an example base station 130, in accordance with some embodiments. The robot 120 may include an image sensor 210, a processor 215, memory 220, a flight control unit (FCU) 225 that includes an inertia measurement unit (IMU) 230, a state estimator 235, a visual reference engine 240, a planner 250, a communication engine 255, an I/O interface 260, and a power source 265. The functions of the robot 120 may be distributed among various components in a different manner than described below. In various embodiments, the robot 120 may include different, fewer, and/or additional components. Also, while each of the components in FIG. 2 is described in a singular form, the components may present in plurality. For example, a robot 120 may include more than one image sensor 210 and more than one processor 215.

The image sensor 210 captures images of an environment of a storage site for navigation, localization, collision avoidance, object recognition and identification, and inventory recognition purposes. A robot 120 may include more than one image sensors 210 and more than one type of such image sensors 210. For example, the robot 120 may include a digital camera that captures optical images of the environment for the state estimator 235. For example, data captured by the image sensor 210 may also be provided to the VIO unit 236 that may be included in the state estimator 235 for localization purposes such as to determine the position and orientation of the robot 120 with respect to an inertial frame, such as a global frame whose location is known and fixed. The robot 120 may also include a stereo camera that includes two or more lenses to allow the image sensor 210 to capture three-dimensional images through stereoscopic photography. For each image frame, the stereo camera may generate pixel values such as in red, green, and blue (RGB) and point cloud data that includes depth information. The images captured by the stereo camera may be provided to visual reference engine 240 for object recognition purposes. The image sensor 210 may also be another type of image sensor such as a light detection and ranging (LIDAR) sensor, an infrared camera, and 360-degree depth cameras. The image sensor 210 may also capture pictures of labels (e.g., barcodes) on items for inventory cycle-counting purposes. In some embodiments, a single stereo camera may be used for various purposes. For example, the stereo camera may provide image data to the visual reference engine 240 for object recognition. The stereo camera may also be used to capture pictures of labels (e.g., barcodes). In some embodiments, the robot 120 includes a rotational mount such as a gimbal that allows the image sensor 210 to rotate in different angles and to stabilize images captured by the image sensor 210. In some embodiments, the image sensor 210 may also capture data along the path for the purpose of mapping the storage site.

The robot 120 includes one or more processors 215 and one or more memories 220 that store one or more sets of instructions. The one or more sets of instructions, when executed by one or more processors, cause the one or more processors to carry out processes that are implemented as one or more software engines. Various components, such as FCU 225 and state estimator 235, of the robot 120 may be implemented as a combination of software and hardware (e.g., sensors). The robot 120 may use a single general processor to execute various software engines or may use separate more specialized processors for different functionalities. In some embodiments, the robot 120 may use a general-purpose computer (e.g., a CPU) that can execute various instruction sets for various components (e.g., FCU 225, visual reference engine 240, state estimator 235, planner 250). The general-purpose computer may run on a suitable operating system such as LINUX, ANDROID, etc. For example, in some embodiments, the robot 120 may carry a smartphone that includes an application used to control the robot. In another embodiment, the robot 120 includes multiple processors that are specialized in different functionalities. For example, some of the functional components such as FCU 225, visual reference engine 240, state estimator 235, and planner 250 may be modularized and each includes its own processor, memory, and a set of instructions. The robot 120 may include a central processor unit (CPU) to coordinate and communicate with each modularized component. Hence, depending on embodiments, a robot 120 may include a single processor or multiple processors 215 to carry out various operations. The memory 220 may also store images and videos captured by the image sensor 210. The images may include images that capture the surrounding environment and images of the inventory such as barcodes and labels.

The flight control unit (FCU) 225 may be a combination of software and hardware, such as inertial measurement unit (IMU) 230 and other sensors, to control the movement of the robot 120. For ground robot 120, the flight control unit 225 may also be referred to as a microcontroller unit (MCU). The FCU 225 relies on information provided by other components to control the movement of the robot 120. For example, the planner 250 determines the path of the robot 120 from a starting point to a destination and provides commands to the FCU 225. Based on the commands, the FCU 225 generates electrical signals to various mechanical parts (e.g., actuators, motors, engines, wheels) of the robot 120 to adjust the movement of the robot 120. The precise mechanical parts of the robots 120 may depend on the embodiments and the types of robots 120.

The IMU 230 may be part of the FCU 225 or may be an independent component. The IMU 230 may include one or more accelerometers, gyroscopes, and other suitable sensors to generate measurements of forces, linear accelerations, and rotations of the robot 120. For example, the accelerometers measure the force exerted on the robot 120 and detect the linear acceleration. Multiple accelerometers cooperate to detect the acceleration of the robot 120 in the three-dimensional space. For instance, a first accelerometer detects the acceleration in the x-direction, a second accelerometer detects the acceleration in the y-direction, and a third accelerometer detects the acceleration in the z-direction. The gyroscopes detect the rotations and angular acceleration of the robot 120. Based on the measurements, a processor 215 may obtain the estimated localization of the robot 120 by integrating the translation and rotation data of the IMU 230 with respect to time.

The state estimator 235 may correspond to a set of software instructions stored in the memory 220 that can be executed by the processor 215. The state estimator 235 may be used to generate localization information of the robot 120 and may include various sub-components for estimating the state of the robot 120. For example, in some embodiments, the state estimator 235 may include a visual-inertial odometry (VIO) unit 236 and an attitude estimator 238. In other embodiments, other modules, sensors, and algorithms may also be used in the state estimator 238 to determine the location of the robot 120.

The VIO unit 236 receives image data from the image sensor 210 (e.g., a stereo camera) and measurements from IMU 230 to generate localization information such as the position and orientation of the robot 120. The localization data obtained from the double integration of the acceleration measurements from the IMU 230 is often prone to drift errors. The VIO unit 236 may extract image feature points and tracks the feature points in the image sequence to generate optical flow vectors that represent the movement of edges, boundaries, surfaces of objects in the environment captured by the image sensor 210. Various signal processing techniques such as filtering (e.g., Wiener filter, Kalman filter, bandpass filter, particle filter) and optimization, and data/image transformation may be used to reduce various errors in determining localization information.

The altitude estimator 238 may be a combination of software and hardware that are used to determine the absolute altitude and relative altitude (e.g., distance from an object that lies on the floor) of the robot 120. The altitude estimator 238 may include a downward range finder that may measure the altitude relative to the ground to an object underneath the robot 120. A range finder may include IR (or any suitable signals) emitters and sensors that detect the round trip time of the IR reflected by an object. The altitude estimator 238 may also receive data from the VIO unit 236 that may estimate the absolute altitude of the robot 120, but usually in a less accurate fashion compared to a range finder. The altitude estimator 238 may include software algorithms to combine data generated by the range finder and the data generated by the VIO unit 236 as the robot 120 flies over various objects and inventory that are placed on the floor or other horizontal levels. The data generated by the altitude estimator 238 may be used for collision avoidance and finding a target location. The altitude estimator 238 may set a global maximum altitude to prevent the robot 120 from hitting the ceiling. The altitude estimator 238 also provides information regarding how many rows in the rack are below the robot 120 for the robot 120 to locate a target location. The altitude data may be used in conjunction with the count of rows that the robot 120 has passed to determine the vertical level of the robot 120.

The visual reference engine 240 may correspond to a set of software instructions stored in the memory 220 that can be executed by the processor 215. The visual reference engine 240 may include various image processing algorithm and location algorithm to determine the current location of the robot 120, to identify the objects, edges, and surfaces of the environment near the robot 120, and to determine an estimated distance and orientation (e.g., yaw) of the robot 120 relative to a nearby surface of an object. The visual reference engine 240 may receive pixel data of a series of images and point cloud data from the image sensor 210. The location information generated by the visual reference engine 240 may include distance and yaw from an object and center offset from a target point (e.g., a midpoint of a target object).

The visual reference engine 240 may include one or more algorithms and machine learning models to create image segmentations from the images captured by the image sensor 210. The image segmentation may include one or more segments that separate the frames (e.g., vertical or horizontal bars of racks) or outlines of regularly shaped structures appearing in the captured images from other objects and environments. The algorithms used for image segmentation may include a convolutional neural network (CNN). In performing the segmentation, other image segmentation algorithms such as edge detection algorithms (e.g., Canny operator, Laplacian operator, Sobel operator, Prewitt operator), corner detection algorithms, Hough transform, and other suitable feature detection algorithms may also be used.

The visual reference engine 240 also performs object recognition (e.g., object detection and further analyses) and keeps track of the relative movements of the objects across a series of images. The visual reference engine 240 may track the number of regularly shaped structures in the storage site 110 that are passed by the robot 120. For example, the visual reference engine 240 may identify a reference point (e.g., centroid) of a frame of a rack and determine if the reference point passes a certain location of the images across a series of images (e.g., whether the reference point passes the center of the images). If so, the visual reference engine 240 increments the number of regularly shaped structures that have been passed by the robot 120.

The robot 120 may use various components to generate various types of location information (including location information relative to nearby objects and localization information). For example, in some embodiments, the state estimator 235 may process the data from the VIO unit 236 and the altitude estimator 238 to provide localization information to the planner 250. The visual reference engine 240 may count the number of regularly shaped structures that the robot 120 has passed to determine a current location. The visual reference engine 240 may generate location information relative to nearby objects. For example, when the robot 120 reaches a target location of a rack, the visual reference engine 240 may use point cloud data to reconstruct a surface of the rack and use the depth data from the point cloud to determine more accurate yaw and distance between the robot 120 and the rack. The visual reference engine 240 may determine a center offset, which may correspond to the distance between the robot 120 and the center of a target location (e.g., the midpoint of a target location of a rack). Using the center offset information, the planner 250 controls the robot 120 to move to the target location and take a picture of the inventory in the target location. When the robot 120 changes direction (e.g., rotations, transitions from horizontal movement to vertical movement, transitions from vertical movement to horizontal movement, etc.), the center offset information may be used to determine the accurate location of the robot 120 relative to an object.

The planner 250 may correspond to a set of software instructions stored in the memory 220 that can be executed by the processor 215. The planner 250 may include various routing algorithms to plan a path of the robot 120 as the robot travels from a first location (e.g., a starting location, the current location of the robot 120 after finishing the previous journey) to a second location (e.g., a target destination). The robot 120 may receive inputs such as user commands to perform certain actions (e.g., scanning of inventory, moving an item, etc.) at certain locations. The planner 250 may include two types of routes, which corresponds to a spot check and a range scan. In a spot check, the planner 250 may receive an input that includes coordinates of one or more specific target locations. In response, the planner 250 plans a path for the robot 120 to travel to the target locations to perform an action. In a range scan, the input may include a range of coordinates corresponding to a range of target locations. In response, the planner 250 plans a path for the robot 120 to perform a full scan or actions for the range of target locations.

The planner 250 may plan the route of the robot 120 based on data provided by the visual reference engine 240 and the data provided by the state estimator 235. For example, the visual reference engine 240 estimates the current location of the robot 120 by tracking the number of regularly shaped structures in the storage site 110 passed by the robot 120. Based on the location information provided by the visual reference engine 240, the planner 250 determines the route of the robot 120 and may adjust the movement of the robot 120 as the robot 120 travels along the route.

The planner 250 may also include a fail-safe mechanism in the case where the movement of the robot 120 has deviated from the plan. For example, if the planner 250 determines that the robot 120 has passed a target aisle and traveled too far away from the target aisle, the planner 250 may send signals to the FCU 225 to try to remedy the path. If the error is not remedied after a timeout or within a reasonable distance, or the planner 250 is unable to correctly determine the current location, the planner 250 may direct the FCU to land or to stop the robot 120.

Relying on various location information, the planner 250 may also include algorithms for collision avoidance purposes. In some embodiments, the planner 250 relies on the distance information, the yaw angle, and center offset information relative to nearby objects to plan the movement of the robot 120 to provide sufficient clearance between the robot 120 and nearby objects. Alternatively, or additionally, the robot 120 may include one or more depth cameras such as a 360-degree depth camera set that generates distance data between the robot 120 and nearby objects. The planner 250 uses the location information from the depth cameras to perform collision avoidance.

The communication engine 255 and the I/O interface 260 are communication components to allow the robot 120 to communicate with other components in the system environment 100. A robot 120 may use different communication protocols, wireless or wired, to communicate with an external component such as the base station 130. Example communication protocols may include Wi-Fi, Bluetooth, NFC, USB, etc. that couple the robot 120 to the base station 130. The robot 120 may transmit various types of data, such as image data, flight logs, location data, inventory data, and robot status information. The robot 120 may also receive inputs from an external source to specify the actions that need to be performed by the robot 120. The commands may be automatically generated or manually generated by an administrator. The communication engine 255 may include algorithms for various communication protocols and standards, encoding, decoding, multiplexing, traffic control, data encryption, etc. for various communication processes. The I/O interface 260 may include software and hardware component such as hardware interface, antenna, and so forth for communication.

The robot 120 also includes a power source 265 used to power various components and the movement of the robot 120. The power source 265 may be one or more batteries or a fuel tank. Example batteries may include lithium-ion batteries, lithium polymer (LiPo) batteries, fuel cells, and other suitable battery types. The batteries may be placed inside permanently or may be easily replaced. For example, batteries may be detachable so that the batteries may be swapped when the robot 120 returns to the base station 130.

While FIG. 2 illustrates various example components, a robot 120 may include additional components. For example, some mechanical features and components of the robot 120 are not shown in FIG. 2. Depending on its type, the robot 120 may include various types of motors, actuators, robotic arms, lifts, other movable components, other sensors for performing various tasks.

Continuing to refer to FIG. 2, an example base station 130 includes a processor 270, a memory 275, an I/O interface 280, and a repowering unit 285. In various embodiments, the base station 130 may include different, fewer, and/or additional components.

The base station 130 includes one or more processors 270 and one or more memories 275 that include one or more set of instructions for causing the processors 270 to carry out various processes that are implemented as one or more software modules. The base station 130 may provide inputs and commands to the robot 120 for performing various inventory management tasks. The base station 130 may also include an instruction set for performing swarm control among multiple robots 120. Swarm control may include task allocation, routing and planning, coordination of movements among the robots to avoid collisions, etc. The base station 130 may serve as a central control unit to coordinate the robots 120. The memory 275 may also include various sets of instructions for performing analysis of data and images downloaded from a robot 120. The base station 130 may provide various degrees of data processing from raw data format conversion to a full data processing that generates useful information for inventory management. Alternatively, or additionally, the base station 130 may directly upload the data downloaded from the robot 120 to a data store, such as the data store 160. The base station 130 may also provide operation, administration, and management commands to the robot 120. In some embodiments, the base station 130 can be controlled remotely by the user device 170, the computing server 150, or the inventory management system 140.

The base station 130 may also include various types of I/O interfaces 280 for communications with the robot 120 and to the Internet. The base station 130 may communicate with the robot 120 continuously using a wireless protocol such as Wi-Fi or Bluetooth. In some embodiments, one or more components of the robot 120 in FIG. 2 may be located in the base station and the base station may provide commands to the robot 120 for movement and navigation. Alternatively, or additionally, the base station 130 may also communicate with the robot 120 via short-range communication protocols such as NFC or wired connections when the robot 120 lands or stops at the base station 130. The base station 130 may be connected to the network 180 such as the Internet. The wireless network (e.g., LAN) in some storage sites 110 may not have sufficient coverage. The base station 130 may be connected to the network 180 via an Ethernet cable.

The repowering unit 285 includes components that are used to detect the power level of the robot 120 and to repower the robot 120. Repowering may be done by swapping the batteries, recharging the batteries, re-filling the fuel tank, etc. In some embodiments, the base station 130 includes mechanical actuators such as robotic arms to swap the batteries on the robot 120. In another embodiment, the base station 130 may serve as the charging station for the robot 120 through wired charging or inductive charging. For example, the base station 130 may include a landing or resting pad that has an inductive coil underneath for wirelessly charging the robot 120 through the inductive coil in the robot. Other suitable ways to repower the robot 120 is also possible.

Example Inventory Management Process

Figure 3:
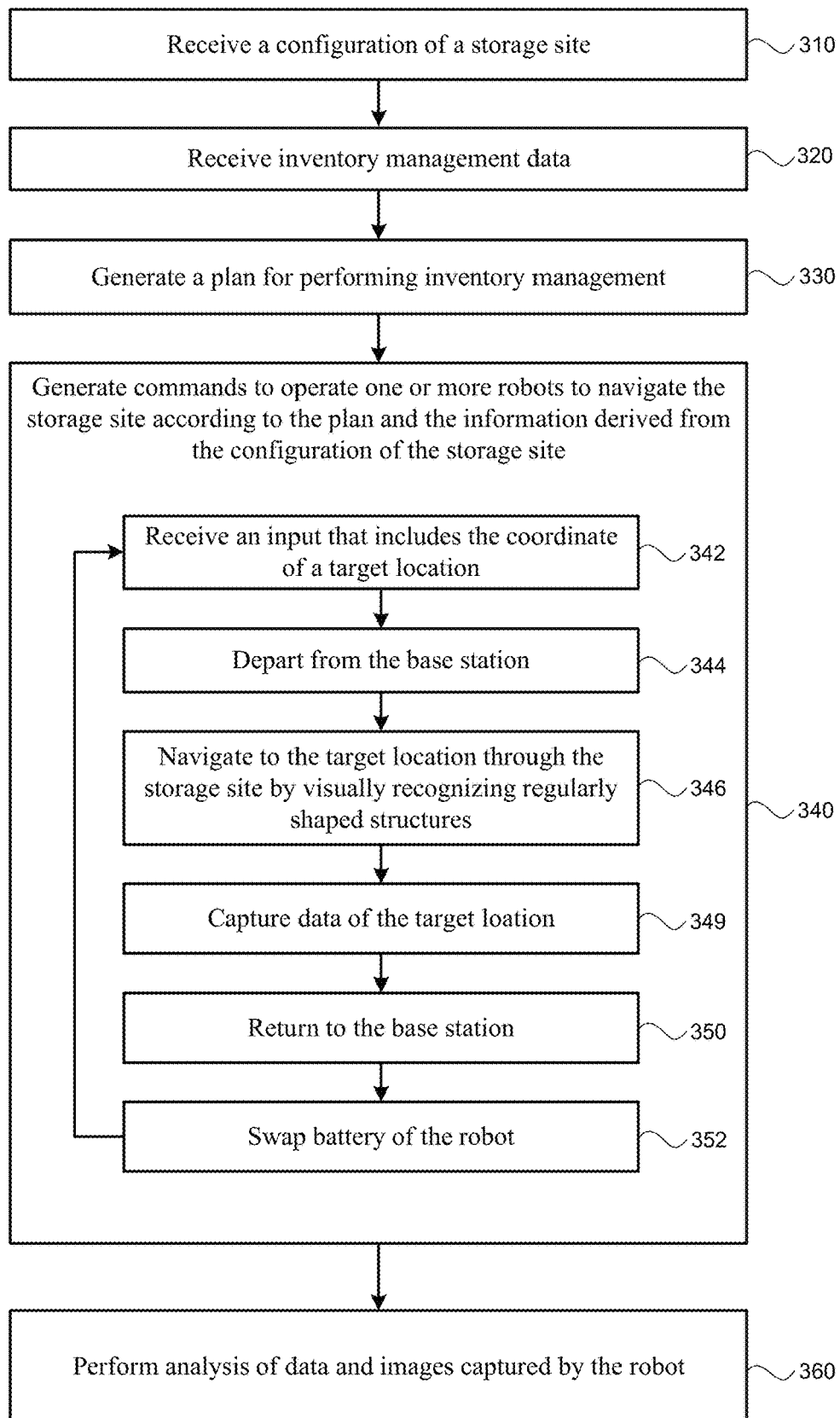
FIG. 3 is a flowchart that depicts an example process for managing the inventory of a storage site, in accordance with some embodiments.

FIG. 3 is a flowchart that depicts an example process for managing the inventory of a storage site, in accordance with some embodiments. The process may be implemented by a computer, which may be a single operation unit in a conventional sense (e.g., a single personal computer) or may be a set of distributed computing devices that cooperate to execute a set of instructions (e.g., a virtual machine, a distributed computing system, cloud computing, etc.). Also, while the computer is described in a singular form, the computer that performs the process in FIG. 3 may include more than one computer that is associated with the computing server 150, the inventory management system 140, the robot 120, the base station 130, or the user device 170.

In accordance with some embodiments, the computer receives 310 a configuration of a storage site 110. The storage site 110 may be a warehouse, a retail store, or another suitable site. The configuration information of the storage site 110 may be uploaded to the robot 120 for the robot to navigate through the storage site 110. The configuration information may include a total number of the regularly shaped structures in the storage site 110 and dimension information of the regularly shaped structures. The configuration information provided may take the form of a computer-aided design (CAD) drawing or another type of file format. The configuration may include the layout of the storage site 110, such as the rack layout and placement of other regularly shaped structures. The layout may be a 2-dimensional layout. The computer extracts the number of sections, aisles, and racks and the number of rows and columns for each rack from the CAD drawing by counting those numbers as appeared in the CAD drawing. The computer may also extract the height and the width of the cells of the racks from the CAD drawing or from another source. In some embodiments, the computer does not need to extract the accurate distances between a given pair of racks, the width of each aisle, or the total length of the racks. Instead, the robot 120 may measure dimensions of aisles, racks, and cells from a depth sensor data or may use a counting method performed by the planner 250 in conjunction with the visual reference engine 240 to navigate through the storage site 110 by counting the number of rows and columns the robot 120 has passed. Hence, in some embodiments, the accurate dimensions of the racks may not be needed.

Some configuration information may also be manually inputted by an administrator of the storage site 110. For example, the administrator may provide the number of sections, the number of aisles and racks in each section, and the size of the cells of the racks. The administrator may also input the number of rows and columns of each rack.

Alternatively, or additionally, the configuration information may also be obtained through a mapping process such as a pre-flight mapping or a mapping process that is conducted as the robot 120 carries out an inventory management task. For example, for a storage site 110 that newly implements the automated management process, an administrator may provide the size of the navigable space of the storage site for one or more mapping robots to count the numbers of sections, aisles, rows and columns of the regularly shaped structures in the storage site 110. Again, in some embodiments, the mapping or the configuration information does not need to measure the accurate distance among racks or other structures in the storage site 110. Instead, a robot 120 may navigate through the storage site 110 with only a rough layout of the storage site 110 by counting the regularly shaped structures along the path in order to identify a target location. The robotic system may gradually perform mapping or estimation of scales of various structures and locations as the robot 120 continues to perform various inventory management tasks.

The computer receives 320 inventory management data for inventory management operations at the storage site 110. Certain inventory management data may be manually inputted by an administrator while other data may be downloaded from the inventory management system 140. The inventory management data may include scheduling and planning for inventory management operations, including the frequency of the operations, time window, etc. For example, the management data may specify that each location of the racks in the storage site 110 is to be scanned every predetermined period (e.g., every day) and the inventory scanning process is to be performed in the evening by the robot 120 after the storage site is closed. The data in the inventory management system 140 may provide the barcodes and labels of items, the correct coordinates of the inventory, information regarding racks and other storage spaces that need to be vacant for incoming inventory, etc. The inventory management data may also include items that need to be retrieved from the storage site 110 (e.g., items on purchase orders that need to be shipped) for each day so that the robot 120 may need to focus on those items.

The computer generates 330 a plan for performing inventory management. For example, the computer may generate an automatic plan that includes various commands to direct the robot 120 to perform various scans. The commands may specify a range of locations that the robot 120 needs to scan or one or more specific locations that the robot 120 needs to go. The computer may estimate the time for each scanning trip and design the plan for each operation interval based on the available time for the robotic inventory management. For example, in certain storage sites 110, robotic inventory management is not performed during the business hours.

The computer generates 340 various commands to operate one or more robots 120 to navigate the storage site 110 according to the plan and the information derived from the configuration of the storage site 110. The robot 120 may navigate the storage site 110 by at least visually recognizing the regularly shaped structures in the storage sites and counting the number of regularly shaped structures. In some embodiments, in addition to the localization techniques such as VIO used, the robot 120 counts the number of racks, the number of rows, and the number of columns that it has passed to determine its current location along a path from a starting location to a target location without knowing the accurate distance and direction that it has traveled.

The scanning of inventory or other inventory management tasks may be performed autonomously by the robot 120. In some embodiments, a scanning task begins at a base station at which the robot 120 receives 342 an input that includes coordinates of target locations in the storage site 110 or a range of target locations. The robot 120 departs 344 from the base station 130. The robot 120 navigates 346 through the storage site 110 by visually recognizing regularly shaped structures. For example, the robot 120 tracks the number of regularly shaped structures that are passed by the robot 120. The robot 120 makes turns and translation movements based on the recognized regularly shaped structures captured by the robot's image sensor 210. Upon reaching the target location, the robot 120 may align itself with a reference point (e.g., the center location) of the target location. At the target location, the robot 120 captures 348 data (e.g., measurements, pictures, etc.) of the target location that may include the inventory item, barcodes, and labels on the boxes of the inventory item. If the initial command before the departure of the robot 120 includes multiple target locations or a range of target locations, the robot 120 continues to the next target locations by moving up, down, or sideways to the next location to continue to scanning operation.

Upon completion of a scanning trip, the robot 120 returns to the base station 130 by counting the number of regularly shaped structures that the robot 120 has passed, in a reversed direction. The robot 120 may potentially recognize the structures that the robot has passed when the robot 120 travels to the target location. Alternatively, the robot 120 may also return to the base station 130 by reversing the path without any count. The base station 130 repowers the robot 120. For example, the base station 130 provides the next commands for the robot 120 and swaps 352 the battery of the robot 120 so that the robot 120 can quickly return to service for another scanning trip. The used batteries may be charged at the base station 130. The base station 130 also may download the data and images captured by the robot 120 and upload the data and images to the data store 160 for further process. Alternatively, the robot 120 may include a wireless communication component to send its data and images to the base station 130 or directly to the network 180.

The computer performs 360 analyses of the data and images captured by the robot 120. For example, the computer may compare the barcodes (including serial numbers) in the images captured by the robot 120 to the data stored in the inventory management system 140 to identify if any items are misplaced or missing in the storage site 110. The computer may also determine other conditions of the inventory. The computer may generate a report to display at the user interface 175 for the administrator to take remedial actions for misplaced or missing inventory. For example, the report may be generated daily for the personnel in the storage site 110 to manually locate and move the misplaced items. Alternatively, or additionally, the computer may generate an automated plan for the robot 120 to move the misplaced inventory. The data and images captured by the robot 120 may also be used to confirm the removal or arrival of inventory items.

Example Navigation Process

Figure 4:
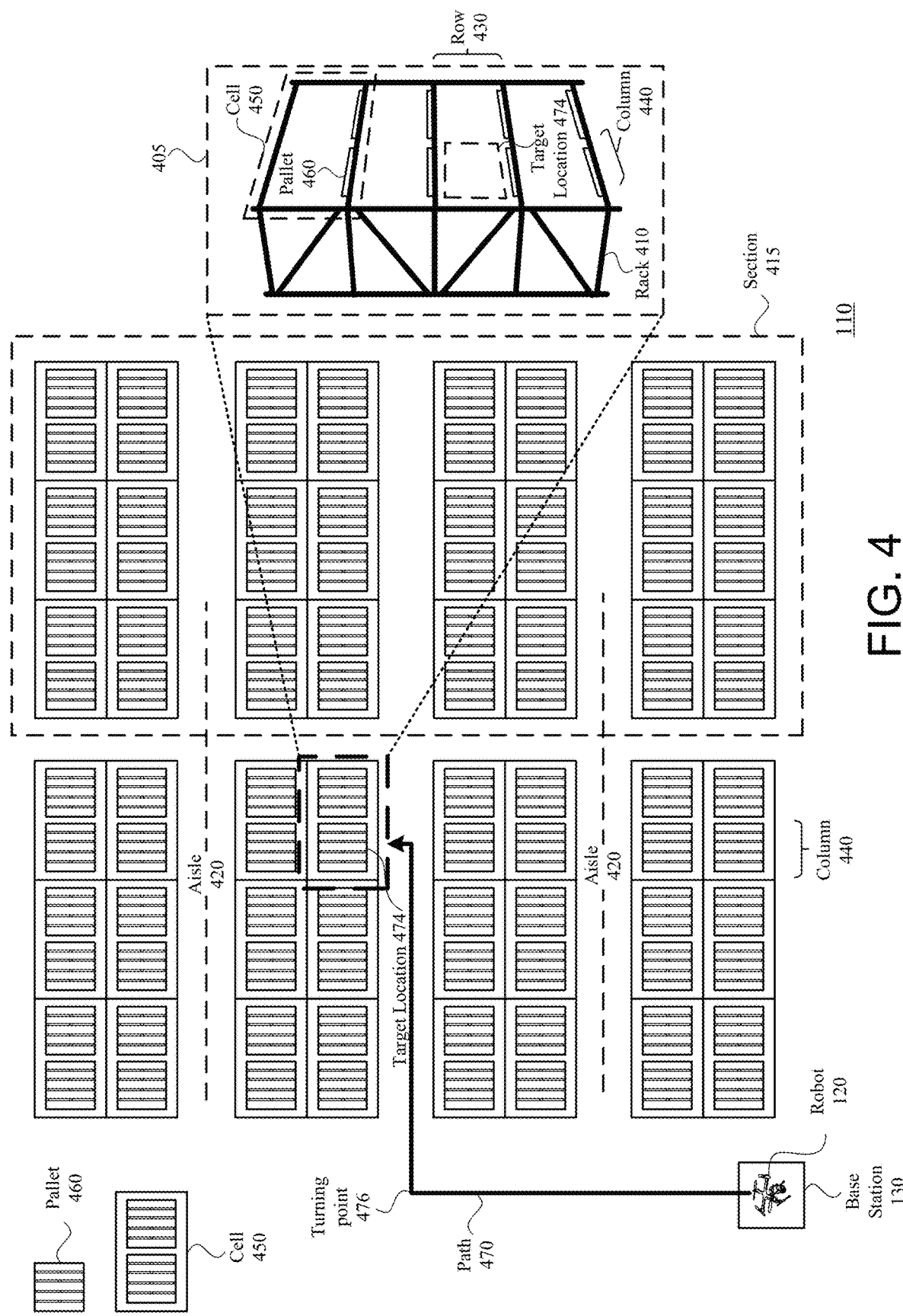
FIG. 4 is a conceptual diagram of an example layout of a storage site that is equipped with a robot, in accordance with some embodiments.

FIG. 4 is a conceptual diagram of an example layout of a storage site 110 that is equipped with a robot 120, in accordance with some embodiments. FIG. 4 shows a two-dimensional layout of storage site 110 with an enlarged view of an example rack that is shown in inset 405. The storage site 110 may be divided into different regions based on the regularly shaped structures. In this example, the regularly shaped structures are racks 410. The storage site 110 may be divided by sections 415, aisles 420, rows 430 and columns 440. For example, a section 415 is a group of racks. Each aisle may have two sides of racks. Each rack 410 may include one or more columns 440 and multiple rows 430. The storage unit of a rack 410 may be referred to as a cell 450. Each cell 450 may carry one or more pallets 460. In this particular example, two pallets 460 are placed on each cell 450. Inventory of the storage site 110 is carried on the pallets 460. The divisions and nomenclature illustrated in FIG. 4 are used as examples only. A storage site 110 in another embodiment may be divided in a different manner.

Each inventory item in the storage site 110 may be located on a pallet 460. The target location (e.g., a pallet location) of the inventory item may be identified using a coordinate system. For example, an item placed on a pallet 460 may have an aisle number (A), a rack number (K), a row number (R), and a column number (C). For example, a pallet location coordinate of [A3, K1, R4, and C5] means that the pallet 460 is located at a rack 410 in the third aisle and the north rack. The location of the pallet 460 in the rack 410 is in the fourth row (counting from the ground) and the fifth column. In some cases, such as the particular layout shown in FIG. 4, an aisle 420 may include racks 410 on both sides. Additional coordinate information may be used to distinguish the racks 410 at the north side and the racks 410 at the south side of an aisle 420. Alternatively, the top and bottom sides of the racks can have different aisle numbers. For a spot check, a robot 120 may be provided with a single coordinate if only one spot is provided or multiple coordinates if more than one spot is provided. For a range scan that checks a range of pallets 460, the robot 120 may be provided with a range of coordinates, such as an aisle number, a rack number, a starting row, a starting column, an ending row, and an ending column. In some embodiments, the coordinate of a pallet location may also be referred in a different manner. For example, in one case, the coordinate system may take the form of "aisle-rack-shelf-position." The shelf number may correspond to the row number and the position number may correspond to the column number.

Figure 5:
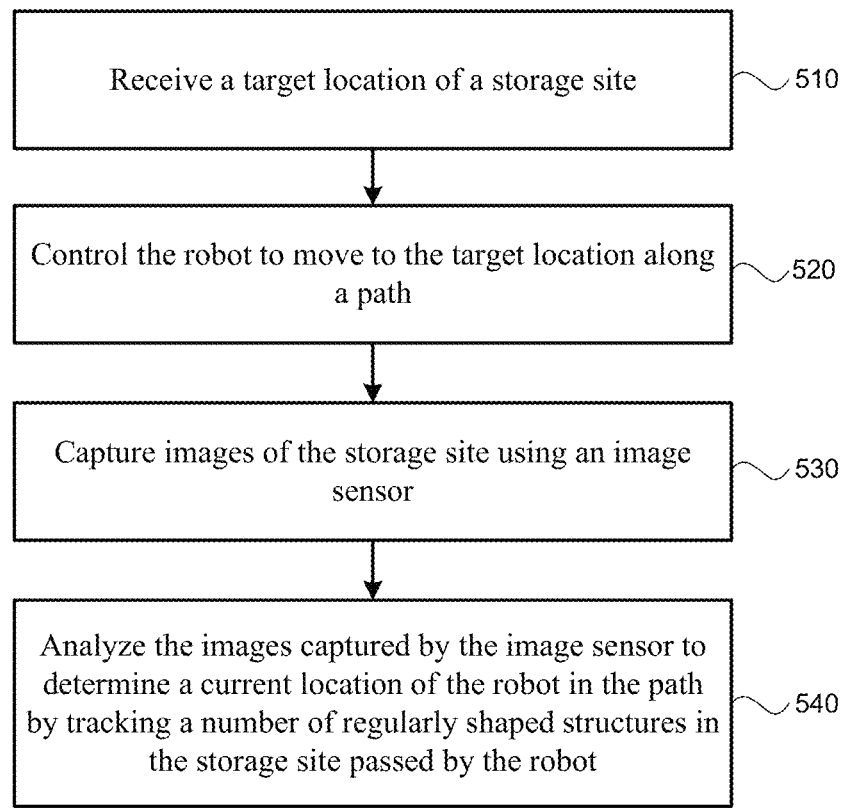
FIG. 5 is a flowchart depicting an example navigation process of a robot 120, according to an embodiment.

Referring to FIG. 5 in conjunction with FIG. 4, FIG. 5 is a flowchart depicting an example navigation process of a robot 120, in accordance with some embodiments. The robot 120 receives 510 a target location 474 of a storage site 110. The target location 474 may be expressed in the coordinate system as discussed above in association with FIG. 4. The target location 474 may be received as an input command from a base station 130. The input command may also include the action that the robot 120 needs to take, such as taking a picture at the target location 474 to capture the barcodes and labels of inventory items. The robot 120 may rely on the VIO unit 236 and the altitude estimator 238 to generate localization information. In one case, the starting location of a route is the base station 130. In some cases, the starting location of a route may be any location at the storage site 110. For example, the robot 120 may have recently completed a task and started another task without returning to the base station 130.

The processors of the robot 120, such as the one executing the planner 250, control 520 the robot 120 to the target location 474 along a path 470. The path 470 may be determined based on the coordinate of the target location 474. The robot 120 may turn so that the image sensor 210 is facing the regularly shaped structures (e.g., the racks). The movement of the robot 120 to the target location 474 may include traveling to a certain aisle, taking a turn to enter the aisle, traveling horizontally to the target column, traveling vertically to the target row, and turning to the right angle facing the target location 474 to capture a picture of inventory items on the pallet 460.

As the robot 120 moves to the target location 474, the robot 120 captures 530 images of the storage site 110 using the image sensor 210. The images captured may be in a sequence of images. The robot 120 receives 540 the images captured by the image sensor 210 as the robot 120 moves along the path 470. The images may capture the objects in the environment, including the regularly shaped structures such as the racks. For example, the robot 120 may use the algorithms in the visual reference engine 240 to visually recognize the regularly shaped structures.

The robot 120 analyzes 550 the images captured by the image sensor 210 to determine the current location of the robot 120 in the path 470 by tracking the number of regularly shaped structures in the storage site passed by the robot 120. The robot 120 may use various image processing and object recognition techniques that will be discussed in further detail with reference to FIG. 6A to identify the regularly shaped structures and to track the number of structures that the robot 120 has passed. Referring to the path 470 shown in FIG. 4, the robot 120, facing the racks 410, may travel to the turning point 476. The robot 120 determines that it has passed two racks 410 so it has arrived at the target aisle. In response, the robot 120 turns counter-clockwise and enters the target aisle facing the target rack. The robot 120 counts the number of columns that it has passed until the robot 120 arrives at the target column. Depending on the target row, the robot 120 may travel vertically up or down to reach the target location. Upon reaching the target location, the robot 120 performs the action specified by the input command, such as taking a picture of the inventory at the target location.

Example Drone Overview

The design of the robot 120 may be created such that certain needs are met. For example, obstructions may be more likely to affect the bottom hemisphere of the robot 120. When flying, the robot 120 may encounter movement below it that requires realignment or some correction in the robot's flight path. Therefore, the maneuverability of the robot 120 may be improved if it has full lower hemisphere awareness. The robot 120 may additionally require landing gear that is capable of landing on a variety of surfaces and at a variety of impacts. The robot 120 may need to be landed in unexpected situations or very quickly, so it is important for the robot 120 to have interchangeable and durable landing mechanisms. Additionally, crashes for the robot 120 may be more likely if the robot's propellers are not protected. Therefore, the robot 120 may additionally benefit from having a structure that guards the robot's propellers. A storage site 110 has perpetually moving components as workers and packages are shifted during the robot's flight. The terrain of the robot 120 is changing constantly. Therefore, it is important that the robot 120 has a design allowing for maximal environmental awareness and structural integrity. Embodiments described herein relate to aerial robots that may navigate storage sites 110 with protected propellers, durable landing gear, and improved environmental awareness.

The aerial robots may be designed with propeller guards to prevent obstructions from harming the robot's ability to stay airborne. Propeller guards may be configured such that the aerial robot is still aerodynamic, without exposing the robot's propellers. In order to support the propeller guards, the aerial robot may carry multiple rods. The rods may be configured to increase the rigidity of the propeller guards and to maintain sensors on the robot 120 in constant alignment or offset positions. In some embodiments, the aerial robot may have a longitudinal body that houses the robot's technical components. The longitudinal body may carry a sensor rod. In some embodiments, the sensor rod is configured to be approximately perpendicular to the longitudinal body, creating 4 external points to frame the robot's body. The 4 external points may create a frame within which a set of propellers are positioned, protecting the propellers from obstructions.

From each of the 4 external points, the robot may carry propeller guards. In some embodiments, propeller guards are round bumpers that balloon out from each external point. The bumpers create a margin of safety for the propellers that lie within the 4 external points. The margin of safety is a space between the external area of the bumpers and the position of the propellers. The margin of safety may be configured such that if the robot flies into an obstruction, the propellers are protected by the bumpers with a gap. In some embodiments, the bumpers may be made from plastic, metal, carbon, or another material to deflect potential obstacles in the robot's flight path without harming the robot's propellers. In some embodiments, the bumpers may be oriented at an angle to provide the robot with more specific, tailored propeller protection. The bumpers may have different dimensions depending on the severity of potential obstructions. For example, if a storage site 110 is outdoors, the bumpers may be thicker or taller to prevent insects, birds, and other potential obstructions from contacting the robot's propellers.

In some embodiments, the robot's main housing carries a printed circuit board (PCB), sensors, a global positioning system (GPS), a power source, and other technical components. The main housing is designed to allow for ventilation of each of the technical components, while maintaining an aerodynamic structure with a discrete profile. The main housing may be longitudinal. The main housing may be slender and elongated, giving the robot a discrete profile.

In some embodiments, the robot 120 includes a longitudinal housing that carries a set of propellers. The robot may carry one or more motor rods that are perpendicular to the longitudinal housing. Propellers may cause vibrations that affect sensors and camera quality. To account for the propellers' motion, the motor rods may be configured such that the propellers are not mounted directly on the longitudinal housing. The heights of the propellers may be offset from the height of the main housing, preventing the propellers from impeding the cameras and sensors on the longitudinal housing.

The motor rods may be mounted at a different height from the sensor rod to prevent the propellers from disrupting the sensors on the sensor rod. For example, the longitudinal housing may have an upper body and a lower body. The motor rods may be carried by the lower body of the longitudinal housing and the sensor rod may be carried by the upper body of the longitudinal housing, creating vertical separation between the propellers and the sensors. In some embodiments, the longitudinal housing may have more than the upper and lower body. For example, the longitudinal housing may have multiple (e.g., 3, 4, 6, 10, 20, etc.) layers of housing, with each layer carrying different components.

To address potential abrupt or abrasive landings, the robot 120 may be designed to have replaceable legs on which to land. In some embodiments, the legs may be carried by a part of the drone that is less susceptible to jostling. For example, the legs may be mounted to motor rods on the robot rather than directly mounted to sensors. In some embodiments, the legs are replaceable. The legs may have replaceable tips such that when the tips are worn out from the robot's landings, they can easily be removed and replaced. The tips may be a rubber or a hard plastic material. The tips may allow the robot to soften the impact of landing.

Example Drone Structure

Figure 6A:
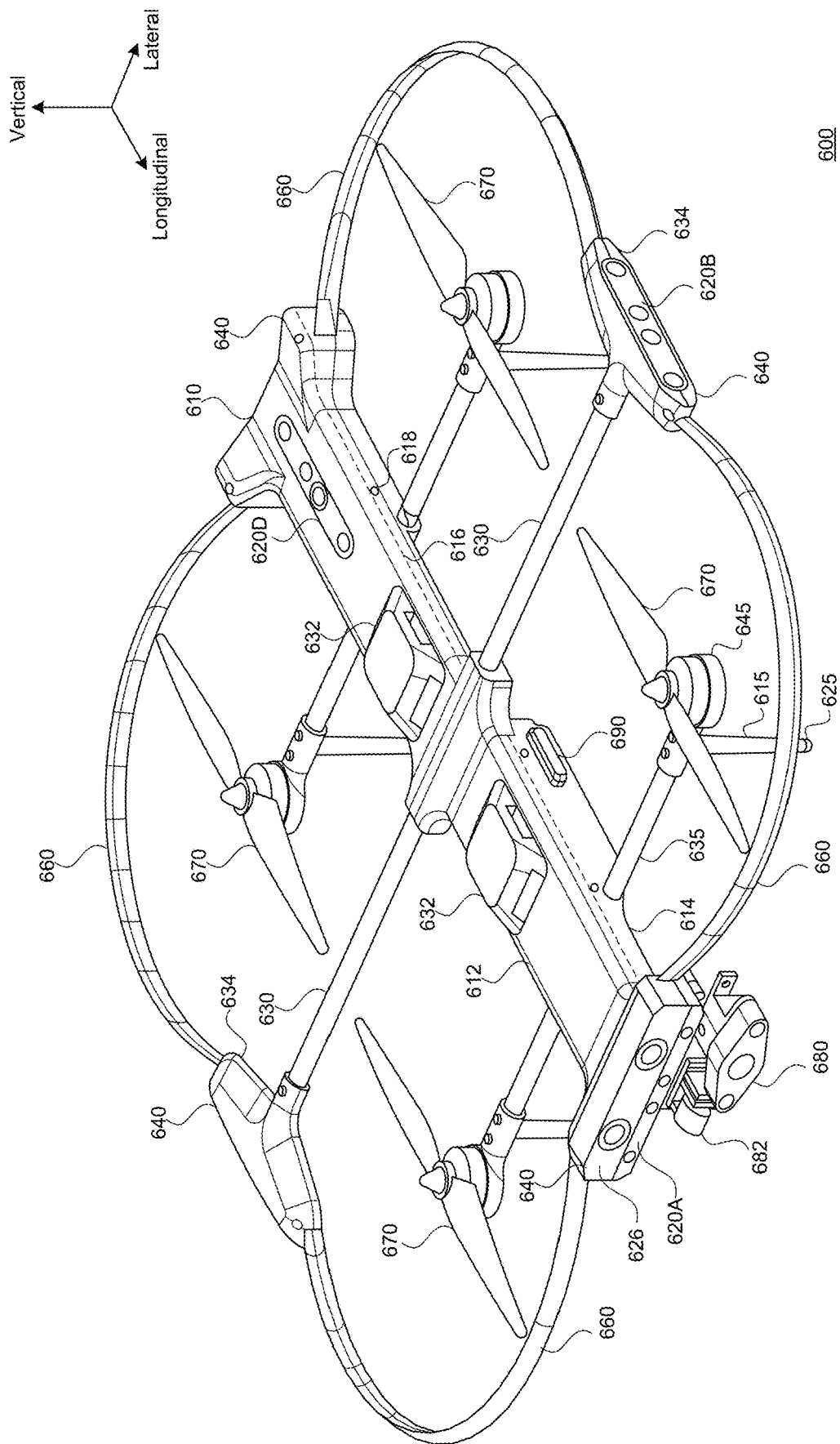
FIG. 6A is a front perspective view of an aerial drone, in accordance with some embodiments.
Figure 6B:
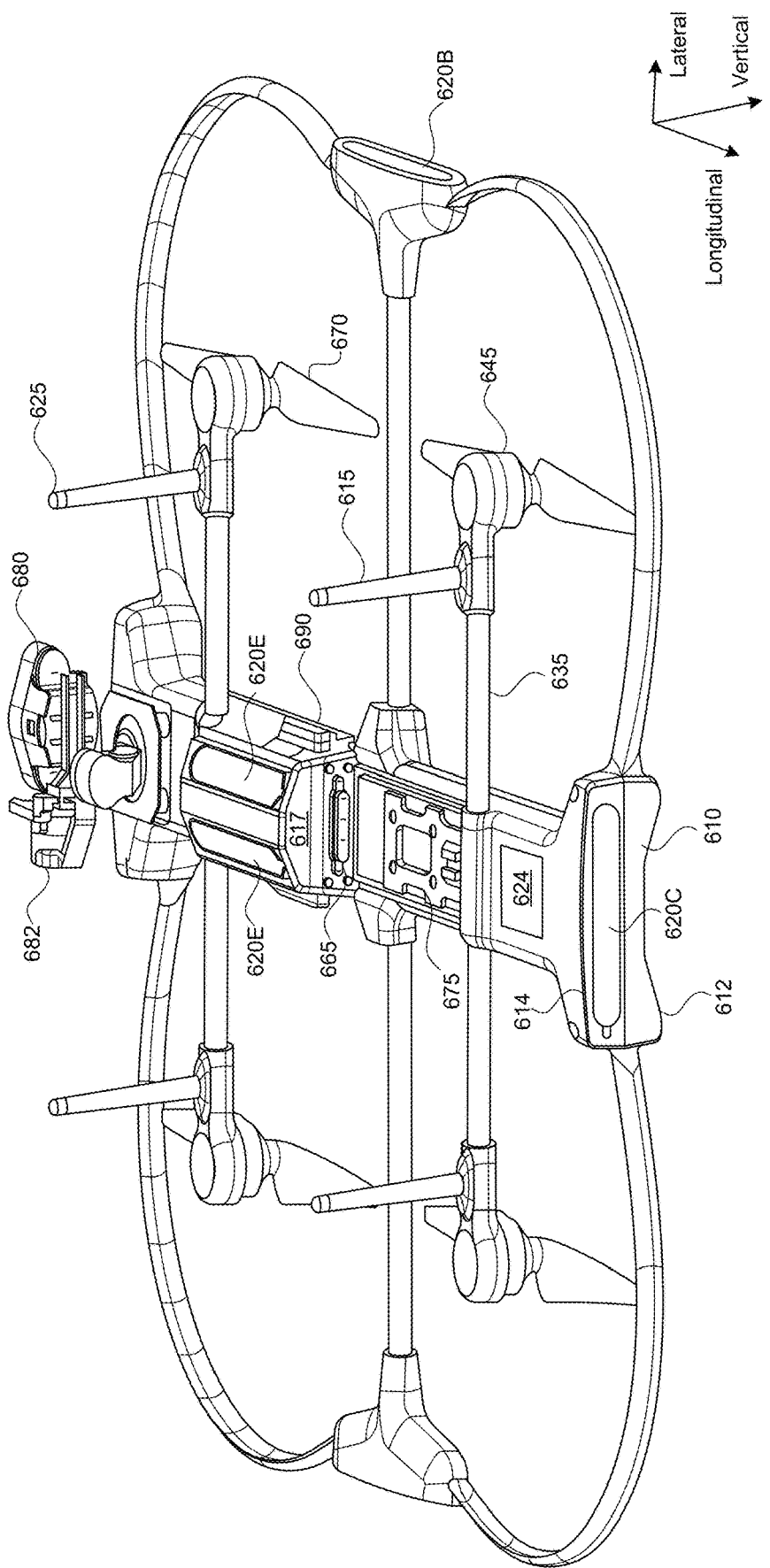
FIG. 6B is a bottom perspective view of the aerial drone showing the lower part of the aerial drone, in accordance with some embodiments.

FIG. 6A is a front perspective view of an aerial drone 600, in accordance with some embodiments. FIG. 6B is a bottom perspective view of the aerial drone 600 showing the lower part of the aerial drone 600, in accordance with some embodiments. In FIG. 6B, the aerial drone 600 is upside down. The aerial drone 600 is an example of a robot 120, although the robot 120 may take another form that is not a flying object in various embodiments. Various views of the aerial drone 600 may be described along with directional descriptions such as a vertical direction, a longitudinal direction, and a lateral direction. In some embodiments, the longitudinal direction and the lateral direction are not limited to a particular orientation and may simply mean two different directions. As such, in some embodiments, the two directions may be described as the first direction and the second direction.

Similarly, various directional terms such as top, bottom, left, right, vertical, horizontal, longitudinal, and lateral are relative terms and may simply be referred to as a first direction, the second direction, etc. For example, in other embodiments not shown in the figures, an upper housing and a lower housing merely refer to two divisions of housing and may be referred to as the first housing part and the second housing part. The two housings may be located side by side. In various embodiments, various components may be divided into any other suitable divisions such as top and bottom, left and right, specific quadrants, or other identifiable, symmetrical or not, regular or irregular, regions.

The aerial drone 600 includes a drone body characterized as having a housing 610. In some embodiments, the housing 610 carries the technical components internally and on the surface of the housing 610 such as processing board, sensors, heatsinks, and other technical components. The drone body may be of any shape and form. For example, the housing 610 shown in FIG. 6B is an elongated enclosure that largely defines the longitudinal body of the aerial drone 600. In some embodiments, the housing 610 may also be referred to as longitudinal housing, although the housing being longitudinal does not imply that the housing necessarily extends in a front and back direction.

The drone body may include an upper housing 612 and a lower housing 614. To further illustrate the separation, the boundary between the upper housing 612 and the lower housing 614 is illustrated by the dashed line 616 in FIG. 6A. The upper housing 612 and the lower housing 614 are joined through one or more fasteners (such as screws) through one or more connection sites 618 that are in the lateral direction. The fasteners (not illustrated) may penetrate through an overlapped section of the upper housing 612 and the lower housing 614. In some embodiments, the two housing parts are divided through a plane, and the orientation of the connection sites 618 is parallel to the plane. For example, in the particular arrangement shown in FIG. 6A and FIG. 6B, the two housing parts are divided through the horizontal plane, and one or more connection sites 618 are positioned horizontally so that the fasteners are inserted horizontally. The arrangement enhances the mechanical strength of the housing 610.

The housing 610 includes ventilation 632 for the technical components inside the housing 610. Ventilation 632 allows for airflow into the housing 610. The ventilation 632 may regulate the temperature of the aerial drone 600. In some embodiments, the ventilation 632 may have retractable covers that open and shut to control the amount of airflow permitted into the housing 610.

As part of the mechanical structural support of the aerial drone 600, a sensor rod 630 is carried by the housing 610. A sensor rod 630 may be a rigid mechanical structure that extends laterally from the housing 610. The sensor rod 630 may be attached to the housing 610 in a perpendicular configuration or at any suitable angle relative to the longitudinal body of the housing 610. The sensor rod 630 may be an integral part of the housing 610 or may be mechanically mounted on the housing 610. In the embodiments shown in the figures, the sensor rod 630 may take the form of a single rigid rod that penetrates through the housing 610. In some embodiments, the sensor rod 630 may be a pair of rods each extending in the opposite direction from the housing 610. The distal ends of the housing 610 and the distal ends of the sensor rod 630 may create external points 640 of the aerial drone 600 that define external mechanical support points. In some embodiments, the external points 640 forms a rigid, 4-cornered frame. In the embodiments shown in FIG. 6B, the housing 610 and the sensor rod 630 divides the aerial drone 600 into quadrants. In other embodiments, the housing 610 and the sensor rod 630 may divide the aerial drone 600 into any number of identifiable regions, symmetrical or asymmetrical, regular or not. For example, in some embodiments, the aerial drone 600 may include more than 2 sensor rods 630 that radiate from the housing 610 to divide the aerial drone 600 into more than 4 regions.

The aerial drone 600 may include several bumpers 660, which may also be referred to as propeller guards. As illustrated in FIGS. 6A and 6B, the bumpers 660 may be carried by the distal ends of the longitudinal body 610 and the distal end of the sensor rod 630. For example, a bumper 660 may connect an external point 640 of the body 610 to an external point 640 of a sensor rod 630. The bumpers 660 may be carried by the sensor housing 634 on either end of the sensor rod 630. The bumpers 660 provide protection for the propellers 670. The bumpers 660 may also provide protection for the rest of the aerial drone 600's components that fall in the same plane as the bumpers 660. As illustrated, the bumpers 660 may balloon out in a spherical shape from each of the robot's external points 640 to define the periphery of the aerial drone 600. The bumpers 660 may balloon out such that there is a gap between the circumference of the propellers 670 and the bumpers 660. Due to this gap, should the bumpers 660 collide with an obstacle, the propellers 670 may be unaffected. In some embodiments, the bumpers 660 may have alternative shapes and dimensions to prevent potential obstacles in a given environment from affecting the propellers 670. For example, the bumpers 660 may be thicker or taller to provide additional shielding for the propellers 670 and the housing 610. The bumpers form part of a periphery of the aerial drone.

In some embodiments, the housing 610 may carry a set of motor rods 635. The motor rods 635 may have a home and key system for attachment to the housing 610. Each motor rod 635 carries motor mount 645. Each motor mount 645 carries an engine to power a propeller 670. A motor rod 635 may carry a leg 615 and a leg tip 625 for landing the aerial drone 600. The leg 615 and the propeller 670 may be in opposing directions. For example, the propeller 670 is mounted in one direction (e.g., from the top) and the leg 615 extends in the opposite direction (e.g., extending to the bottom).

In some embodiments, the two types of rods (sensor rod 630 and motor rod 635) are attached to different parts of the housing 610 for the purposes of alignment and reduction of vibration. For example, in the embodiment shown in FIGS. 6A and 6B, the motor rods 635 may be attached to the lower housing 614 aerial drone 600 while the sensor rod 630 is attached to the upper housing 612 of the aerial drone 600. The sensor rod 630 and motor rods 635 may be at different horizontal levels. Since the propellers 670 are mounted above the motor rods 635 while the bumpers 660 (propeller guards) are mounted through the sensor rod 630, the bumpers 660 and propellers 670 are aligned at the same horizontal level, as best illustrated in FIG. 6B. Also, the motor rods 635 that carry the propellers 670 may bring vibration to the aerial drone 600 and the sensors that are mounted on the sensor rod 630 are sensitive to vibration, this mounting arrangement reduces the movement and vibrations of the motor rods 635 affecting the sensors on the sensor rod 630.

In the bottom perspective view of an aerial drone 600 shown in FIG. 6B, the lower housing 614 may include a battery loading zone for carrying a battery pack. The battery loading zone includes a battery connection port 665 and a battery attachment site 675. Detail of the battery attachment system will be discussed below.

On the side of the housing 610, the aerial drone 600 may include a pair of gripper tabs 690 that are respectively protruding from the left surface and the right surface of the housing 610. A gripper tab 690 may be complementary in shape with a gripper slot of a gripper of the base station 130 and may interact with the gripper. The gripper tabs 690 are used for alignment and securement of the aerial drone 600 to the base station 130 upon landing. In some embodiments, gripper tabs 690 are a pair of protrusions on the lower body of the aerial drone 600. The gripper tabs 690 may be carried by opposing sides of the lower body of the aerial drone 600 such that the gripper tabs 690 are able to meet with grippers on a landing base. In some embodiments, the gripper tabs 690 may be one tab, two tabs, four tabs, five tabs, etc. for enabling the positioning of the aerial drone 600 when landing.

Example Sensor Arrangement

In some embodiments, the aerial drone 600 may carry various types of navigation and other tasks that are to be performed by the aerial drone 600. For example, the aerial drone 600 may include a plurality of depth sensors that may take the form of RGB-D (Red, Green, Blue, and Depth) cameras that generate RBG data and depth data. The aerial drone 600 may also include a tracking camera, a main camera for capturing images and performing storage site management tasks, and an inertial measurement unit (IMU).

Figure 8A:
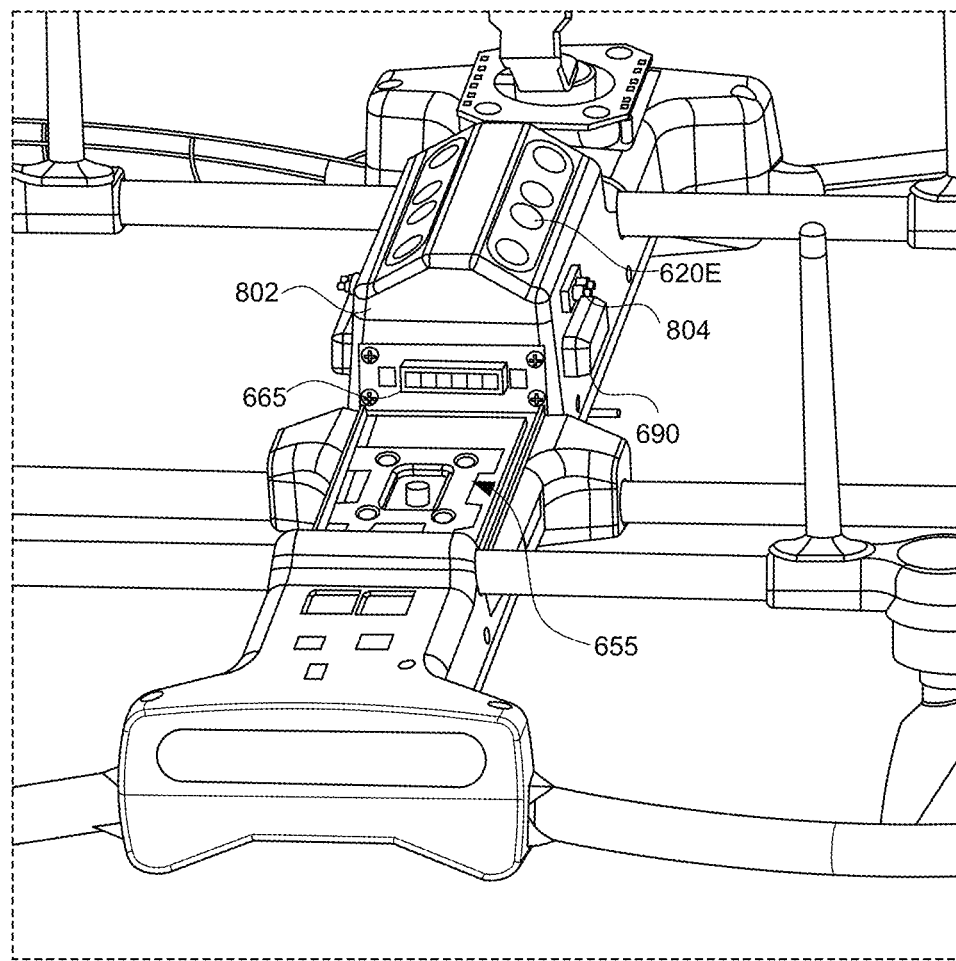
FIG. 8A is an enlarged perspective view of a flipped aerial drone illustrating the bottom of the drone with a particular emphasis on the battery attachment zone, in accordance with some embodiments.
Figure 8B:
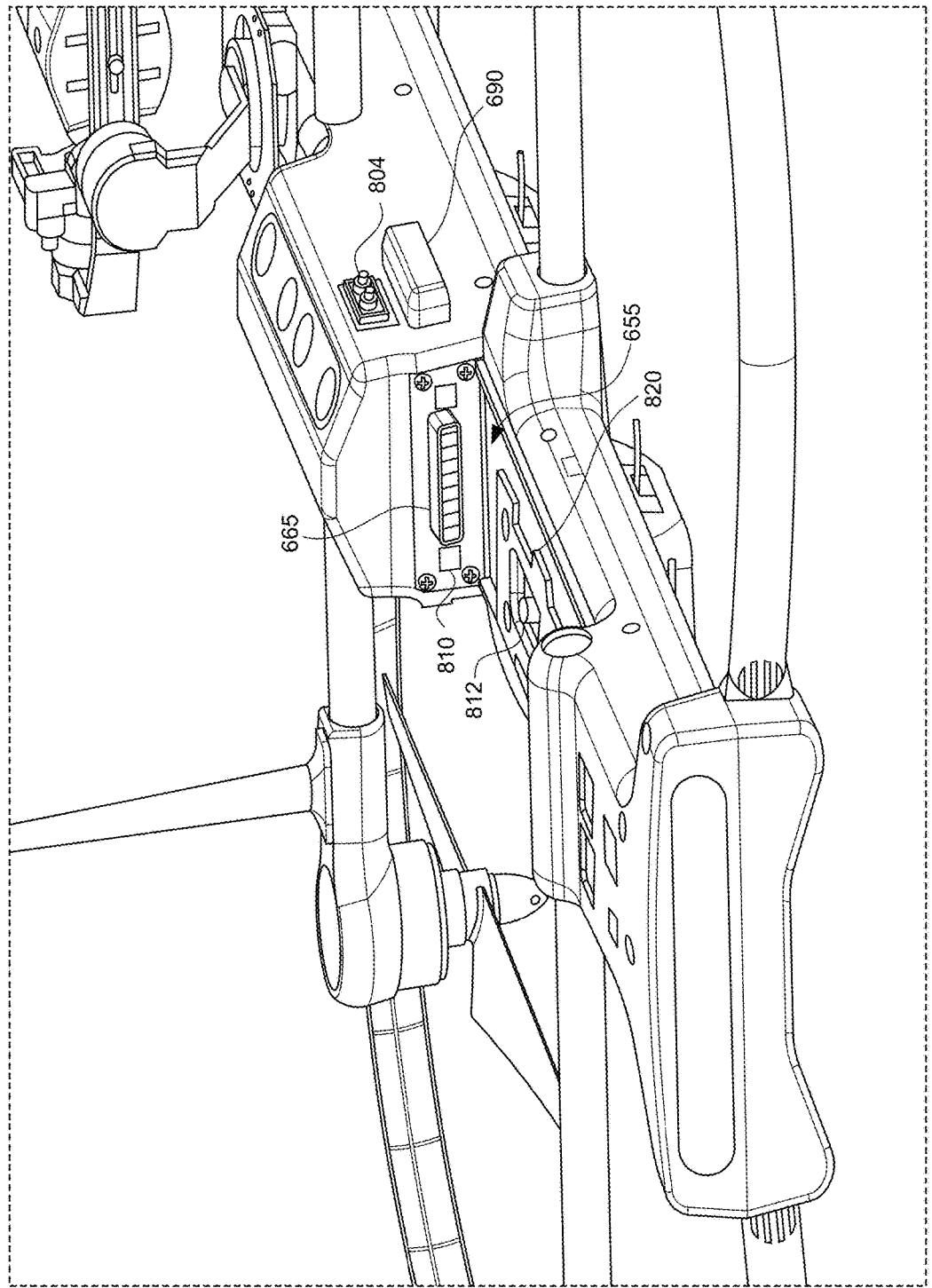
FIGS. 8B, 8C, and 8D illustrate different angles of the battery attachment zone of the aerial drone, in accordance with some embodiments.

FIGS. 8A and 8B illustrate an example of the placements of various sensors, in accordance with some embodiments. The placements and the specific types of sensors are merely examples and may be replaced by equivalent sensors to achieve similar goals. Each sensor on the aerial drone 600 may be one or more of: an image sensor, proximity sensor, temperature sensor, motion sensor, light sensor, position sensor, or any additional sensor that is described in FIG. 2. Also, various sensors conceptually illustrated in the figures may be of the same type or different types.

In some embodiments, the aerial drone 600 may include multiple depth sensors 620 (collectively referred to as depth sensors 620 and individually referred to as 620A, 620B, etc.) that reduce the blind spots of the aerial drone 600. In some embodiments, the placement of the depth sensors 620 provides 360 degrees or almost 360 degrees of view for the aerial drone 600 to navigate in an environment. By way of example, the housing 610 may include a depth sensor 620 at each of the four external points 640 of the aerial drone 600. In some embodiments, the aerial drone 600 may include a front depth sensor 620A at the front end of the longitudinal housing 610, two side depth sensors 620B (left and right) carried at the sensor housings 634 that are mounted to the distal ends of the sensor rod 630, and a back depth sensor 620C (shown in FIG. 6B). The front depth sensor 620A may provide readings for the front hemisphere of the environment, and a side depth sensor 620B may provide readings for a side hemisphere of the environment, etc. The two side depth sensors 620B may be positioned at the farthest ends of the sensor rod 630 to include the field of view of the sensors. Typically, a depth sensor 620 has a horizontal view angle of about 90 degrees. The four sensors provide a horizontal 360-degree view for the aerial drone 600.

Vertically, the housing 610 may carry a top depth sensor 620D on the top surface of the housing 610. The top depth sensor 620D may provide readings for the upper hemisphere of the environment. The top depth sensor 620D may be positioned such that other parts carried by the housing 610 do not interfere with the sensor's range of view. The lower housing 614 may include a raised part 617 (extending from the bottom) that has two tilted surfaces. Each of the tilted surfaces may carry a bottom depth sensor 620E. Typically, a depth sensor 620 has a vertical view angle of about 60 degrees. In a storage site environment, oftentimes obstacles are from the bottom of the aerial drone 600. The pairs of bottom depth sensors 620E tilted at different angles increase the field of view of the bottom side. In other words, the sensors 620E are mounted in offset directions, allowing for a broad field of range for the aerial drone 600 to track the area beneath it. In some embodiments, instead of a single top depth sensor 620D, the upper housing 612 may also include a raised part and a pair of top depth sensors 620D in an arrangement similar to the bottom depth sensors 620E.

In some embodiments, since one or more external points 640 each carry a sensor, sensors on the sensor rod 630 and on the housing 610 may maintain a consistent offset. The consistent offset between the sensors on the sensor rod 630 and on the housing 610 allows for increased reliabilities of calculations, environmental readings, and positional awareness. In some embodiments, sensors on the aerial drone 600 may be held in rigid configurations with the body 610 to allow for accurate data collection. The sensor rod 630 may carry several sensors 620. A sensor rod 630 may carry one or more sensors 620 at each end. The sensor rod 630 may carry the sensors 620 with sensor housings 634. A sensor housing 634 may be attached to the sensor rod 630 with a fastener (e.g., a screw), an adhesive, welding or soldering, a hook and loop configuration, or a press fit.

In some embodiments, the aerial drone 600 may also carry other types of sensors for performing various storage site management tasks and navigation. For example, the aerial drone 600 may carry a range finder 624 at the lower housing 614 facing downward. The range finder 624 may send a laser signal downward to measure the distance from the floor to the drone 600. The aerial drone 600 may include a front tracking camera 626. Inside the housing 610 at or near the center of the aerial drone 600, an IMU (not shown in FIG. 6A or 6B) may be carried to generate motion data for the processor(s) carried within the housing 610. The housing 610 may also carry a gimbal 682 that carries the main camera 680 that may be used to capture inventory images and other images of the drone. Other types of sensors may also be present in the aerial drone 600 in various embodiments.

Structure and Component Mounting

Figure 7A:
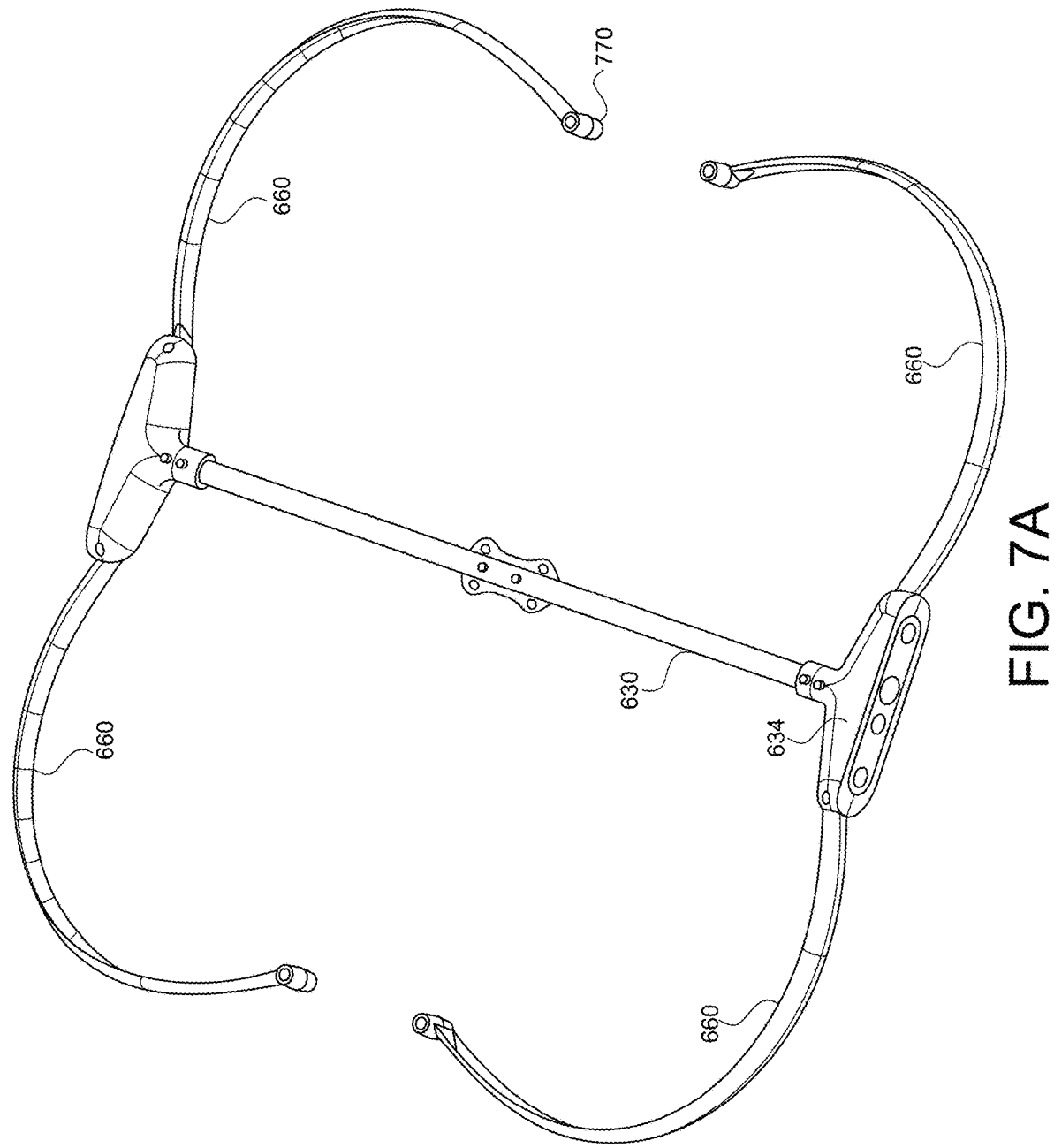
FIG. 7A is an isolated view illustrating the frame components of an aerial drone, in accordance with some embodiments.

FIG. 7A is an isolated view illustrating the frame components of an aerial drone 600, in accordance with some embodiments. The main housing 610 is omitted in FIG. 7A. The frame components may include the sensor rod 630, a pair of sensor housings 634 mounted at the two distal ends of the sensor rod 630, and multiple bumpers 660. A bumper 660 is carried by the sensor rod 630 through a sensor housing 634. The bumpers 660 may be carried by the housings for sensors 620. The bumpers 660 may be positioned, as illustrated, to balloon outwards from the aerial drone 600 and sensor rod 630.

FIG. 7B is an internal view of the upper housing 612 illustrating how the sensor rod 630 is mounted to the upper housing 612, in accordance with some embodiments. FIG. 7B illustrates how various attachment rods (sensor rod 630 and motor rods 635) are securely mounted to the housing 610 using an angle alignment system such as a home and key system. Referring to FIG. 7B, the sensor rod 630 may be attached to the upper housing 612 at a rod attachment site 701. The sensor rod 630 penetrates through the upper housing 612 via a pair of holes 704 (one on each left and right side) with a diameter matching that of the rod. In some embodiments, the rod attachment site 701 includes a home 702 for securing the sensor rod 630 to the upper housing 612. The home 702 may include a set of fastener locations 703, which may fasten the home 702 to the housing 610. The rod attachment site 701 secures the sensor rod 630 in a rigid conformation with the housing 610. Even though only the attachment site 701 for the sensor rod 630, each motor rod 635 may be mounted to the lower housing 614 in a similar system and the mounting structure is not repeated.

Figure 7C:
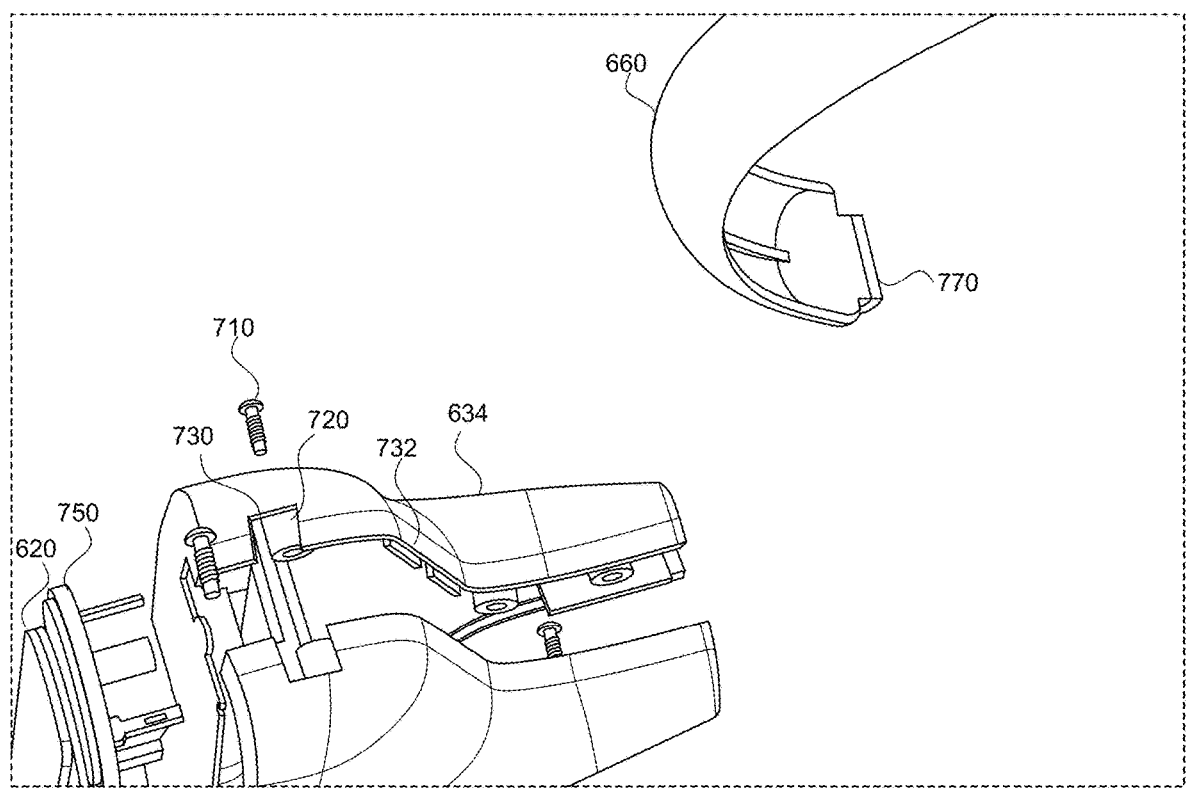
FIG. 7C is an exploded view showing a connection between a bumper and a sensor housing, in accordance with some embodiments.
Figure 7D:
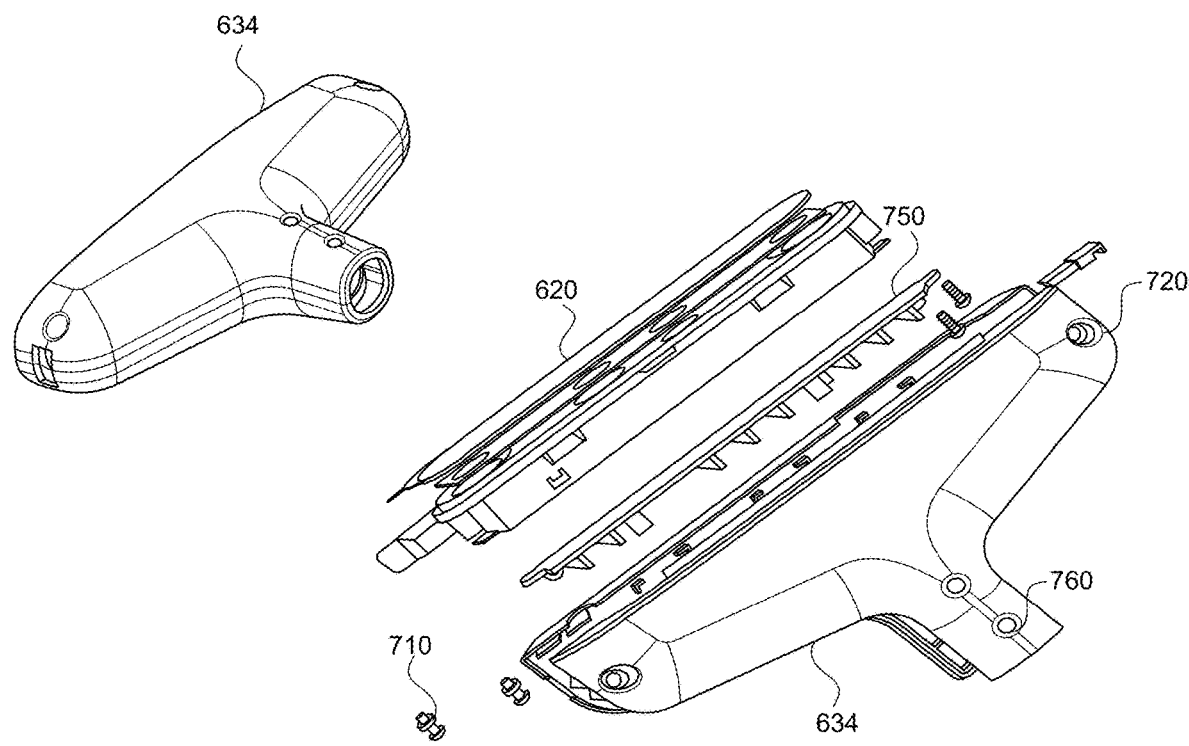
FIG. 7D includes an isolated view and an exploded view of a sensor housing, in accordance with some embodiments.

FIG. 7C is an exploded view showing a connection between a bumper 660 and a sensor housing 634, in accordance with some embodiments. FIG. 7D includes an isolated view and an exploded view of a sensor housing 634, in accordance with some embodiments. The sensor housing 634 carries a sensor 620. The sensor housing 634 includes a heat sink 750 for the sensor 620. In some embodiments, as illustrated in FIGS. 7C and 7D, the heat sink 750 is positioned directly behind the sensor 620 in order to maximize the amount of heat energy offset by the heat sink 750. In some embodiments, the sensor housing 634 includes a bumper notch 730 complementary to the ends of the bumpers 660. The bumper notch may be designed to hold the ends of the bumper 660. The sensor housing 634 may include a similar complementary holder 760 with screw holes for the sensor rod 630. In the example embodiment illustrated by FIGS. 7C and 7D, fasteners 710 may fasten a top part of the sensor housing 634, through a connection site 770 (best shown in FIG. 7A) of the bumper 660, to a bottom part of the sensor housing 634. The fasteners 710 are positioned to thread the sensor housing 634 and bumper 660 at a bumper fastener site 720. There can be both top and bottom bumper fastener sites 720 at the sensor housing 634. The bumper 660 may be secured through the fasteners 710 inserted into the connection site 770 and through the bumper notch 730.

The fasteners 710 may be screws or another type of fastener described herein, and the bumper fastener site 720 may be a screw hole or other complementary attachment site for the fastener 710. Similarly, the fasteners 710 are positioned to thread the sensor housing 634 at the complementary holder 760 for the sensor rod 630. In other embodiments, any other fastener as described herein or multiple fasteners may be used to fix the sensor housing 634 to the bumper 660. The sensor housing 634 may further include at least one tab 732 to align the top part to the bottom part of the housing.

Figure 7E:
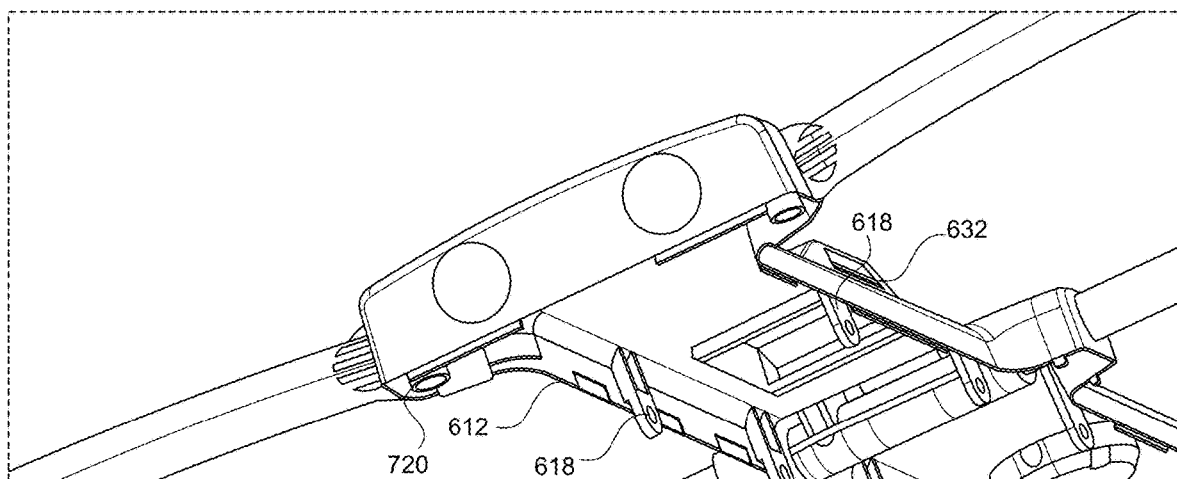
FIG. 7E is a partial view of the front end of the upper housing, in accordance with some embodiments.
Figure 7F:
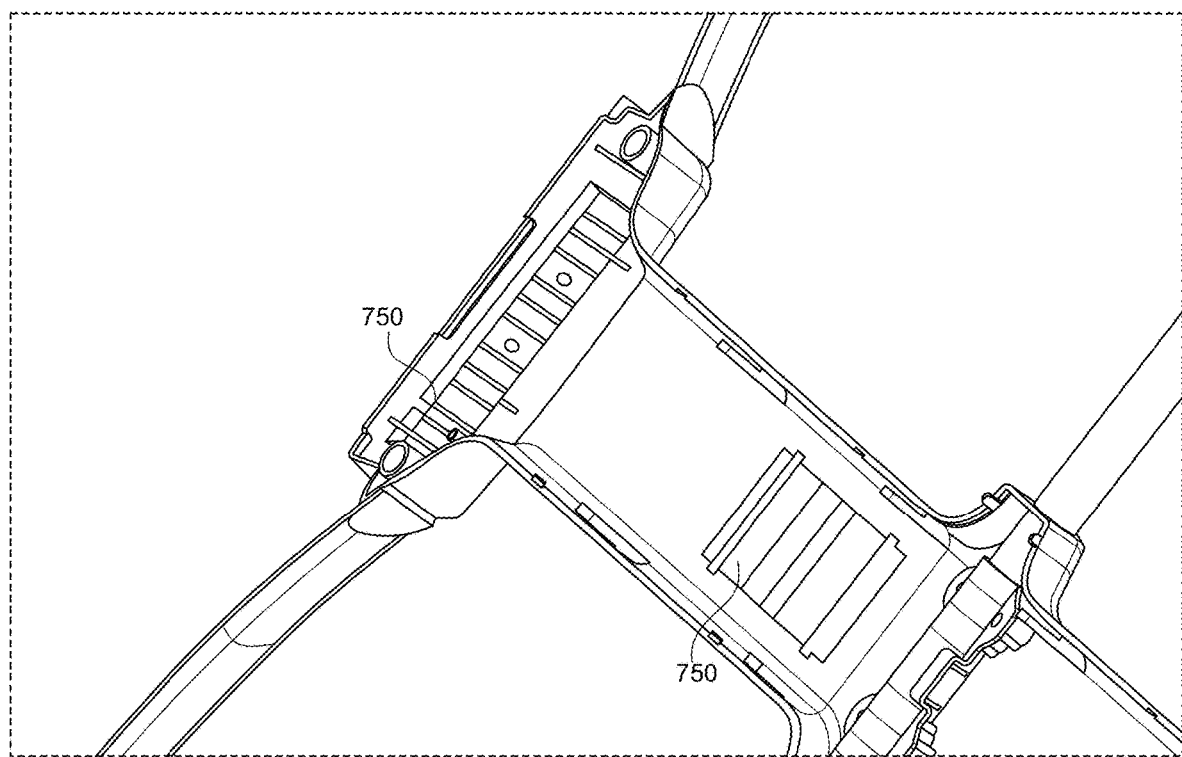
FIG. 7F is the flipped view of FIG. 7E illustrating the upper housing from the bottom view.
Figure 7G:
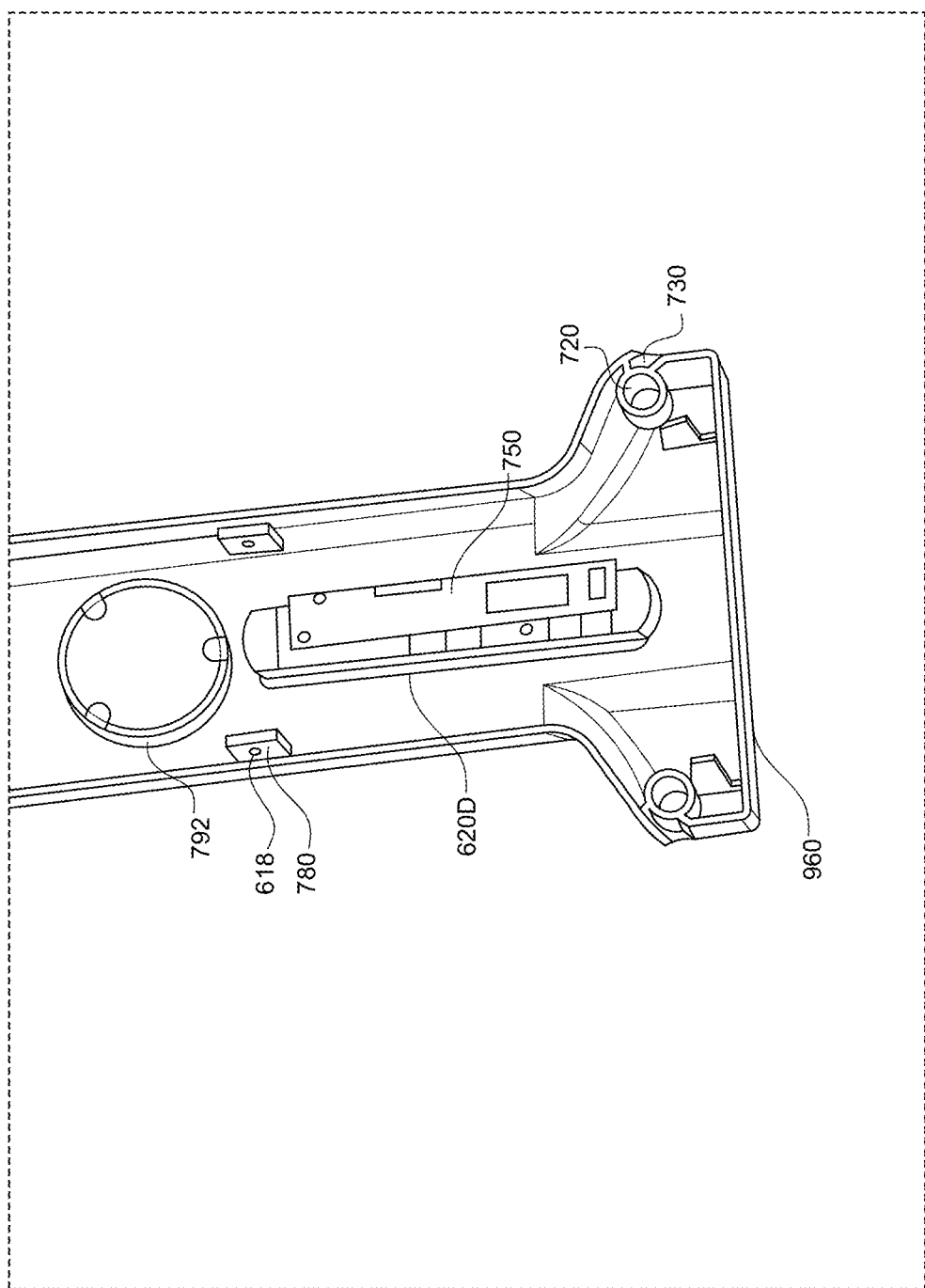
FIG. 7G is a flipped view of the rear of the upper housing, in accordance with some embodiments.

FIG. 7E is a partial view of the front end of the upper housing 612, in accordance with some embodiments. FIG. 7F is the flipped view of FIG. 7E illustrating the upper housing 612 from the bottom view. FIG. 7G is a flipped view of the rear of the upper housing 612, in accordance with some embodiments. FIGS. 7E, 7F, and 7G illustrate how various structural components may be connected and some internal components of the aerial drone 600, in accordance with some embodiments.

In some embodiments, the upper housing 612 may be connected to the lower housing 614 (not shown) through one or more attachment tabs 780 and connection sites 618. The upper housing 612 of the aerial drone 600 includes multiple attachment tabs 780 and connection sites 618. The tabs are designed to fit into complementary slots on the lower body of the aerial drone 600. Each attachment tab 780 includes a connection site 618 for a fastener to attach the upper body to the lower body. In some embodiments, the fastener is a screw that secures the lower body to the upper body through the attachment tabs 780. The attachment tabs 780 prevent the upper body from shifting in any direction away from the lower body of the drone.

In some embodiments, each sensor 620 may be paired with a heat sink 750 attached to the sensor to prevent the sensor from overheating. To further promote heat dissipation, the upper housing 612 may further carry vents 632 for cooling the sensors and inner components of the aerial drone 600.

Referring to FIG. 7G, the upper housing 612 may carry a global positioning system (GPS) 792 device. The GPS 792 may record coordinate readings for the aerial drone 600 as it is in flight. In some embodiments, the GPS 792 may record coordinates for the aerial drone 600 at a given frequency (e.g., every 1 second, every 6 seconds, every 10 seconds, etc.). The upper body carries the top depth sensor 620D. The upper body may additionally carry a heat sink 750 for the top depth sensor 620D.

The upper body of the housing 610 includes a bumper notch 730 (best shown in FIG. 7G) and bumper fastener site 720. The bumper fastener site may be complementary to a fastener. The structure may be the same or very similar to the bumper notch 730 and the bumper fastener site 720 that are described in FIG. 7C.

Figure 7H:
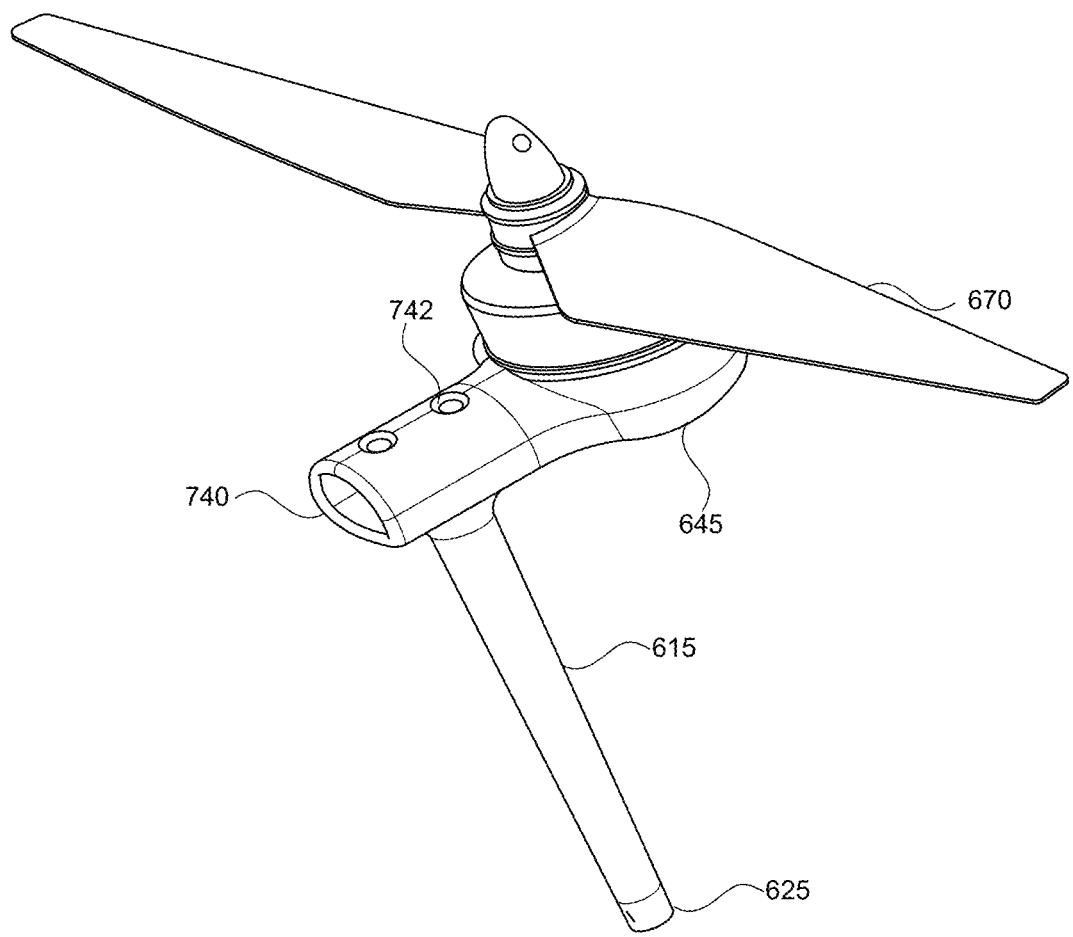
FIG. 7H is an isolated view of a propeller assembly, in accordance with some embodiments.
Figure 71:
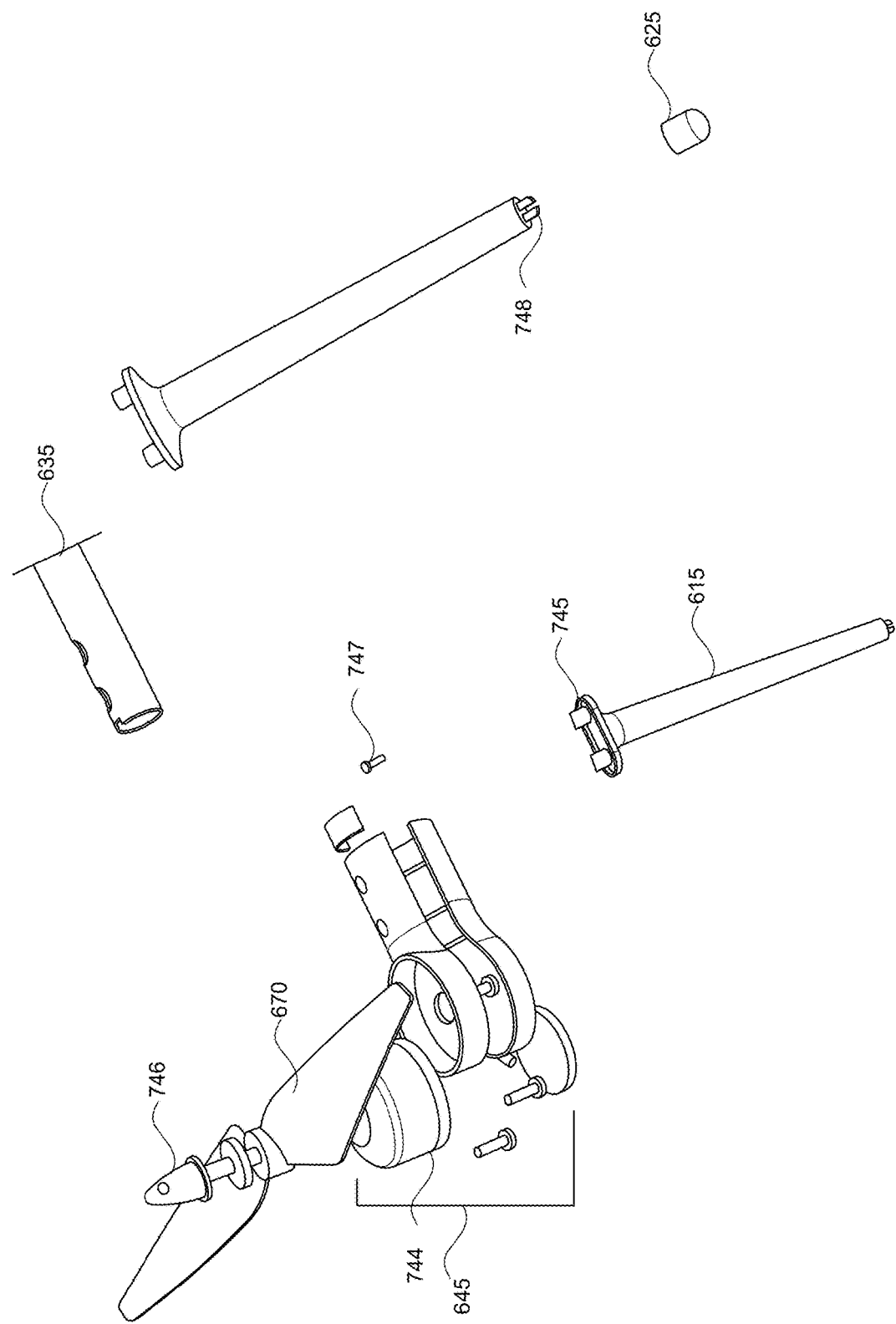
Figure 7J:
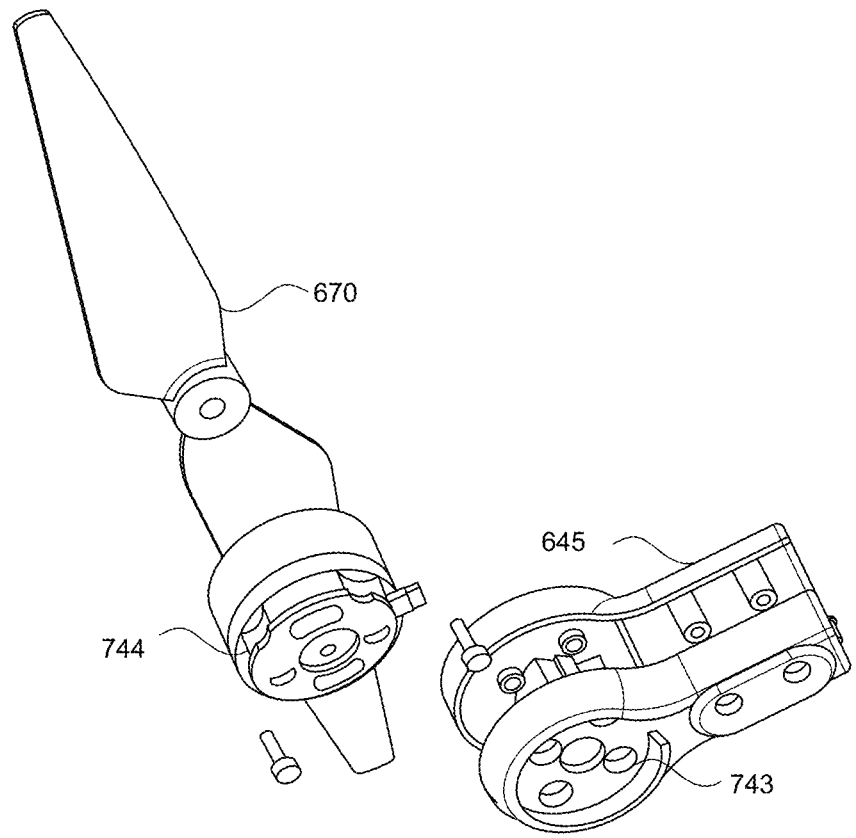

FIG. 7H is an isolated view of a propeller assembly, in accordance with some embodiments. FIGS. 7I and 7J are exploded views of various components of the propeller assembly, in accordance with some embodiments. FIG. 7H through FIG. 7J illustrates the flying and landing components of the aerial drone 600, in accordance with some embodiments. The motor rod 635 (not shown in FIG. 7H) is coupled to the motor mount 645. The motor mount 645 is carried by a motor rod attachment site 740 which includes an opening with the same diameter as the motor rod 635. The motor rod attachment site 740 carries at least one fastener site 742, preferably more than one for securement and alignment. A fastener, such as a screw 747, may secure the motor mount 645 to the motor rod 635.

The aerial drone 600 includes durable landing gear that absorbs the impact of landing without causing damage to the drone. The motor mounts 645 each carries a landing leg 615. The legs 615 may be attached to the motor mount 645 in a separate vertical plane from the motor 744 and propeller 670 in order to absorb the impact of landing without directly sending forces into the motor 744. The legs 615 are coupled to the motor mount 645 with fasteners 745. In some embodiments, such as the example illustrated by FIG. 7I, the legs are attached to the motor mount 645 with snap-in tabs, allowing the legs to be easily removed and replaced. In other embodiments, the legs may be screwed in, bracketed, glued, or any other attachment mechanism may be used. Each leg 615 is coupled to a leg tip 625. The leg tips may be rubber, plastic, metal, carbon, or any material that may soften the impact of the drone's landing. As illustrated in FIG. 7I, the leg tips 625 may be fastened by snap-in tabs 748. The leg tips 625 may be designed to be easily removable so that they are replaceable without replacing the entire leg 615 or motor mount 645. Since the legs 615 and leg tips 625 make direct contact with a surface whenever the drone 600 lands, it is beneficial that these pieces are replaceable and removable after cumulative wear over several landings.

As illustrated in FIGS. 7I and 7J, the motor mount 645 may carry a motor 744, the motor rod 635, propellers 670, and a propeller cap 746. As illustrated in 7I, the motor mount 645 carries the motor 744 coupled to the propeller 670. In some embodiments, the motor 744 is secured to the motor mount by four fasteners, such as screws. The fasteners are positioned circumferentially around the base of the motor 744, such as in the four fastener spots 743 on the motor mount 645. The fasteners may thread the bottom and top portions of the motor mount 645 as well as the motor 744, allowing for the stabilization of the position of the motor 744 in the motor mount 645.

Figure 7K:
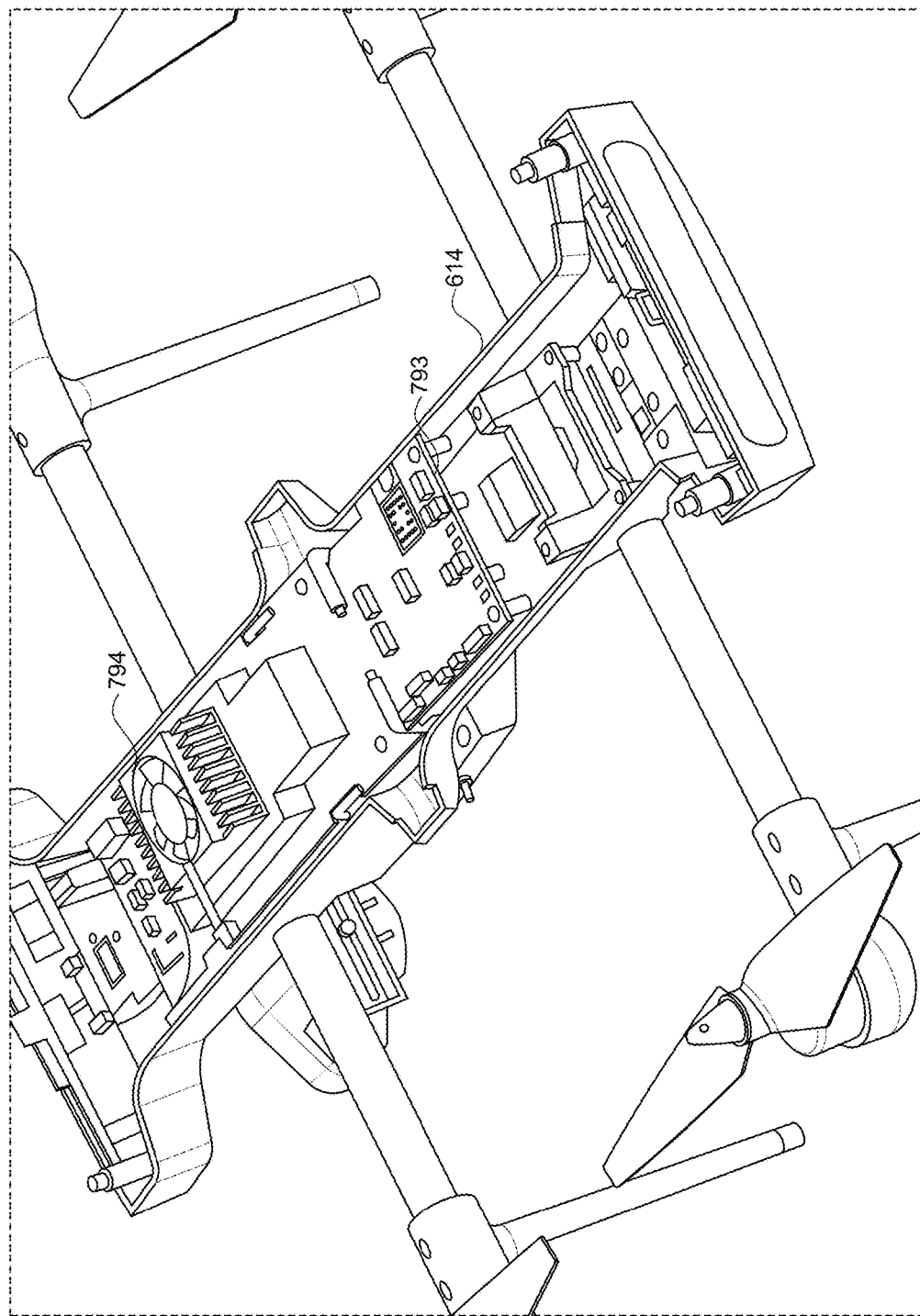
FIG. 7K is a perspective view showing the interior components of the aerial drone carried by the lower housing, in accordance with some embodiments.
Figure 7L:
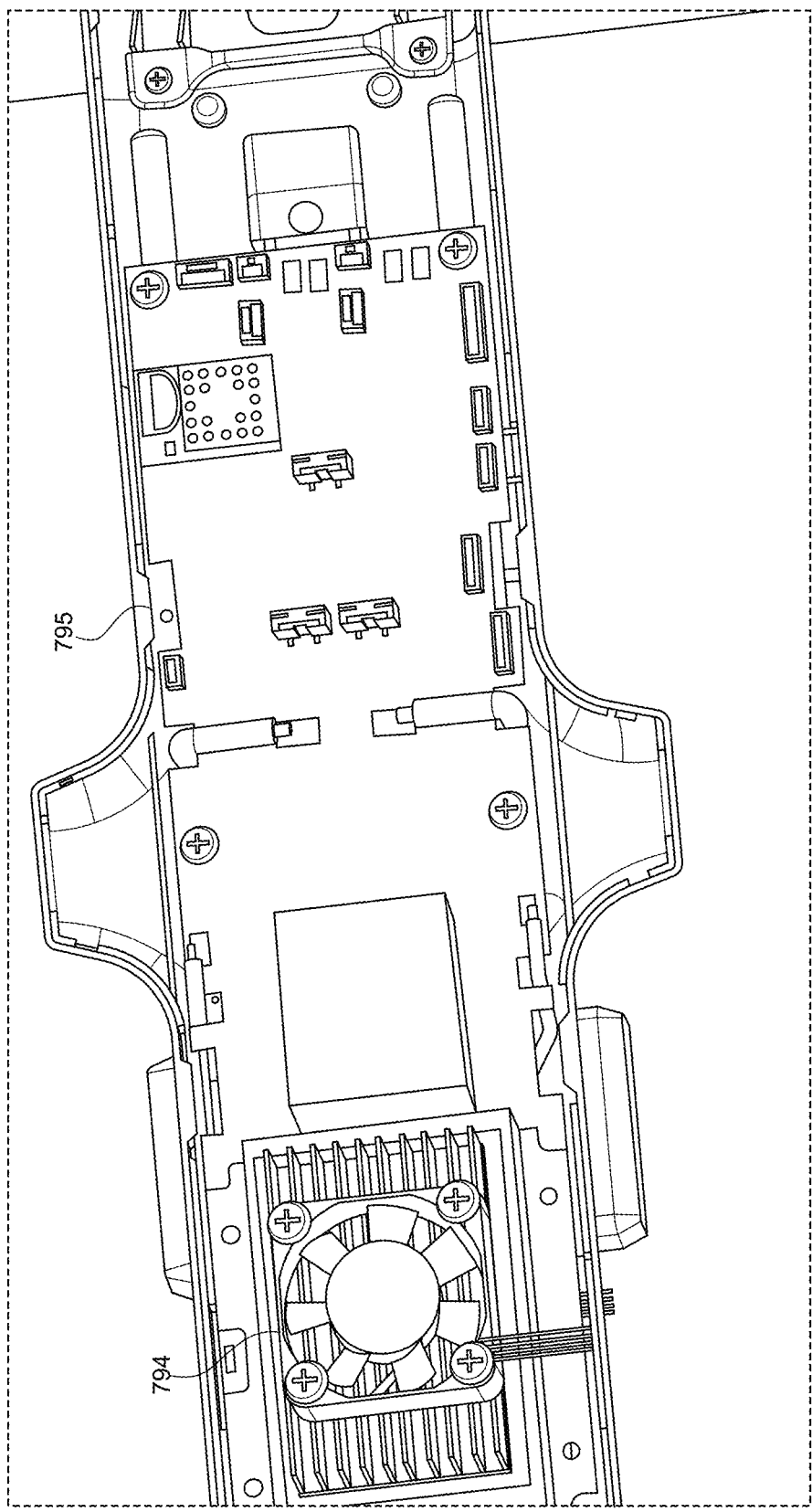
FIG. 7L and FIG. 7M are two enlarged views of the lower housing, in accordance with some embodiments.
Figure 7M:
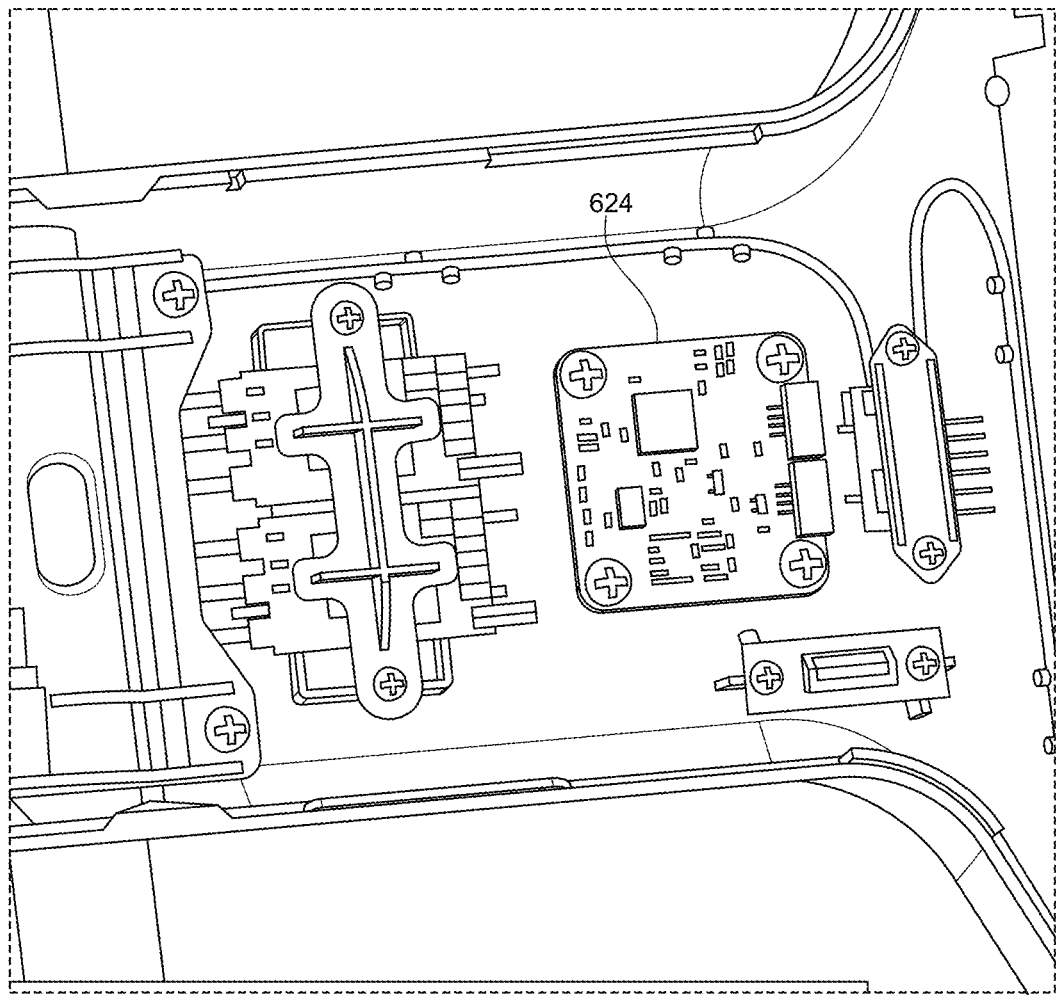

FIG. 7K is a perspective view showing the interior components of the aerial drone 600 carried by the lower housing 614, in accordance with some embodiments. FIG. 7L and FIG. 7M are two enlarged views of the lower housing 614, in accordance with some embodiments. The lower housing 614 of the aerial drone 600 may carry a processing circuit that may be referred to as a printed circuit board (PCB) 793. The PCB 793 captures inputs from the various sensors on the drone and may include one or more components described in FIG. 2. The PCB 793 may also receive flight instructions for the aerial drone 600 from a remote operating server or may include pre-programmed routines stored in the memory of the aerial drone 600. The PCB 793 may also monitor the charge level of the battery pack and the temperature of the battery pack. The lower body of the drone may include complementary slots 795 for attachment tabs 780 of the upper housing 612 (illustrated in FIG. 7E). The attachment tabs 780 are inserted into complementary slots 795, which may attach the upper body of the drone to the lower body of the drone in a fixed position through fasteners.

In some embodiments, the PCB 793 has at least one cooling fan 794 that is paired with a processor (not illustrated) under the cooling fan 794. The cooling fan 794 may be positioned beneath a vent 632 in the upper housing 612 of the aerial drone 600. The cooling fan 794 circulates cool air over the internal components of the aerial drone 600, preventing the components from overheating. As depicted in FIG. 7M, the aerial drone 600 may include at least a range finder 624. The range finder 624 may be mounted in the lower body of the drone and fastened by screws or any other fastener. On the flip side of the range finder 624, not shown, a laser is generated to measure the height of the drone 600.

Battery Attachment System

Figure 8C:
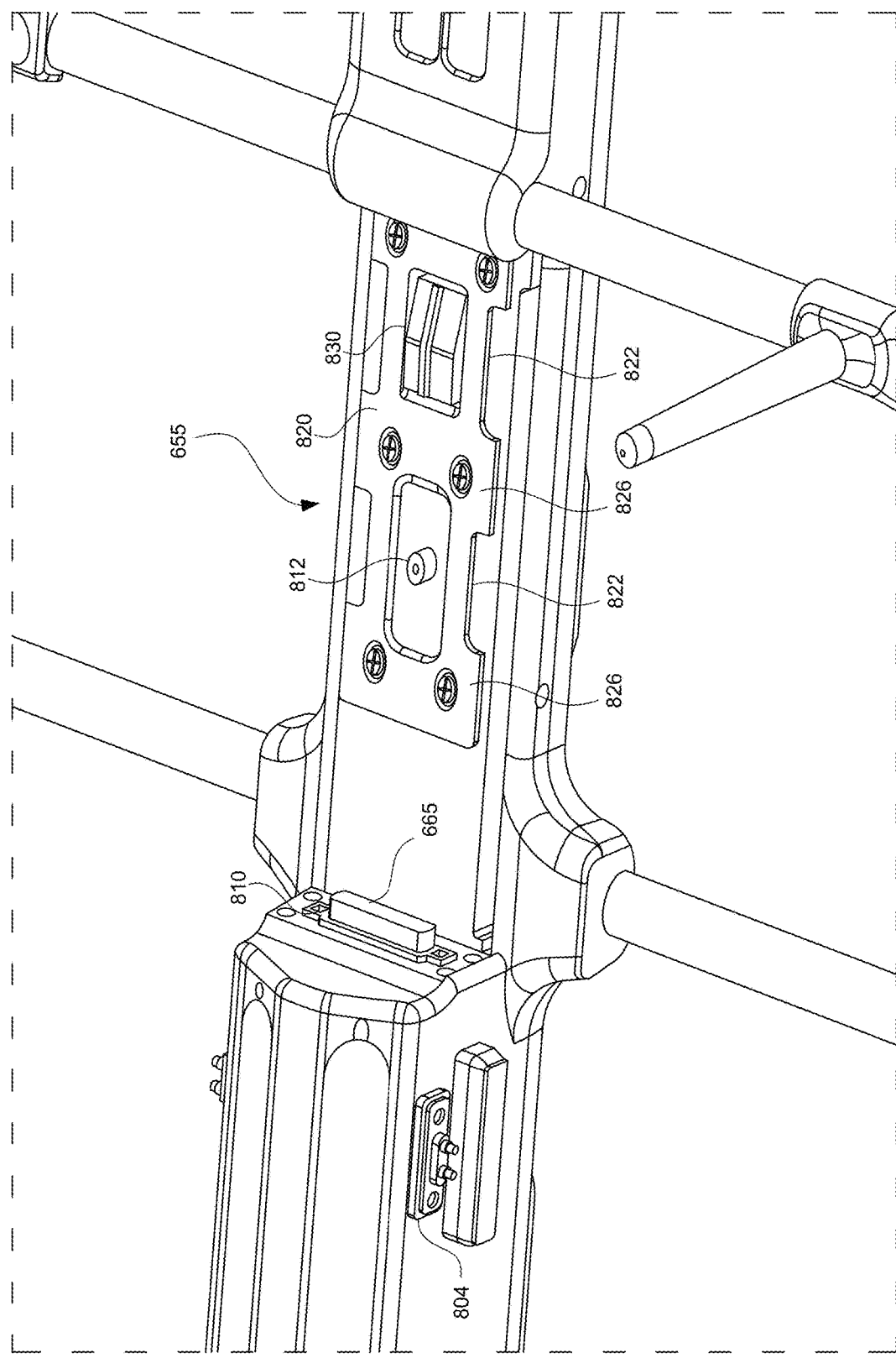
Figure 8D:
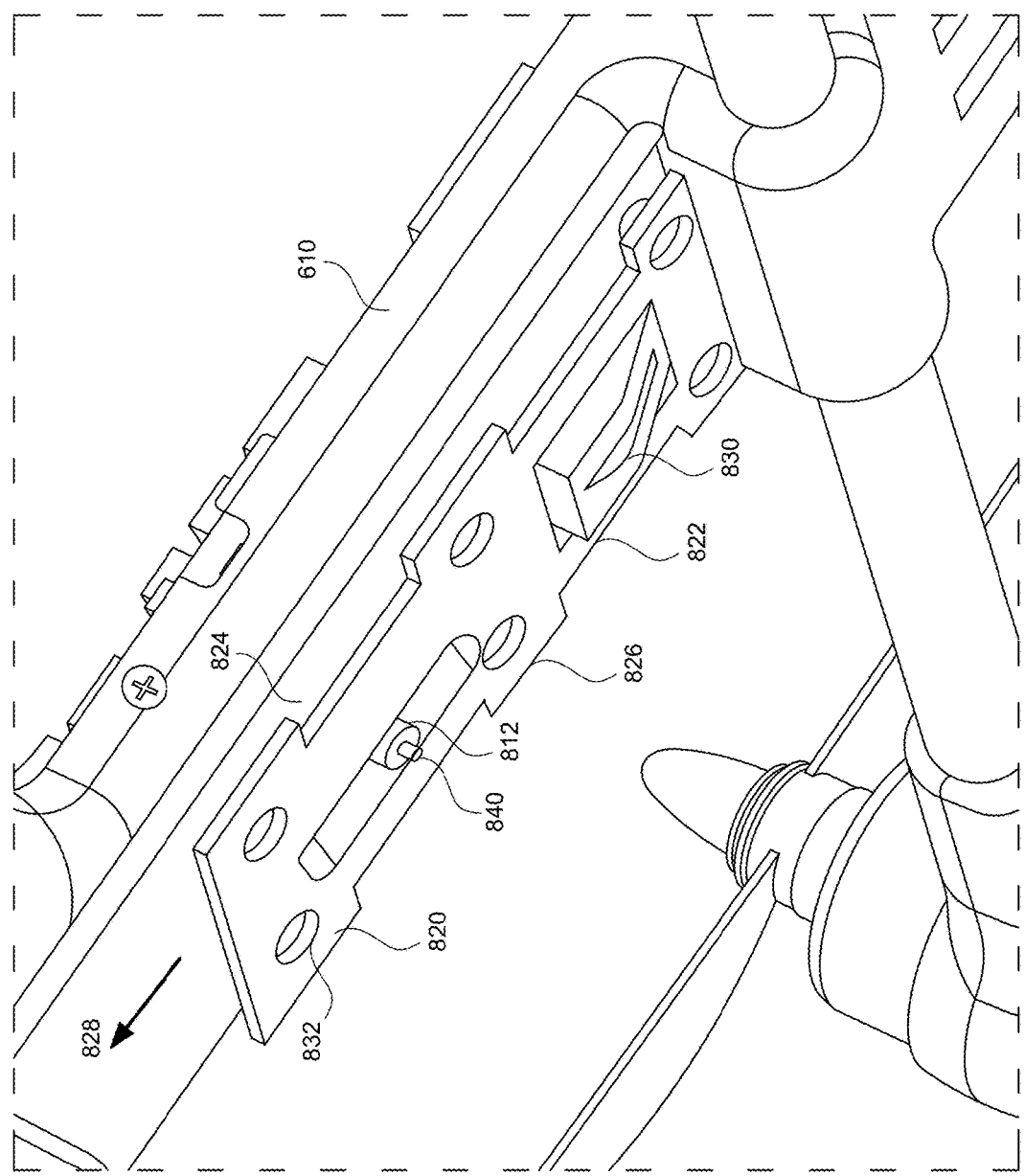

FIG. 8A is an enlarged perspective view of a flipped aerial drone 600 illustrating the bottom of the drone with a particular emphasis on the battery attachment zone 655, in accordance with some embodiments. FIGS. 8B, 8C, and 8D illustrate different angles of the battery attachment zone 655 of the aerial drone 600, in accordance with some embodiments. The battery attachment zone 655 may be recessed relative to other parts of the lower housing 614 to preserve the space for a battery pack.

In some embodiments, neighboring the battery attachment zone 655 is a processor and fan compartment 802 that carries the cooling fan 794 and the processor therein (illustrated in FIG. 7K). In some embodiments, the processor and fan compartment 802 may be located relatively centrally and may be the tallest compartment of the housing 610. As such, in some embodiments, the processor and fan compartment 802 may carry gripper tabs 690 that protrude from the sides of the processor and fan compartment 802 so that the base station 130 may grip the aerial drone 600 at one of the strongest locations and near the center of mass. For example, FIG. 8F is an internal view of the processor and fan compartment 802, in accordance with some embodiments. The interior of the processor and fan compartment 802 may include a structural reinforcement 850. The structural reinforcement 850 may allow the gripper of the base station 130 to grip the housing 610 of the aerial drone 600 tightly. The gripper tabs 690 may be a rubber material, metallic, carbon, or any other material that is sturdy. The gripper tabs 690 may help to position and secure the aerial drone 600 upon landing.

The processor and fan compartment 802 may carry communication port 804. In some embodiments, the communication port 804 may serve multiple purposes. In some cases, communication port 804 may serve as a detector for the base station to detect that a gripper has mated with the gripper tabs 690. In some cases, the communication ports 804 provide electrical charge to a battery pack connected through the battery connection port 665. The communication ports 804 may transmit power from the base station 130 to the aerial drone 600 to allow the aerial drone 600 to recharge a battery pack or continue to provide power to the aerial drone 600 while the aerial drone 600 is undergoing a battery swap. In some cases, the communication port 804 may also include data transmission pins for the base station 130 to download data captured by the aerial drone 600 while a battery swap operation is performed.

The aerial drone 600 may benefit from having a swappable battery pack that can be swapped the aerial drone 600 is landed on the base station 130. Referring to FIGS. 8B, 8C, and 8D, in some embodiments, the battery attachment zone 655 may include port contact sensors 810, a slide guide 820, a slide-guide contact sensor 812, and a battery latch 830, and a battery connection port 665. The battery attachment zone 655 allows a battery pack to be pushed toward the housing 610, thereby triggering the slide-guide contact sensor 812. The slide guide 820 provides a mechanical support for the battery pack and guides the battery pack to slide longitudinally toward the battery connection port 665. The port contact sensors 810 detects the connection between the battery connection port 665 and the battery pack. The battery latch 830 may be spring loaded and latch the battery pack to prevent the battery pack from sliding away from the battery connection port 665. The detailed structure and mechanism of a battery installation are described below. In some embodiments, the slide-guide contact sensor 812 and a port contact sensor 810 are arranged at two different angles (e.g., perpendicular) to detect contact of the battery pack in two directions.

In some embodiments, the slide guide 820 may take the form of a bracket, such as a bracket that is strong and rigid. The slide guide 820 may also be referred to as a bracket. The bracket may be made of a metal (including an alloy), a hard plastic, or another suitable material. The slide guide 820 may be shaped to include a series of alternating slots 822 and ledges 826. The alternating distance may complement the tabs on a battery pack. In some embodiments, the slide guide 820 suspends from the surface of the lower housing 614 of the aerial drone 600. Suspension does not necessarily imply that the slide guide 820 is below the housing 610. In some embodiments where the battery attachment zone 655 is not at the bottom of the housing 610, suspension may mean the slide guide 820 is distanced from the housing 610. The suspension of the slide guide 820 creates a channel 824 (best shown in FIG. 8D, a small space between the slide guide 820 and the housing 610) between the housing 610 and the slide guide 820. The slide guide 820 may be carried the housing 610 with one or more fasteners. The fasteners have complementary fastener sites 832 that allow for a fastener to enter and secure the slide guide to the lower body.

Referring to FIG. 8D, in some embodiments, to attach a battery pack, the battery pack may push vertically toward the housing 610 when the tabs of the battery pack align with the slot 822 of the slide guide 820. At this stage, the battery pack also depresses battery latch 830, which is spring-loaded. The slide-guide contact sensor 812 detects that the battery pack is in contact with the surface of the lower housing 614 (e.g., at the proper height) and the aerial drone 600 transmits a signal to the base station 130 to indicate that the battery pack is at the proper height. The battery pack may slide horizontally on the slide guide 820 towards the battery connection port 665 (indicated by the arrow 828 in FIG. 8D), away from the battery latch 830 and towards the battery connection port 665. The slide guide 820 locks the battery pack in vertically through the matching of the ledges 826 and the tabs of the battery pack. As the battery pack is sufficiently pushed in, the battery latch 830 is released to the original position and latches the battery pack, preventing the battery pack from sliding horizontally. The slide guide 820 is configured to prevent the battery pack from moving in a first direction (e.g., vertical) and the battery latch is configured to prevent the battery pack from moving in a second direction (e.g., horizontal).

Referring to FIG. 8C, the battery attachment system at the battery attachment zone 655 may include port contact sensors 810 on either or both sides of the battery connection port 665. The port contact sensors 810 may detect whether the battery pack is slid into the battery connection port 665. The port contact sensors 810 may enable the flow of electrical current from the charging ports 804 to the battery connection port 665, enabling the battery pack to power the aerial drone 600 and to recharge while loaded on the drone. The port contact sensors 810 may provide further stability to the connection between the battery connection port 665 and the battery pack.

Figure 8E:
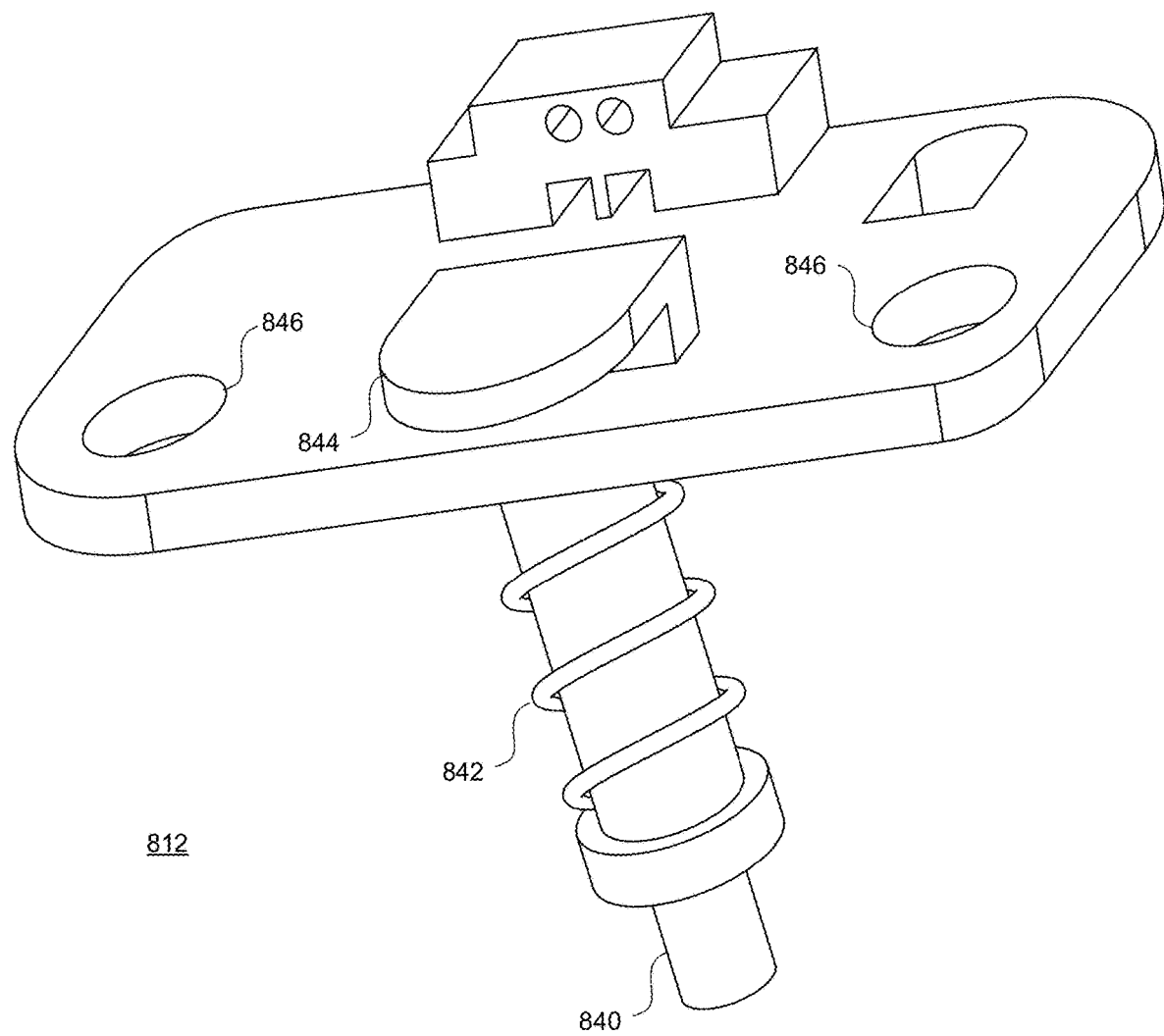
FIG. 8E is an isolated view of a slide-guide contact sensor, in accordance with some embodiments.
Figure 8F:
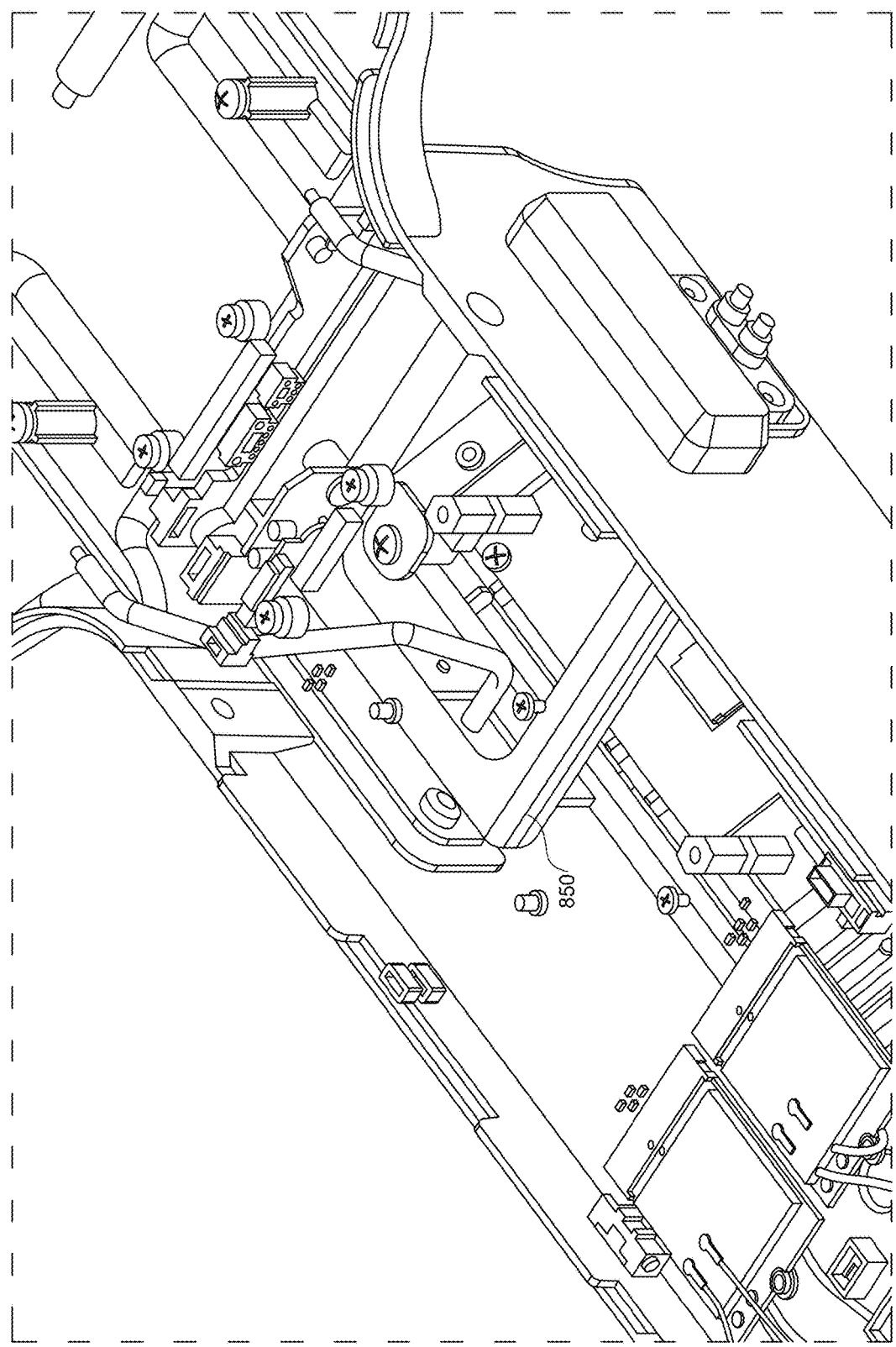
FIG. 8F is an internal view of the processor and fan compartment, in accordance with some embodiments.

FIG. 8E is an isolated view of a slide-guide contact sensor 812 illustrating one example mechanism of the slide-guide contact sensor 812, in accordance with some embodiments. In various embodiments, the slide-guide contact sensor 812 may use other types of sensors to detect the contact between a battery pack and the sensor. For example, in some embodiments, the slide-guide contact sensor 812 may be a pressure sensor, a capacity sensor, a force sensor, a proximity sensor, an infrared sensor, etc.

In some embodiments, the slide-guide contact sensor 812 includes a contact point 840 that protrudes from a central area of the slide guide 820. The battery pack, when loaded at the proper height, compresses the contact point 840. The contact point 840 is carried by a proximity spring 842. Upon compression, the spring pushes the tab 844. When the spring 842 is relaxed, the tab 844 sits between two circuit contacts 846. The circuit contacts 846 maintain a steady circuit connection between one another until the tab 844 is displaced, breaking the circuit. The broken circuit on the slide-guide contact sensor 812 indicates that a battery pack is positioned at the proper height to be loaded to the battery connection port 665.

Example Battery Pack

Figure 8G:
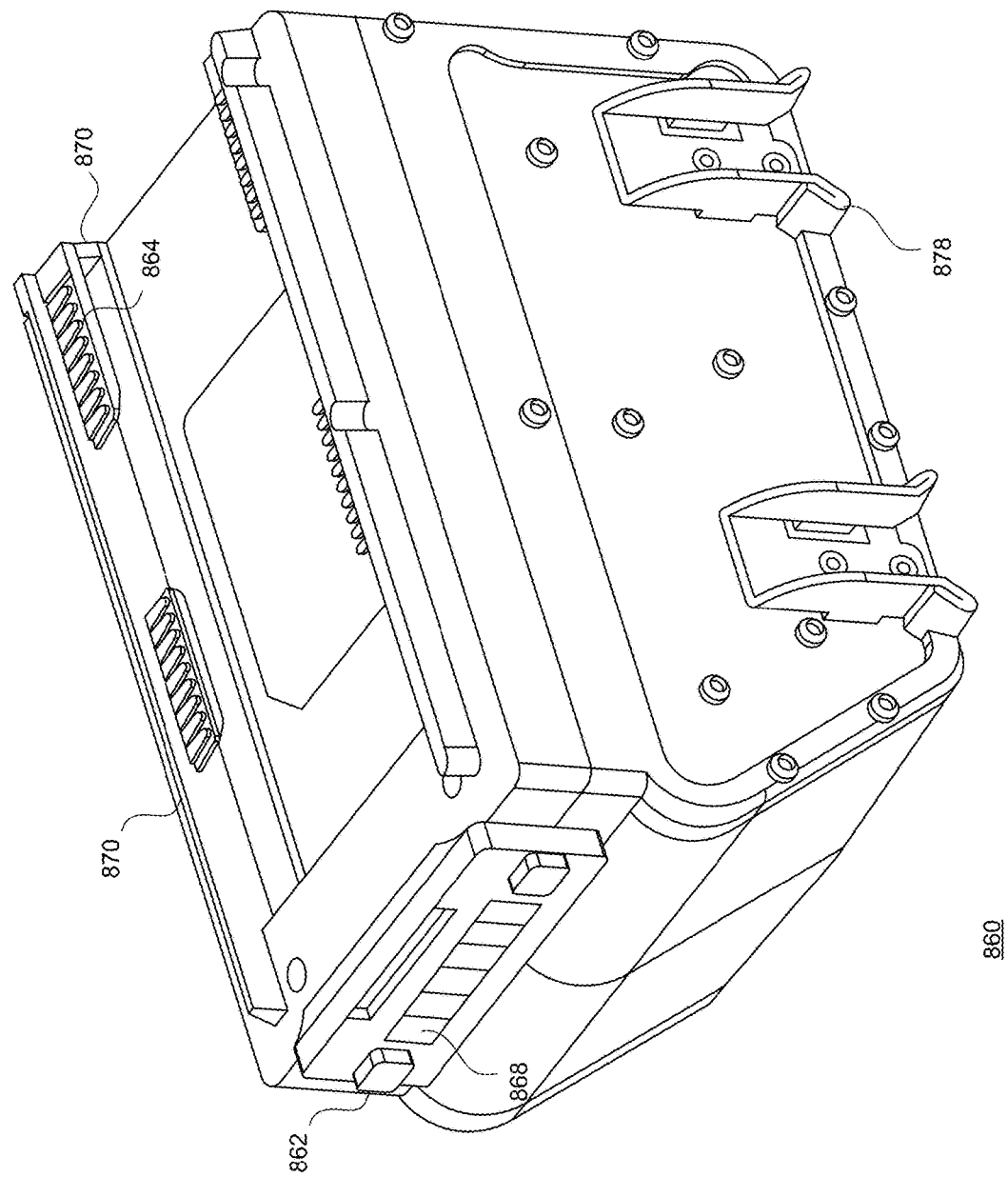
FIG. 8G is a perspective view of a battery pack, in accordance with some embodiments.

FIG. 8G is a perspective view of a battery pack 860, in accordance with some embodiments. FIG. 8H is an internal view of the battery pack 860, in accordance with some embodiments. The battery pack 860 carries tabs 864 complementary to the slots 822 on the slide guide 820 carried by the drone. When the battery pack 860 is at a proper height, the top surface of the battery pack compresses the slide-guide contact sensor 812. The battery pack carries battery port contacts 862 that compress the battery port contact sensors 810 when the battery pack is slid into the battery connection port 665. The battery pack carries a battery port connector 868 that complements the design of the battery connection port 665 for connection. The tabs 864 may carry the battery pack 860 in a fixed position on the aerial drone 600 and support the weight of the battery pack 860. For example, when the battery pack 860 is connected to the battery connection port 665, the tabs 864 are located at the ledges 826 of the slide guide 820. The ledges 826 support at least part of the weight of the battery pack 860 by holding the tabs 864. Additionally, or alternatively, the battery pack may include one or more walls 870 that serve as hard stops for the battery pack in both vertical and horizontal directions.

As illustrated in FIG. 8H, the battery pack 860 includes a housing 866 that internally carries a set of battery cylinders 872. The battery pack may carry a temperature sensor 874 on one or more of the battery cylinders to monitor any heating of the batteries. In some embodiments, the battery pack includes a PCB 876 for monitoring the battery pack's available charge and temperature and communicating with other devices. The battery pack may include a set of external tabs 878 to be inserted by fingers of a battery pack carrier from the base station 130 for transportation and automatic mounting of the battery pack.

While in the embodiments shown in the figures the port contact sensors 810 and the slide-guide contact sensor 812 are shown to be carried by the aerial drone 600, in other embodiments, the sensors may also be carried by the battery pack 860.

Example Base Station Structure

Figure 9B:
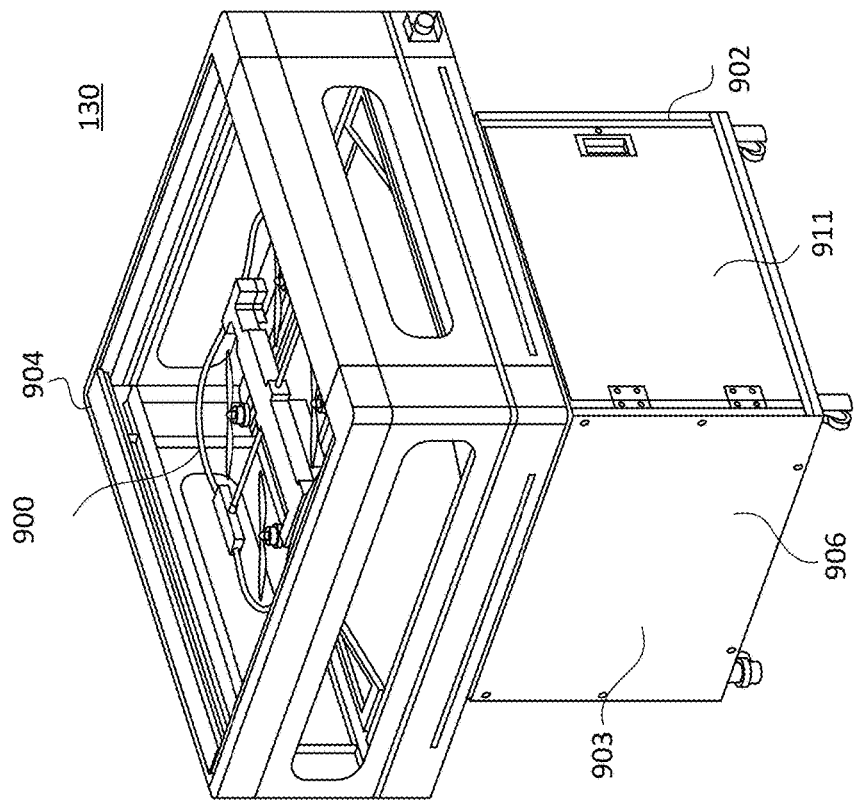
FIG. 9B is a second perspective view of the base station with the drone landed on the base station, in accordance with some embodiments.
Figure 9A:
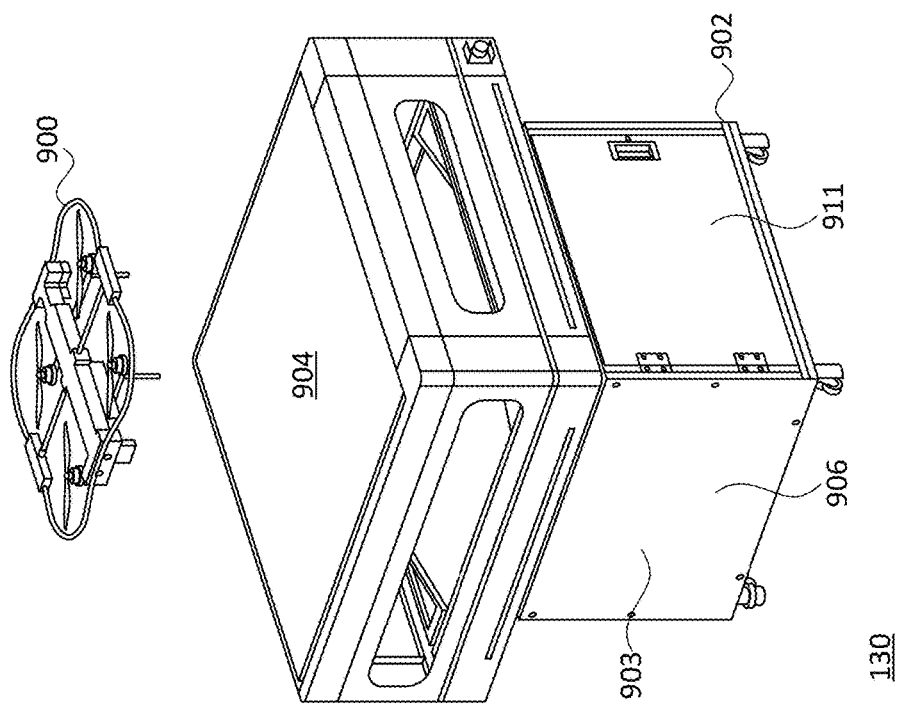
FIG. 9A is a first perspective view of the base station, in accordance with some embodiments.
Figure 9C:
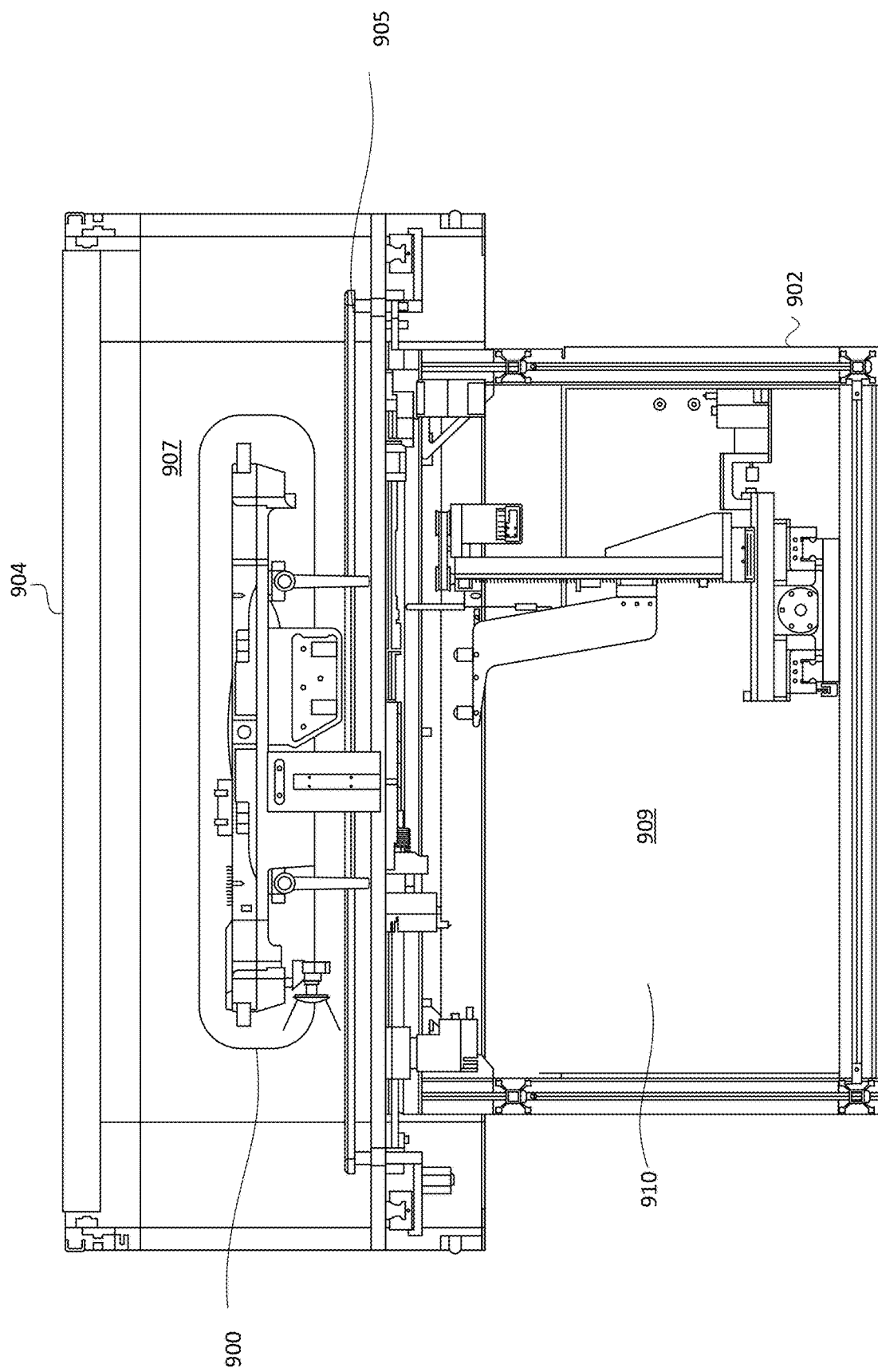
FIG. 9C is a side internal view of the base station that shows the configuration when the drone is parked and secured at the base station, in accordance with some embodiments.
Figure 9D:
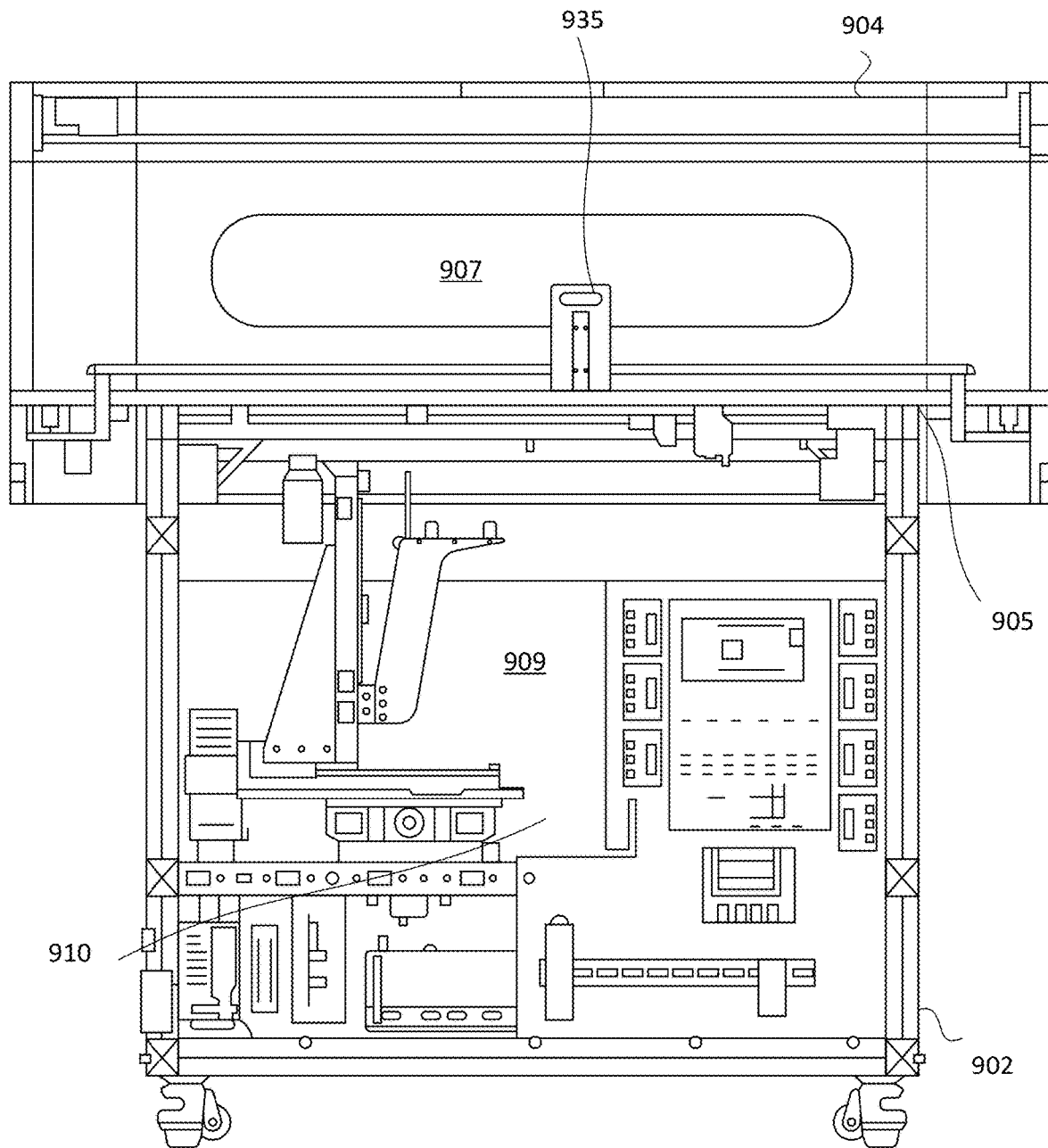
FIG. 9D is a side internal view of the base station without a drone and provides focus on one example of components arrangement of the base station, in accordance with some embodiments.

FIG. 9A is a first perspective view of the base station 130 with a retractable cover 904 closed and the drone 900 hovering above base station 130, in accordance with some embodiments. FIG. 9B is a second perspective view of the base station 130 with the drone 900 landed on the base station 130, in accordance with some embodiments. The drone 900 is an example of an aerial drone 600 or a robot 120. FIG. 9C is an internal side view of the base station 130 that shows the configuration when the drone 900 is parked and secured at the base station 130, in accordance with some embodiments. FIG. 9D is an internal side view of the base station 130 without a drone 900 and provides focus on one example of the components arrangement of the base station 130, in accordance with some embodiments. FIG. 9A through FIG. 9D are discussed in conjunction with one another.

In various embodiments described in various figures of the base station 130 below, the base station 130 may include different, fewer, or additional components. Also, while each of the components in the base station 130 is described in a singular form, the base station 130 may include one or more of each of the components.

By way of example, the base station 130 includes a frame 902, one or more walls 906 supported by the frame 902, a cabinet 903 that may include the enclosure volume defined by the various walls 906 of the base station 130, and a retractable cover 904. The frame 902 provides mechanical supports to the walls 906, which define an enclosure 910 (best shown in FIGS. 9C and 9D) for housing one or more internal components of the base station 130. The internal components may include a battery pack carrier 912, whose structure will be discussed in detail below in FIGS. 16A and 16B. In some embodiments, the base station 130 may include two or more compartments. For example, in the example embodiments shown in FIG. 9C and FIG. 9D, the base station 130 may include a top compartment 907 and a bottom compartment 909. The top compartment 907 may provide the space for the drone 900 to park while the bottom compartment 909 may carry internal battery swapping and charging components and temperature regulation components that will be discussed in detail below. In some embodiments, the cabinet 903 may refer to any space of the base station 130 and may include the top compartment 907 and bottom compartment 909. In the particular example arrangement shown in the figures, the bottom compartment 909 may correspond to the enclosure 910.

In this disclosure, directional terms such as top, bottom, left, right, longitudinal, and lateral are relative terms and may simply be referred to as a first direction, the second direction, etc. For example, in other embodiments not shown in the figures, the top compartment 907 may be located at the bottom and the bottom compartment 909 may be located at the top, or the two compartments may be located side by side. In various embodiments, the base station 130 may be divided into any other suitable divisions such as top and bottom, left and right, specific quadrants, or other identifiable, symmetrical or not, regular or irregular, regions.

The top compartment 907 may include the space for one or more drone 900 to park. In the specific embodiments shown, the drone 900 takes the form of an aerial drone so that the compartment 907 is located at the top side of the base station 130, but in other embodiments where the robot 120 may take different forms such as a land vehicle, the compartment 907 may be located differently and may be referred to as a parking compartment. In the particular arrangement shown in FIG. 9C and FIG. 9D, the top compartment 907 may carry a retractable cover 904. In some embodiments, the top compartment 907 is sized according to the wingspan of the drone 900 such that after landing the drone 900 is completely inside the length and width of the top compartment 907, and can fit under the retractable cover 904. While the figures in this disclosure show a single drone base station configuration, in some embodiments, the base station 130 may simultaneously hold more than one drone 900 and various components described herein may be repeated for servicing multiple drones. The retractable cover 904 may be used to protect the drone 900 from dust and other debris from the storage site. The retractable cover 904 may also protect the drone 900 from any leaks or runoff within the storage site, as well as from any damage from people around the storage site. The top compartment 907 includes walls which surround the landing spot for the drone, as well as the retractable cover 904 which can roll and unroll across the top opening. The retractable cover 904 may be opened or closed and operated by a motor (not shown in the figures). Alternatively, or additionally, the retractable cover 904 may take the form of a manually operated cover, a cover which hinges instead of rolls, and a cover which folds back in sections, etc.

The frame 902 is configured to provide mechanical support to the base station, such as the bottom compartment 909. The frame 902 may include metal extrusions which are joined together at 90-degree angles to form a rectangular frame. The walls 906 attached to the frame may form the cabinet 903. One of the walls 906 may be a parking plate 905 that divides the cabinet 903 into the top compartment 907 and bottom compartment 909. In some embodiments, the bottom compartment 909 is enclosed by the parking plate 905 and other side walls and may be referred to as the enclosure 910. One of the walls 906 may be a side door 911 that is pivotally mounted to the frame 902 and provides access to the internal components carried in the enclosure 910.

In some embodiments, the frame 902 may be formed from any material which supports the weight of the base station, providing the enclosure as well as support for the landing spot for the drone. The frame 902 may include casters, with integrated adjustable leveling pads, to allow for easy relocation within a space and which support the total weight of the base station 130. The enclosure 910 may be of any shape that fits within the frame 902.

In some embodiments, the parking plate 905 may take the form of the top cover of the enclosure 910. Depending on the arrangement in various embodiments, the parking plate 905 may be referred to as the top plate despite typically being below the retractable cover 904, a landing plate, or another suitable name. The parking plate 905 and one or more additional walls 906 form the enclosure 910 for one or more internal components of the base station 130. The enclosure 910 may allow a regulated environment for temperature and other battery control. In various embodiments, the enclosure 910 may or may not correspond to the bottom compartment 909. For example, in some embodiments, the bottom compartment 909 may include more than one enclosure 910 that serves as different temperature-regulated zones.

The bottom compartment 909 may include computers and sensors which manage the operation of the battery pack carrier, the various motors and sensors, and the battery management system. In some embodiments, the base station 130 includes a temperature sensor carried within the enclosure 910 of the cabinet 903. The temperature sensor is configured to measure a temperature with the enclosure 910 of the cabinet 903. In some embodiments, the base station 130 includes a temperature regulator configured to regulate the temperature within the enclosure 910 of the cabinet 903 to maintain the temperature of battery packs 860 charged at the battery charging sites 1510 within a temperature range. The temperature regulator may be an air mover (e.g., a fan), a heat exchanger, a liquid cooling system, a heatsink, a heater or a combination thereof.

Example Drone Alignment Mechanism

Figure 9E:
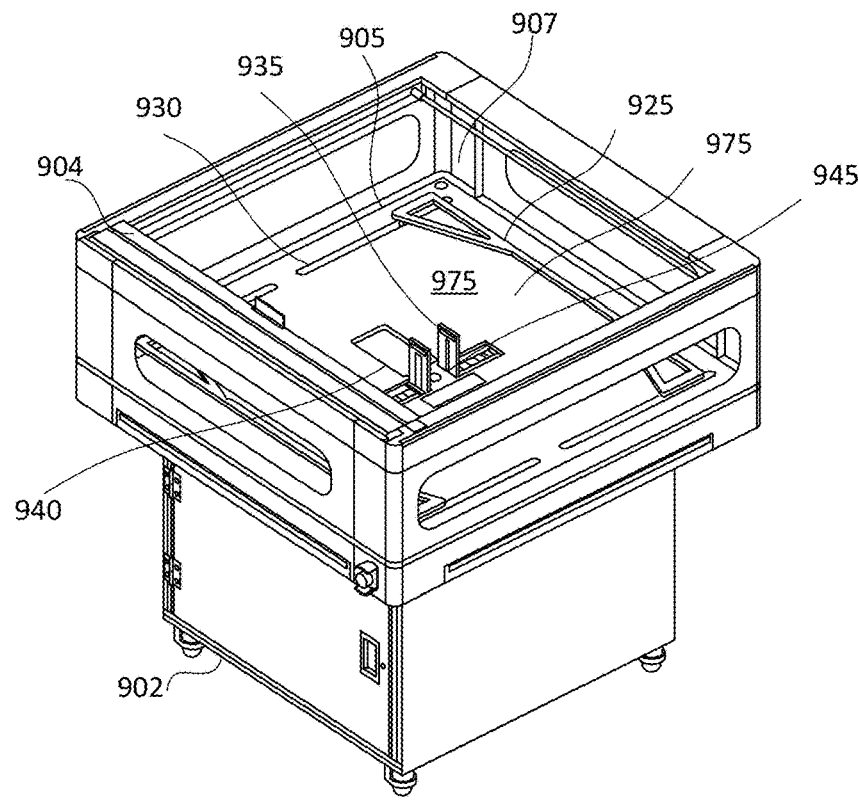
FIG. 9E is a top-perspective view of the base station with a view of the parking plate without a drone, in accordance with some embodiments.
Figure 9F:
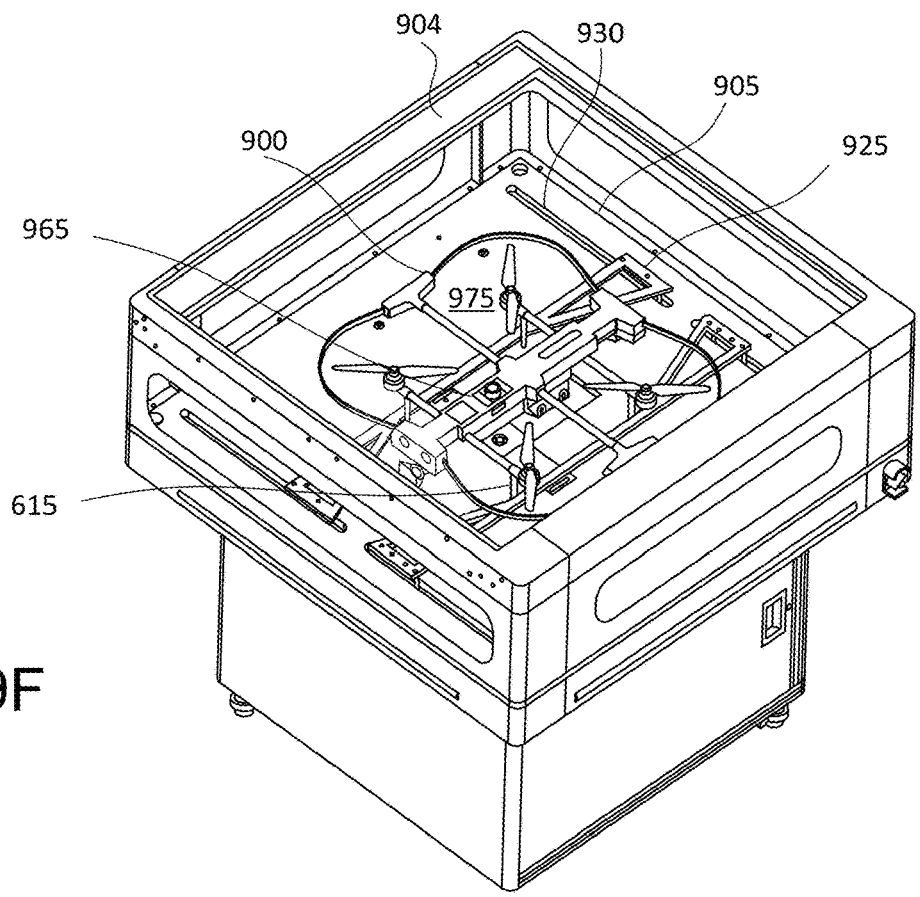
FIG. 9F is a top-perspective view of the base station with a view of the parking plate with the drone, in accordance with some embodiments.
Figure 9G:
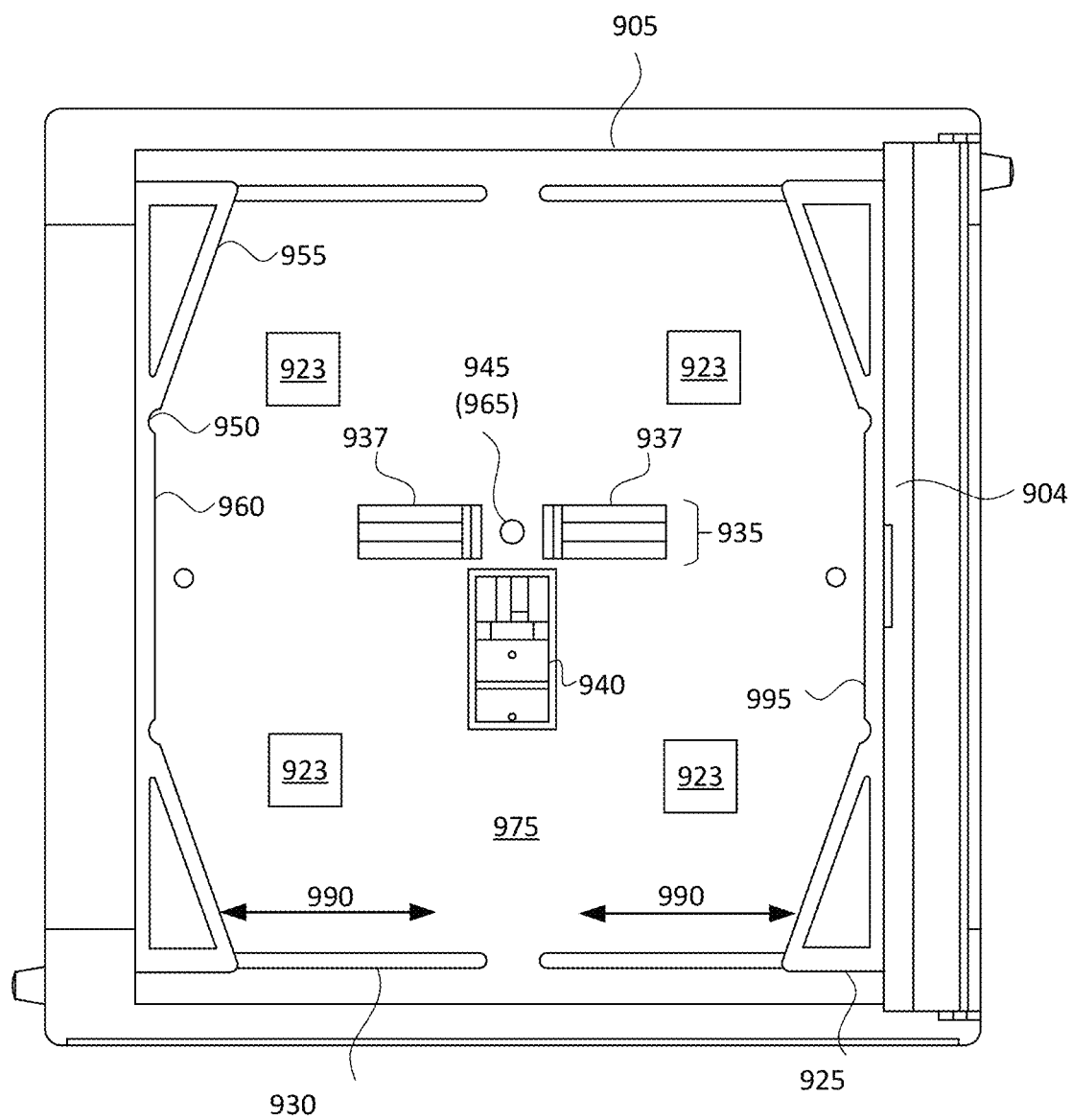
FIG. 9G is a top view of the base station with a focus on the surface structure of the parking plate without a drone, in accordance with some embodiments.

FIG. 9E is a top perspective view of the base station 130 with a view of the parking plate 905 without a drone 900, in accordance with some embodiments. FIG. 9F is a top perspective view of the base station 130 with a view of the parking plate 905 with the drone 900, in accordance with some embodiments. To better illustrate various components, the perspective view of FIG. 9F is turned 90 degrees compared to that of FIG. 9E. FIG. 9G is a top view of the base station 130 with a focus on the surface structure of the parking plate 905 without a drone 900, in accordance with some embodiments. FIGS. 9E, 9F, and 9G are discussed in conjunction with one another to illustrate certain structural components of the base station 130 that assist the alignment of a drone 900, in accordance with some embodiments.

The parking plate 905 has two surfaces opposing each other. One of the surfaces is the top-facing surface that may be referred to as the landing surface 975, which may form part of the walls of the top compartment 907. Another surface is the bottom-facing surface that may be referred to as a component-carrying surface and is not illustrated in FIG. 9E through FIG. 9G but will be shown in FIG. 15A later in this disclosure. The landing surface 975 is configured to receive and to be in contact with the aerial drone 900 when the aerial drone 900 is landed. For other versions of the robot 120 that may not be aerial drone 900, the landing surface 975 may also be referred to as a parking surface or a top surface of the parking plate 905.

The base station 130 may include different sets of components that help the drone 900 to be aligned and secured to the base station 130 so that drone 900 is fixed at a predetermined position and orientation to allow the charging port to be connected and/or battery pack to be swapped. By way of example, the base station 130, on the parking plate 905, may include one or more landing markers 923, one or more pushers 925, and tracks 930, a gripper 935, a shutter 940. As it will be discussed in further detail below, the one or more landing markers 923 provide targeted patterns and guides for the sensors carried on the drone 900 to identify the base station 130 and land on the parking plate 905. In turn, the pushers 925 may provide, as a first round of alignment, a coarse alignment that pushes the drone 900 towards a reference point such as the center of the parking plate 905 or where the alignment sensor 945 is located. The alignment sensor 945 may provide, as a second round of alignment, a fine alignment that detects whether the drone 900 is in the target position. The gripper 935 may include a rigid grip that will further align and secure the drone 900. The shutter 940 may create an opening that allows the drone 900 to communicate with the bottom compartment 909, which may be the component-carrying compartment of the base station 130.

In some embodiments, the landing surface 975 of the parking plate 905 may include one or more landing markers 923 printed on the surface. The actual patterns of the landing markers 923 are not illustrated and the one or more landing markers 923 are conceptually illustrated in FIG. 9G as one or more rectangles. Each landing marker 923 may take the form of a customized pattern such as a QR code that allows the drone 900 to use its cameras or other sensors to identify the base station 130 and initiate the landing. The locations of the one or more landing markers 923 shown in FIG. 9G are for illustration only. In some embodiments, the landing surface 975 may not include any landing marker 923 and the drone 900 and the base station 130 may rely on the alignment sensor 945 to perform both landing operation and fine alignment.

After the drone 900 has landed, the base station 130 may cause various alignment components to start moving to align the drone 900 to the desired position and orientation. In some embodiments, the drone 900 may communicate to the computer that controls the base station 130 indicating the drone 900 has landed. Alternatively or additionally, the base station 130 may have one or more sensors (not shown in the figures), such as a weight sensor to detect and/or confirm that the drone 900 has landed. In some embodiments, the alignment sensor 945 may have a landing envelope that determines whether the drone 900 has landed, as discussed below.

In some embodiments, the base station 130 includes a plurality of pushers 925 slidable on the parking plate 905. The pushers 925 may also be referred to as guides or centering guides. In some embodiments, using the various sensors discussed in FIG. 2, a drone 900 may have a landing accuracy of a certain range (e.g., in the range of 20 cm) from a reference location (e.g., the center or where the alignment sensor 945 is located) of the parking plate 905. The pushers 925 are configured to push the legs 615 of the drone 900 to move the aerial drone 900 towards the reference location 965 on the parking plate 905. Each of the pushers 925 has a leg notch 950 that is sized and shaped compatible with the leg 615. For example, a leg notch 950 may be a curvature that is configured to receive a leg 615. Each of the pushers 925 is configured to slide within a track 930 on parking plate 905. In some embodiments, the pushers 925 are on opposing sides of parking plate 905 such that the pushers 925 contract toward the middle of the parking plate 905 to push the drone 900 towards the reference location 965. The pushers 925 may push drone 900 into a parking position over the reference location 965 to align with the gripper 935 and other elements of the base station 130.

The parking plate 905 may include one or more alignment sensors 945 that confirms the alignment of the drone 900 at reference location 965. In the particular arrangement shown in FIG. 9G, a single the alignment sensor 945 configuration is shown, but in other embodiments there can be multiple alignment sensors, such as one that aligns a certain part of the body of the drone 900 and other that align the legs 615 of the drone 900. Referring to the FIG. 9G, an alignment sensor 945 may be located between the flaps 937 of the gripper 935, but may also be located in another place relative to a marker of the drone 900 in various embodiments. The alignment sensor 945 may detect the location of the drone 900, such as whether a target part of the drone 900 is in alignment with the reference location 965. The alignment sensor 945 is configured to detect the alignment of the drone 900 by detecting an identifiable part of the drone or a marker that is carried by the drone 900. The alignment sensor 945 may confirm that the drone 900 is hovering and preparing to land on the parking plate 905, that the drone 900 has landed on the parking plate 905, or that the drone 900 is in proper alignment with the parking plate 905.

The alignment sensor 945 may take various forms. In some embodiments, the alignment sensor is a fisheye camera looking for one or more designated markers on the underside of the drone 900 to determine where the drone is in relation to the alignment sensor 945. A marker on the drone 900 may be a QR code that is printed on the body of the drone that stands out as a marker. Based on the field of view of the alignment sensor 945, a landing envelope that defines the acceptable range of landing may be defined. If the marker is within the landing envelope, the alignment sensor 945 may provide a signal indicating that the drone 900 has landed. The alignment sensor 945 may continuously monitor the location of the marker throughout the alignment process to determine the fine alignment, such as through digitally processing the size of the marker and the location of the marker relative to the landing envelope. In some cases, the drone 900 may land at a position that is way off the intended location and the marker is out of the landing envelope. In such a case, the alignment sensor 945 may provide a signal that in turns a warning signal to communicate to the drone 900 to perform a re-landing. The continuous monitor by the alignment sensor 945 may provide feedback for the entire landing and alignment process. In some embodiments, the raising of the flaps 937 may be controlled by the alignment sensor 945 when the alignment sensor 945 detects that the marker of the drone 900 is within a tolerance range of an alignment position. In some embodiments, the alignment sensor 945 may be a camera that captures a particular marking on the drone. In some embodiments, the alignment sensor 945 may be an infrared sensor or any electromagnetic wave transceiver that emits a ray that may be reflected by a reflective part of the drone 900 (e.g., a small reflective part on the drone 900 for alignment). In some embodiments, the alignment sensor 945 may be a mechanical sensor that detects a contact between the base station 130 and the drone 900. In some embodiments, the drone 900 has a drone alignment sensor to detect designated markers or features on the landing surface 975 of the parking plate 905. The designated markers on the parking plate 905, like those on the drone 900, may include markers such as QR codes or other patterns, as well as reflective portions, depending on the nature of the alignment sensor 945.

The reference location 965 may be the predetermined desired location that aligns with a certain part of the drone 900, such as where a marker on the drone 900 is printed. While, in some embodiments, the reference location 965 in the illustration of FIG. 9G is also the location of the alignment sensor 945, in other embodiments, the reference location 965 may vary. In some embodiments, the reference location 965 may also be the center of the parking plate 905. However, in other embodiments such as those that have a larger base station 130 that can accommodate more than one drones, there can be more than one reference location 965, each for a drone to be parked.

In some embodiments, the gripper 935 may include a pair of flaps 937. Each flap 937 may first lay flat on parking plate 905 and can pivot off of the parking plate 905 to turn into an erected position (shown in FIG. 9E) to securely fix the drone 900 in place. In some embodiments, the gripper 935 is configured to removably secure the body of the aerial drone 900 in place relative to the reference location 965. In some embodiments, the movement of the 935 may be triggered by the alignment signal from the alignment sensor 945, although another trigger may also be possible. In some embodiments, the alignment accuracy of the gripper 935 may put the drone 900 within a small range (e.g., 1 mm) of the designated position and alignment. The gripper 935 is configured to secure the drone 900 in place at a parking position at the parking plate 905 over reference location 965. The gripper 935 may include a sensor that confirms the drone 900 is secured in place by the gripper 935. Detail of the gripper 935 is discussed further in FIG. 11A through FIG. 11C.

The parking plate 905 may include a shutter 940 which is openable to provide access to the internal components (e.g., a battery pack carrier) of the bottom compartment 909. Shutter 940 includes an access door that opens and closes. Shutter 940 protects the enclosure 910 within the cabinet 903 from any dust, particles, and air that may have otherwise washed down in the enclosure due to air turbulence. The shutter 940 may be opened at any time after a drone 900 is landed. For example, the shutter 940 may be opened after the gripper 935 confirms that the drone 900 is gripped. The shutter 940 is further illustrated in FIGS. 13A and 13B.

Figure 10B:
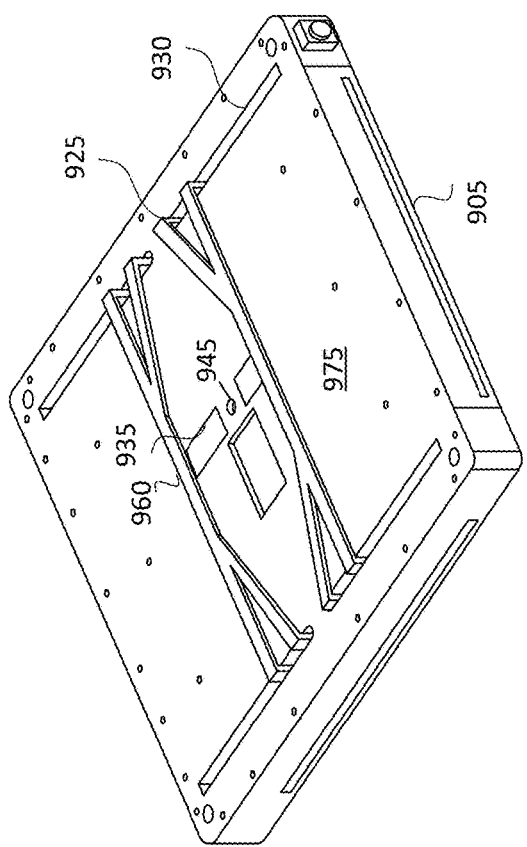
FIG. 10B is an isolated view of the parking plate showing the pair of pushers in a contracted position, in accordance with some embodiments.
Figure 10A:
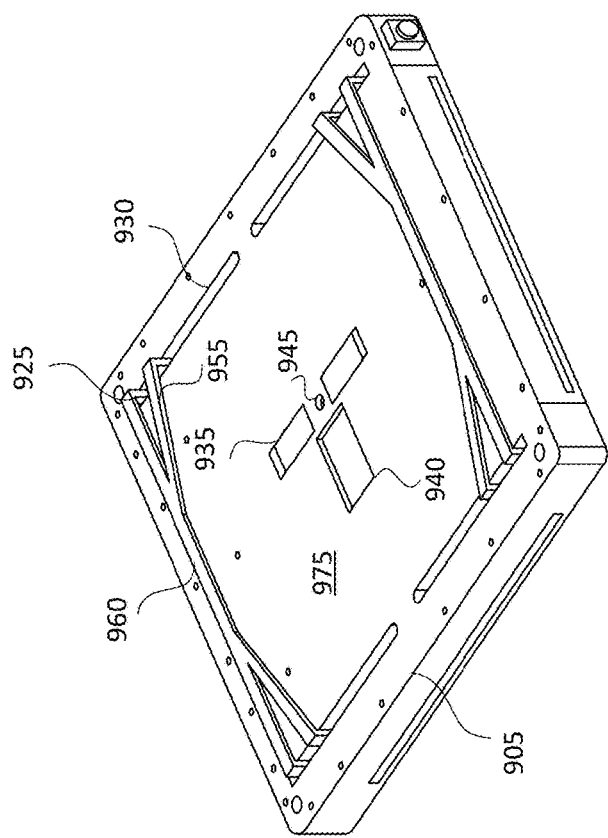
FIG. 10A is an isolated view of the parking plate showing a pair of pushers in an expanded position, in accordance with some embodiments.
Figure 10C:
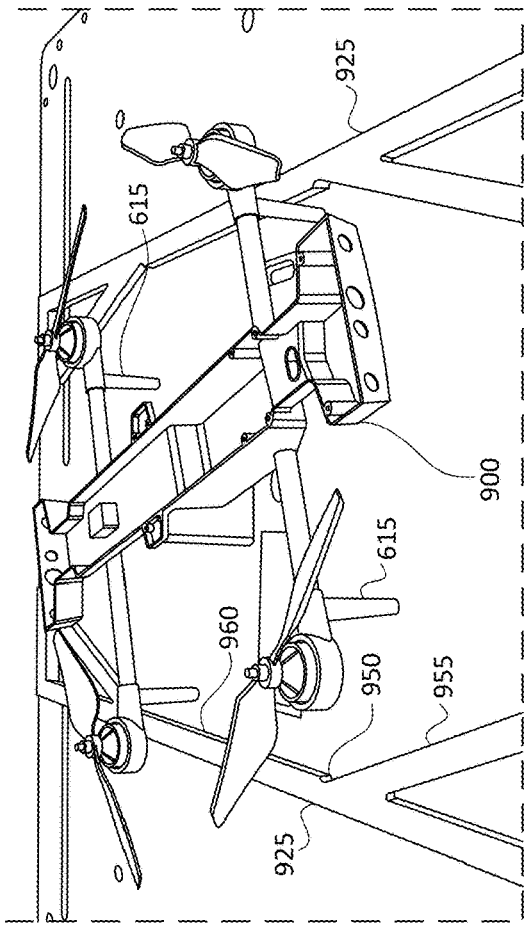
FIGS. 10C and 10D are conceptual diagrams showing a drone is aligned by the pushers through the contraction, in accordance with some embodiments.
Figure 10D:
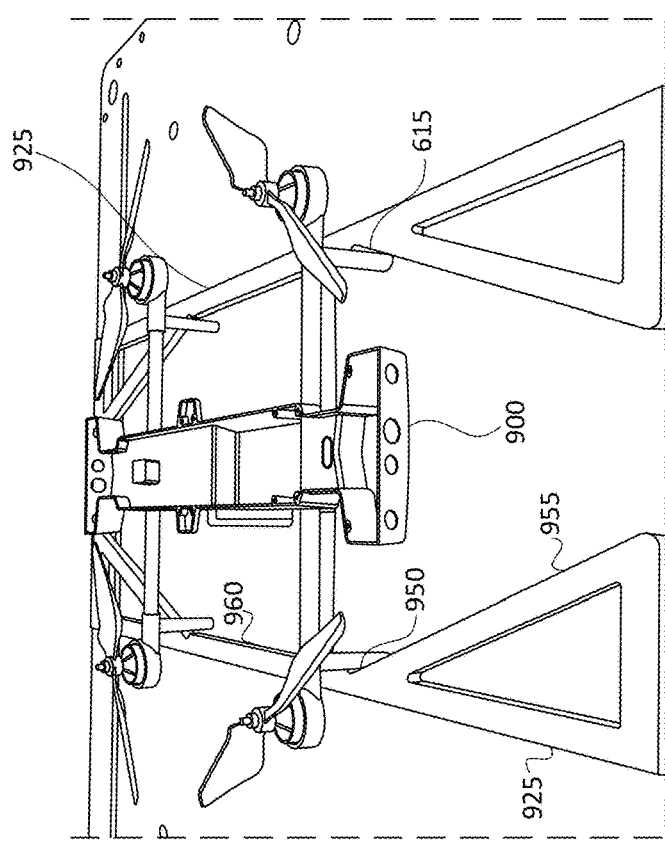

FIG. 10A is an isolated view of the parking plate 905 showing a pair of pushers 925 in an expanded position, in accordance with some embodiments. FIG. 10B is an isolated view of the parking plate 905 showing the pair of pushers 925 in a contracted position, in accordance with some embodiments. FIGS. 10C and 10D are conceptual diagrams showing a drone 900 is aligned by the pushers 925 through the contraction, in accordance with some embodiments. As an example, FIG. 10C is a perspective view of a landing surface 975 with the drone 900 landed, and the pushers 925 in the process of aligning the drone 900, according to some embodiments. As another example, FIG. 10D is a perspective view of a landing surface 975 with the drone 900 aligned by the pushers 925 and the leg notches 950, according to some embodiments. FIG. 10A through FIG. 10D, along with FIG. 9G, are discussed in conjunction with one another to illustrate an example mechanism of the pushers 925. For simplicity, leg notches 950 of the pushers 925 are not shown in FIG. 10A and FIG. 10B, but are shown in FIG. 9G, FIG. 10C, and FIG. 10D.

The pushers 925 may take different forms in various embodiments. For example, in the particular embodiment shown in FIGS. 10A and 10B, each pusher 925 may slide within a track 930 on parking plate 905. The track 930 may fix the direction of movement of the pusher 925. In some embodiments, the group of pushers 925 are on opposing sides of parking plate 905 such that the pushers 925 meet in the middle of the parking plate 905, as seen in the embodiment of FIG. 10B. In some embodiments, the pushers 925, guided by the tracks 930, may move in a symmetrical and synchronized manner. A track 930 may take the form of a channel that creates an empty slot on the parking plate 905 so that the rigid part of the pusher 925 used to push the drone 900 is placed on the landing surface 975 while the moving part of the pusher 925, such as motor and gears (not illustrated) that are located within the enclosure 910 of the base station 130. In other embodiments not illustrated in the figures, the track 930 may take the form of a recessed guide, a monorail, a rail, or any suitable pathway. In some embodiments, the pusher 925 may also slide on the landing surface 975 without a track. Also, while the tracks 930 are shown in FIGS. 10A and 10B as two pairs of parallel and straight tracks that are on opposing edges of the parking plate 905, in different embodiments the tracks 930 may take various shapes and forms, straight or curved, parallel or radial, symmetrical or arbitrary.

In some embodiments, the pushers 925 may cooperatively gradually narrow the area of parking of the drone 900 to achieve a first stage of alignment. For example, the group of pushers 925 may move from an expanded configuration where the pushers 925 from far from each other when the drone 900 is first landed to a contracted configuration to push the drone 900 towards a desired reference location. The pushers 925 may push drone 900 into a parking position to align with the gripper 935 and other elements of the base station 130. The gripper 935 is configured to secure the drone 900 in place at a parking position at the parking plate 905.

Various types of pushers 925 may be used to serve as a coarse alignment mechanism in different embodiments. For example, in some embodiments, the pushers 925 may be a mechanical arm that is extended from a wall of the base station 130 and may push the drone 900. Alternatively, or additionally, a pusher 925 may include any magnetic mechanisms that push certain parts of the drone 900.

In some embodiments, each pusher 925 may take the form of an elongated bumper that is configured to sweep a leg of the drone 900 toward a desired location. While the pusher 925 is illustrated as pushing the leg of a drone, in various embodiments, one or more pushers 925 may also be shaped and configured to push other parts of the drone. As best shown in FIG. 9G, the elongated bumper may include a tilted region 955, an orthogonal region 960 that is perpendicular to the direction of movement 990 of the pusher 925, and a leg notch 950 between the tilted region 955 and the orthogonal region 960. The tilted region 955 sweeps the leg of the drone 900 towards the notch 950. The orthogonal region 960 promotes a parallel movement of the legs. The leg notch 950 holds a leg of the drone 900 in place relative to the pusher 925 so that the leg continues to move in a direction parallel to the movement of the pusher 925. In some embodiments, an elongated bumper may include two tilted regions 955 both tilted towards the leg notch 950. In some embodiments, the distance between two leg notches 950 may generally equal the distance of two legs 615 of the drone 900. The distance between the two orthogonal regions 960 in the contracted configuration shown in FIG. 10B may also generally equal the distance of two legs 615 of the drone 900 in the lateral direction.

After a drone 900 arrives at the parking plate 905, the drone 900 may not be aligned. For example, in FIG. 10C, the drone 900 may land approximately at the center of the parking plate 905 but may be at an angle relative to the parking plate 905. As the group of pushers 925 contracts towards the legs 615 of the drone 900, one or more pushers 925 starts to be in contact with the legs. The tilted regions 955 push the legs 615 such that the only way the drone 900 can fit within the space of the pushers 925 when the pushers 925 are completely pushed in along the track 930 is such that the legs 615 of the drone 900 fit within leg notches 950. The position shaped by the leg notches 950 and the legs 615 means that the drone 900 is aligned on the designated parking spot on the parking plate 905.

Figure 11A:
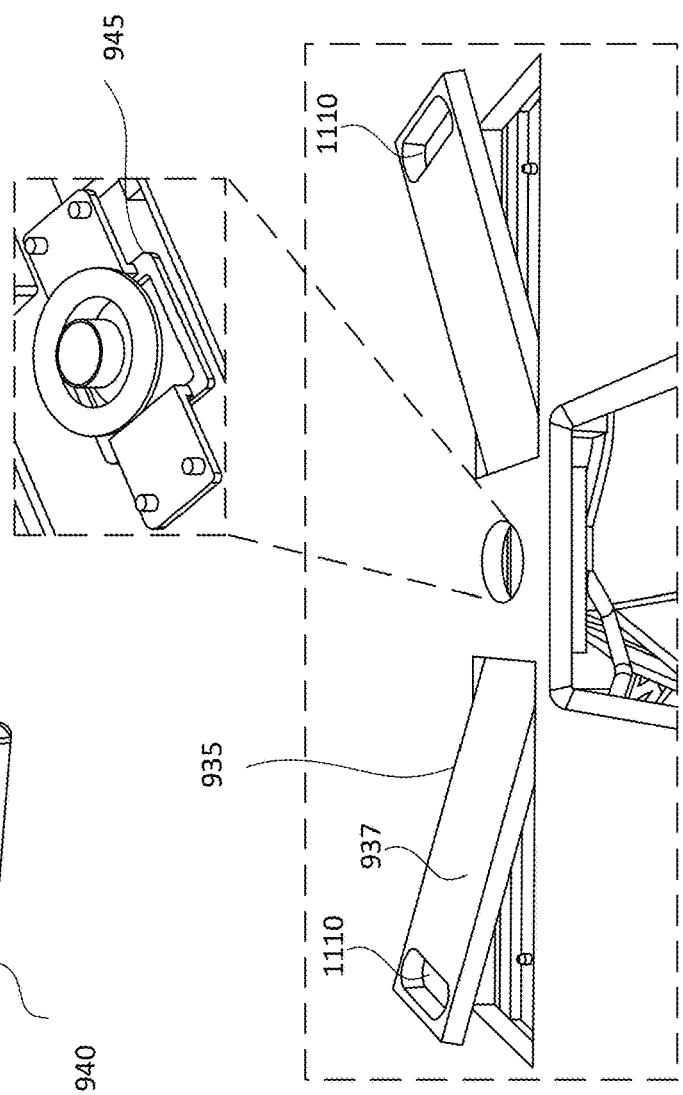
FIG. 11A shows a side view of the gripper on the parking plate that is moving from a flat configuration towards an erected configuration, in accordance with some embodiments.
Figure 11C:
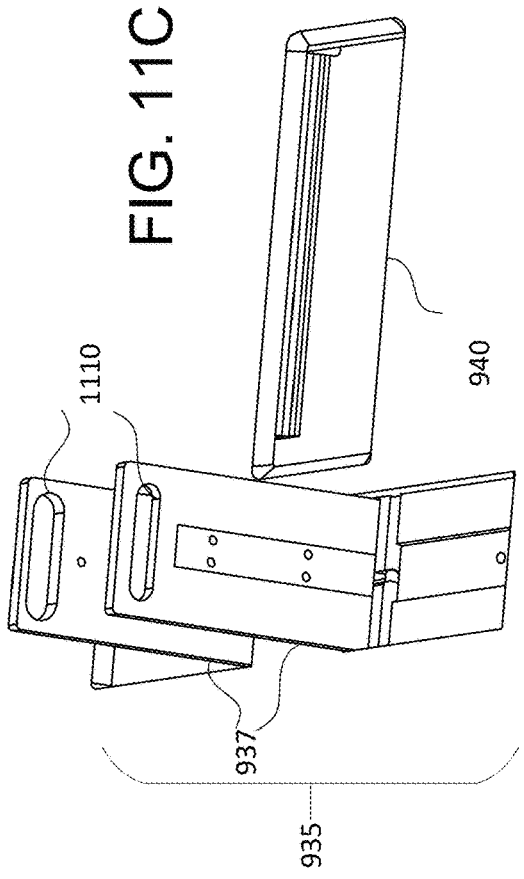
FIG. 11C shows a perspective view of the gripper that is erected, in accordance with some embodiments.
Figure 11B:
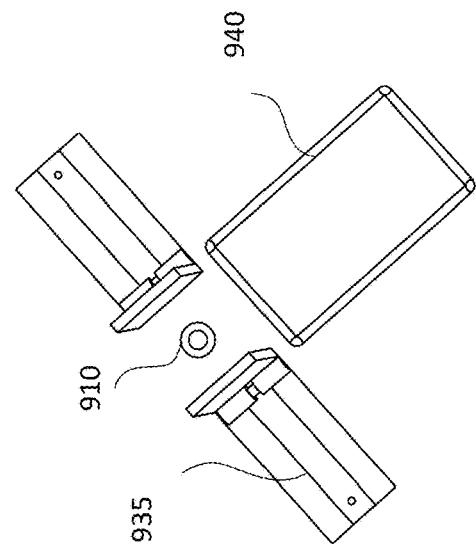
FIG. 11B shows a top-down view of the gripper, in accordance with some embodiments.

FIGS. 11A, 11B, and 11C show various views of the gripper 935, the shutter 940, and the alignment sensor 945, according to some embodiments. FIG. 11A shows a side view of the gripper 935 on the parking plate 905 that is moving from a flat configuration towards an erected configuration, as well as a close-up view of the alignment sensor 945 as it appears on the reverse side of the parking plate 905. FIG. 11B shows a top-down view of the gripper 935. FIG. 11C shows a perspective view of the gripper 935 that is erected.

The gripper 935 may include a component that has a shaped component complementary to the counterpart on the drone so that the two components mate and secure the drone 900. In the embodiment shown in FIGS. 11A, 11B, and 11C, the shaped component is in the form of a drone grip slot 1110 located on each flap 937. which mates with the drone gripper tabs 690 to hold the drone 900 once the drone 900 is aligned.

The gripper gears and motors (as seen in and discussed further in FIGS. 12A and 12B) operate the gripper such that the two flaps pivot from a first position lying flat along the landing surface 975, to a second position in which the two components are perpendicular to the landing surface 975. Once the two flaps are in the second position, the drone grip slots 1110 mates with the drone gripper tabs 690 to fully secure the drone.

In the embodiments shown, the drone grip slots 1110 are oval in shape as cut-outs of the gripper 935. In other embodiments, the drone grip slots 1110 may be alternate shapes as long as the drone grip slots 1110 correspond with and mate with the drone gripper tabs 690 on the drone 900. The mating may be complementary or the drone grip slots 1110 may be slightly larger than the drone gripper tabs 690. In other embodiments, the drone 900 may include recesses which mate with a tab of complementary size and shape on the gripper 935. The mating of the gripper 935 and the drone 900 via the drone grip slots 1110 and the drone gripper tabs 690 secures the drone 900 from forces that would prevent alignment because the nature of the slot and tab secures against forces that would push the drone 900 side-to-side, up-and-down, or even rotationally. In other alternate embodiments, the drone grip slots 1110 may be configured to connect and mate with other portions of the drone 900. In the embodiment shown, the gripper 935 is pivotal, with each of the components pivoting up from landing surface 975. The flaps 937 that pivot up from the parking plate 905 ensure that the gripper 935 centers the drone 900 and secures the drone 900 from rotational forces, keeping the drone 900 aligned with a particular position above the reference location 965. The gripper 935 secures the drone 900 against up rotational or translational force which may occur as insertion and removal forces as part of the battery swapping operations (discussed further in FIGS. 18A and 18B). For example, in a battery-swapping operation, the drone 900 may tend to rotate in a direction that is parallel to the landing surface 975. The pivotal mechanism provides a strong force against such rotational movement because the movement angle of the pivotal gripper 935 is orthogonal to the attempted rotational movement of the drone 900.

Alternatively, or additionally, the gripper 935 may move via other mechanisms, such as along a track, such that complementary components come together to mate and secure the drone 900. Such alternate embodiments include other pieces to ensure that the drone 900 is secured against rotational forces. In the embodiment shown, the gripper 935 pivots to secure drone 900 after the pushers 925 have pushed and aligned the drone 900 to a reference location 965. In alternate embodiments, the gripper 935 may operate simultaneously with pushers 925, or may be combined as part of the pushers 925.

FIGS. 11A, 11B, and 11C additionally show an example structural shape of the shutter 940. The portion of the shutter 940 creating an opening in the parking plate 905 has sloped edges which slope inward, with a wider opening on the landing surface 975 of the parking plate 905 and a smaller opening on the component-carrying surface 1520 of the parking plate 905. The sloped edges further help protect the enclosure 910 within the cabinet 903.

Figure 12B:
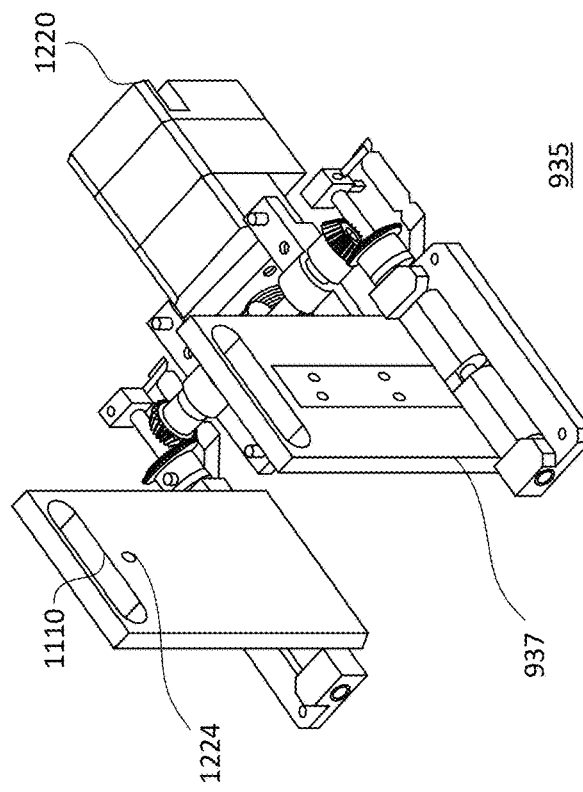
FIG. 12B shows the gripper in the closed position, in which the two flaps are erected.
Figure 12A:
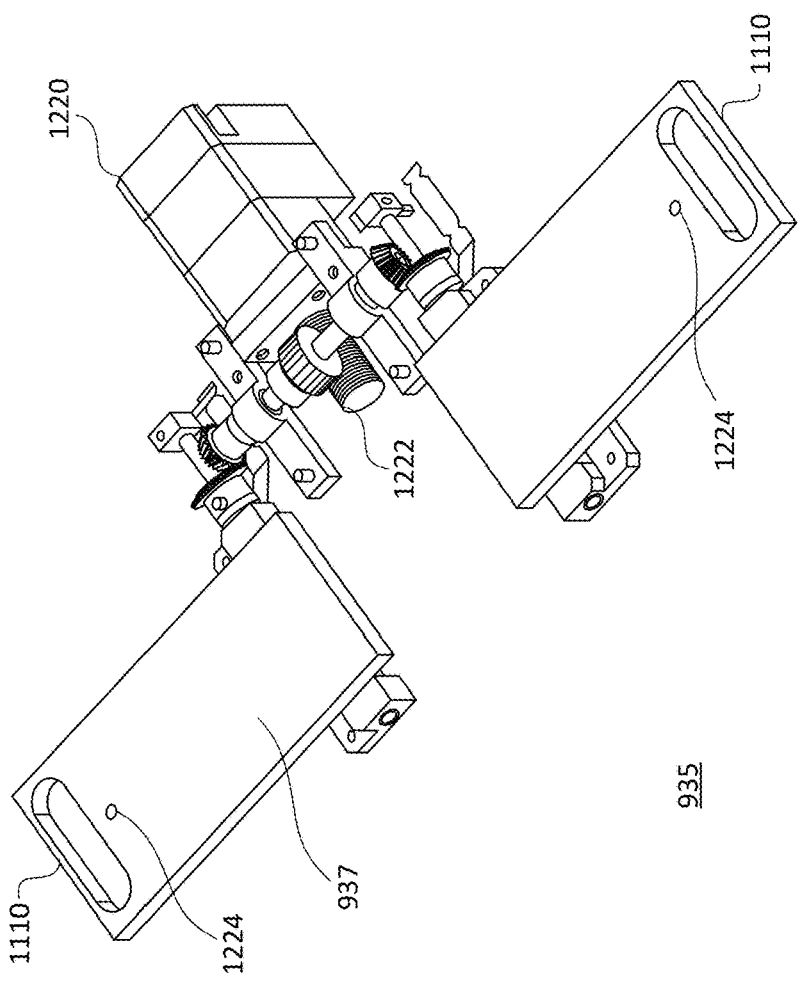
FIG. 12A shows the gripper in the open position, in which the two flaps are lying flat.

FIGS. 12A and 12B are isolated views of a gripper 935 that is respectively in a flat position and an erected position, in accordance with some embodiments. To illustrate the opening and closing of the gripper 935, FIGS. 12A and 12B show the gripper 935 in the stages of opening and close respectively, according to some embodiments. As shown in FIGS. 12A and 12B, the gripper 935 includes the drone grip slots 1110, a gripper motor 1220, the gripper gears 1222, and detection ports 1224. FIG. 12A shows the gripper 935 in the open position, in which the two flaps 937 are lying flat. FIG. 12B shows the gripper 935 in the closed position, in which the two flaps 937 are erected. The two flaps 937 may be made from a rigid material such as high-density plastic or an alloy so that the flaps 937 provide sufficient mechanical strength to resist the rotation or other movements of the drone 900 during a battery swap operation. The flaps 937 are moved by the gripper motor 1220 and gripper gears 1222. In the embodiment shown in FIGS. 12A and 12B, the gripper motor 1220 is a servo step motor, and the gripper gears 1222 are a worm gear drive and bevel gears. The use of worm gears protects the gripper 935 from any force that may work to pry the two flaps of the gripper 935 apart and further ensure that the gripper 935 secures the drone 900. In this embodiment, one worm gear drives two sets of bevel gears, one set of bevel gears for each flap which pivots to form the gripper 935. As such, the two flaps 937 may pivot simultaneously in a synchronized manner. Alternatively, or additionally, the gripper motor 1220 may include other forms of motors and the gripper gears 1222 may be other gears to produce different motions depending on the embodiment.

Each flap 937 may include a detection port 1224 that determines whether the gripper 935 successfully engages the drone 900. The detection ports 1224, once the gripper 935 is in the closed position and securing the drone 900, are in contact with the circuitry of the drone 900 to complete an electrical circuit so that a signal may be generated that the detection port 1224 is connected. The detection ports 1224 may be referred to as battery hot swap ports, charging ports, data transmission ports, etc., depending on the additional functionalities of the detection ports 1224. A detection port 1224 may include various pins (not shown) for different purposes, such as detection, power transfer, data transmission, etc. For example, in some embodiments, in addition to detecting whether the gripper 935 successfully engages the drone 900, the detection ports 1224 may also power the drone 900 to continue to power the drone 900 throughout the process of swapping the batteries. This allows for additional functionality-such as simultaneously swapping the batteries while the drone is downloading or transmitting data-because the drone remains powered throughout the swapping process. In some embodiments, the two detection ports 1224 may be in an opposing polarity. For example, one detection port 1224 is a positive charge, and the other detection port 1224 is a negative charge, such that together the pair of detection ports 1224 create a charge and current for the drone 900 to be charged.

Figure 13A:
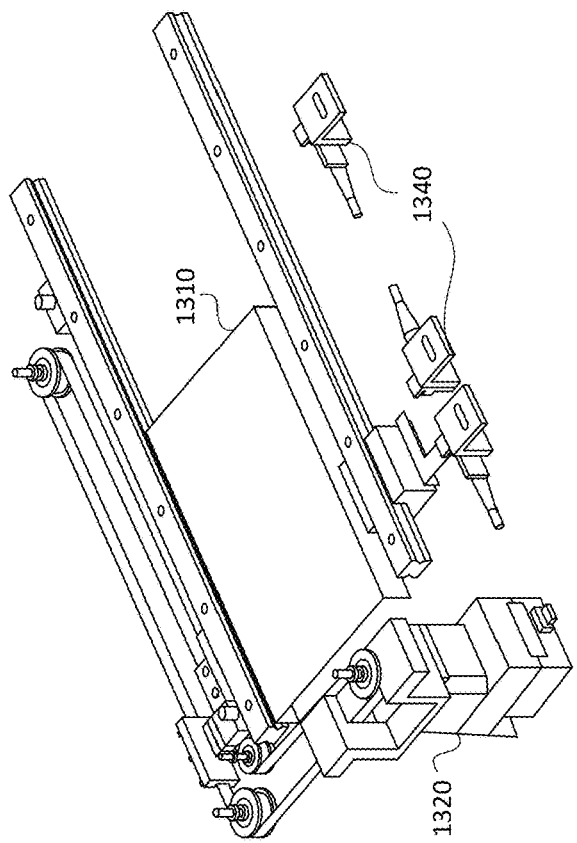
FIG. 13A and FIG. 13B are isolated views of a shutter, in accordance with some embodiments.
Figure 13B:
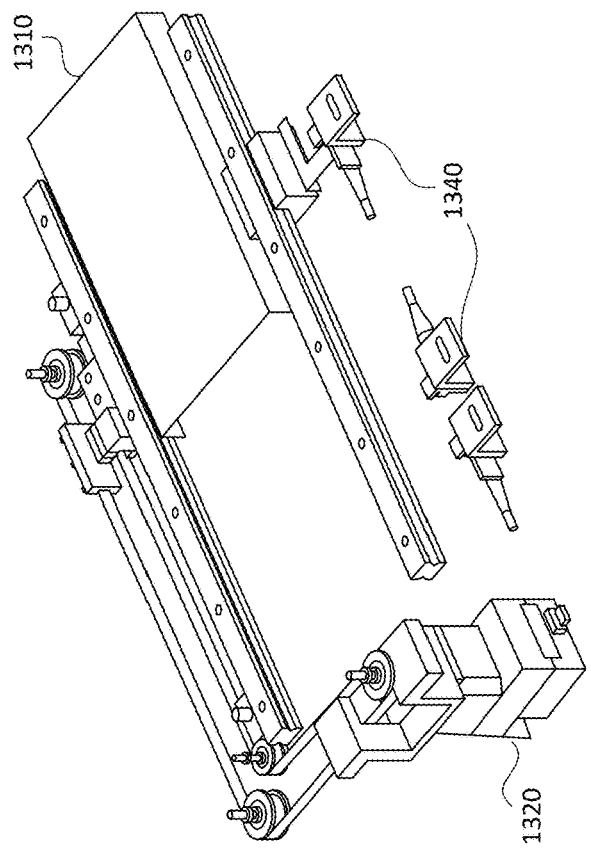

FIG. 13A and FIG. 13B are isolated views of a shutter 940, in accordance with some embodiments. FIGS. 13A and 13B show the shutter panel 1310 in an open position and a closed position, respectively. The shutter 940 includes a shutter motor 1320 and shutter sensors 1340. In the embodiment shown in FIGS. 13A and 13B, the shutter motor 1320 includes a step servo motor and belt drive which operates the shutter alone a track that remains parallel to the parking plate 905. The shutter sensors 1340 determine where the shutter panel 1310 is in its motion. In the embodiment shown in FIGS. 13A and 13B, the shutter sensors 1340 include a forward limit, rear limit, and a home sensor. In other embodiments, the shutter 940 may include a shutter panel 1310 which pivots at a point, instead of gliding in parallel with the parking plate 905.

Figure 14A:
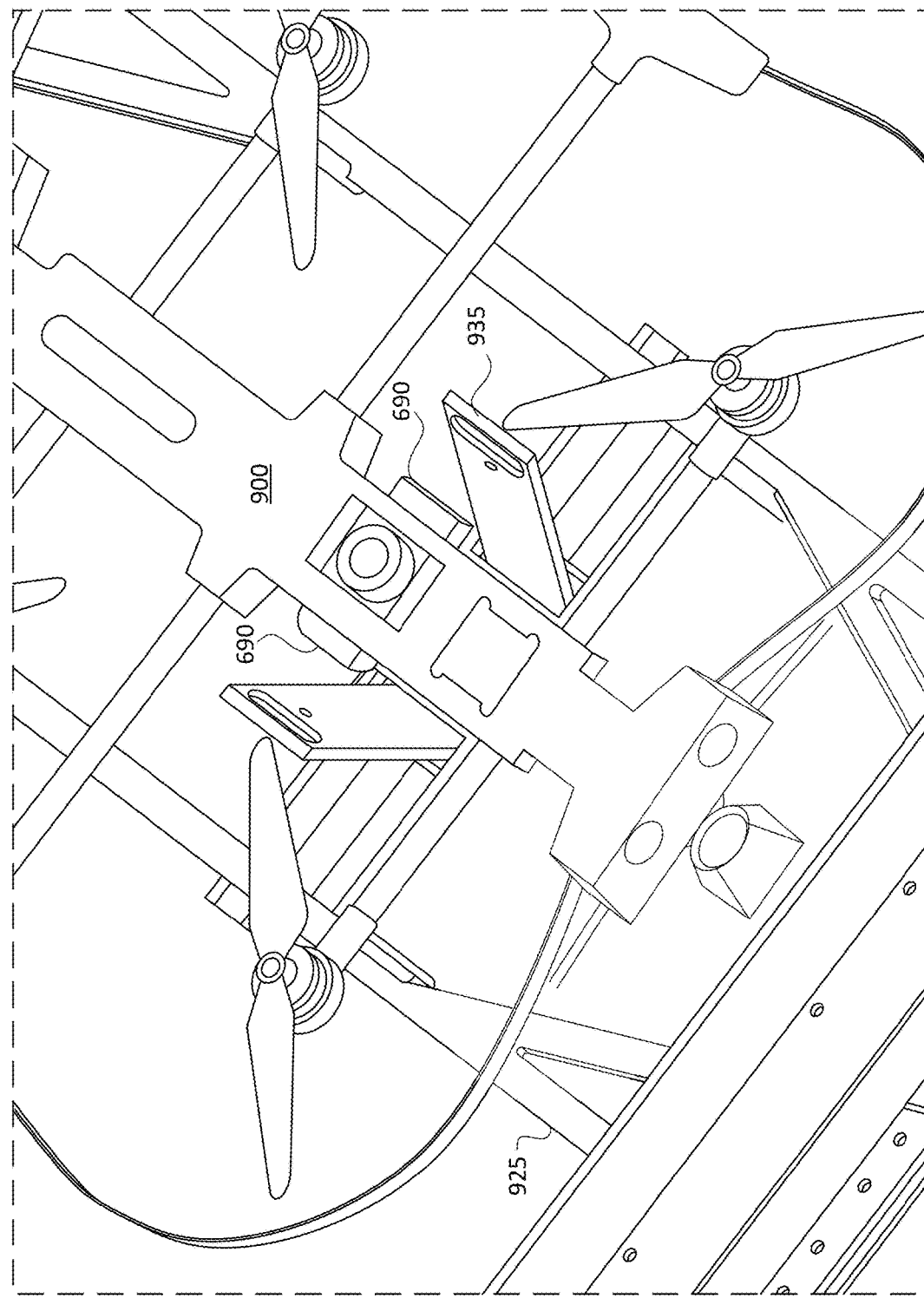
FIG. 14A and FIG. 14B are conceptual diagrams illustrating how a drone, after a coarse alignment by the pushers, is secured by the gripper, in accordance with some embodiments.
Figure 14B:
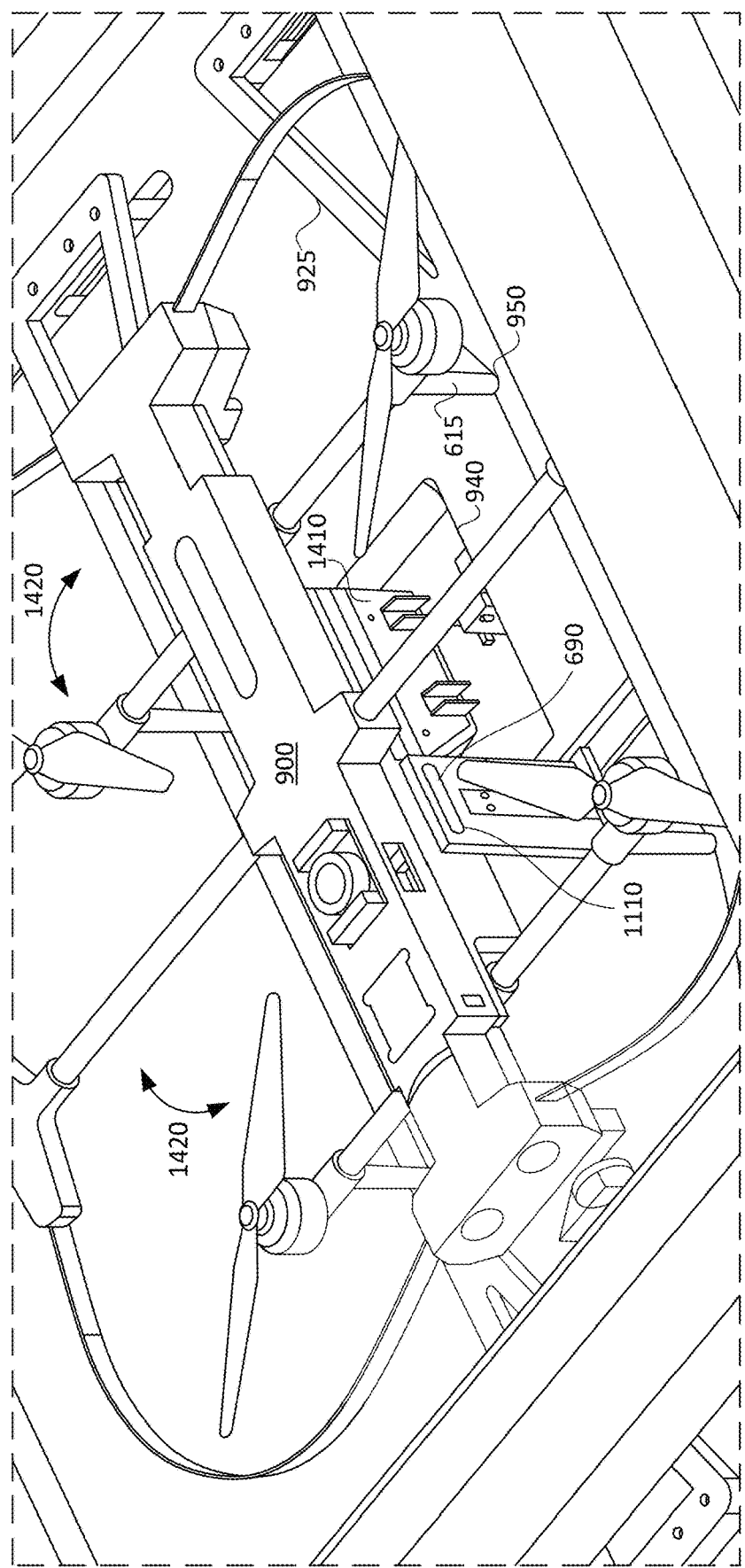

FIG. 14A and FIG. 14B are conceptual diagrams illustrating how a drone 900, after a coarse alignment by the pushers 925, is secured by the gripper 935, in accordance with some embodiments. As an example, FIG. 14A shows a perspective view of the drone on the parking plate 905 in which the gripper 935 is in the process of pivoting and securing the drone 900, according to some embodiments. The drone 900 has a pair of drone gripper tabs 690 that are protruding from the body of the drone 900. In some embodiments, below the drone gripper tabs 690, there can be connection pins (not shown) on the body of the drone 900 that is to be connected to the detection ports 1224. FIG. 14B shows another view of a drone 900 on parking plate 905 in which the gripper 935 is in the closed position and has secured the drone 900. In this configuration, the pushers 925 are pushed to the contracted position so that the legs 615 of the drones 900 are held in place by the leg notches 950 of the pushers 925. The drone grip slots 1110 are mated to the drone gripper tabs 690 of the drone 900 in a complementary manner. The shutter 940 is opened to the interior of the base station 130 so that the battery pack 860 may be detached and swapped by the actuating components from the interior of the base station 130 through the shutter 940. The actuating components will be further discussed below. The arrows 1420 show the potential movement of the drone 900 during a batter swap operation. The leg notches 950 and the drone grip slots 1110 of the gripper 935 both provide restraint against the potential movement.

Example Base Station Internal Components

Figure 15A:
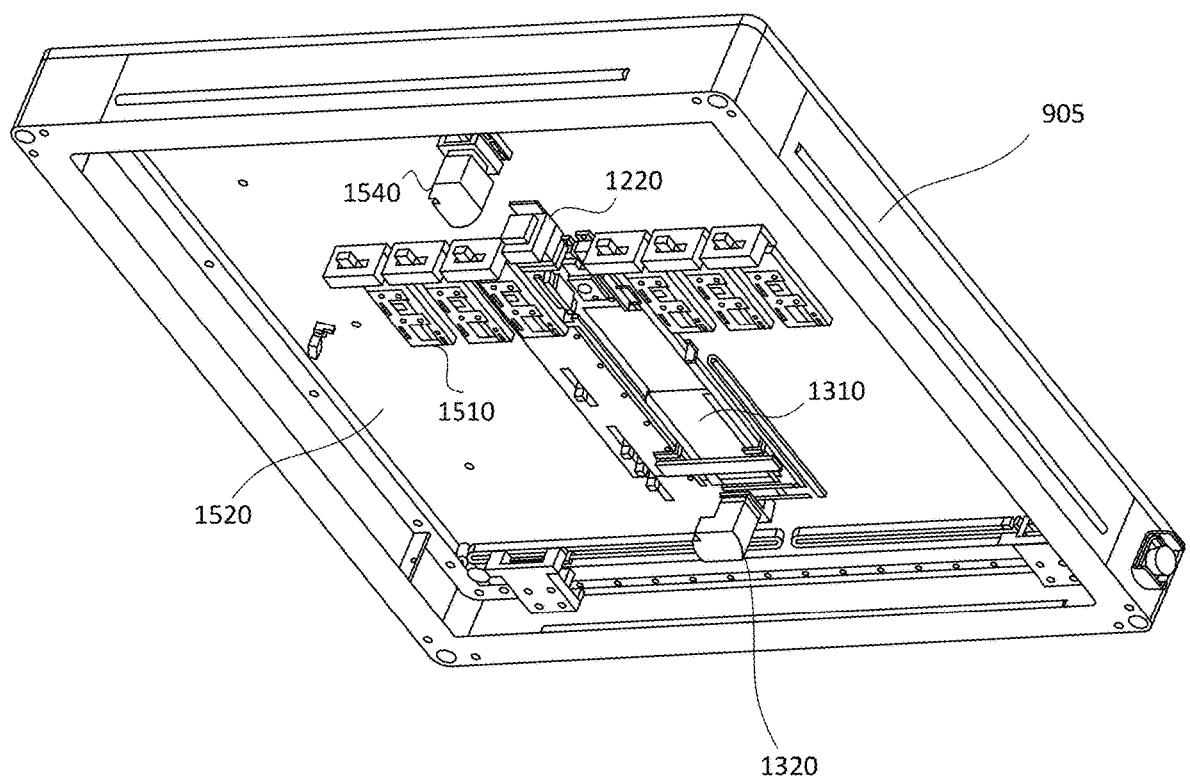
FIG. 15A is a bottom-perspective view of a parking plate of the base station, in accordance with some embodiments.
Figure 15B:
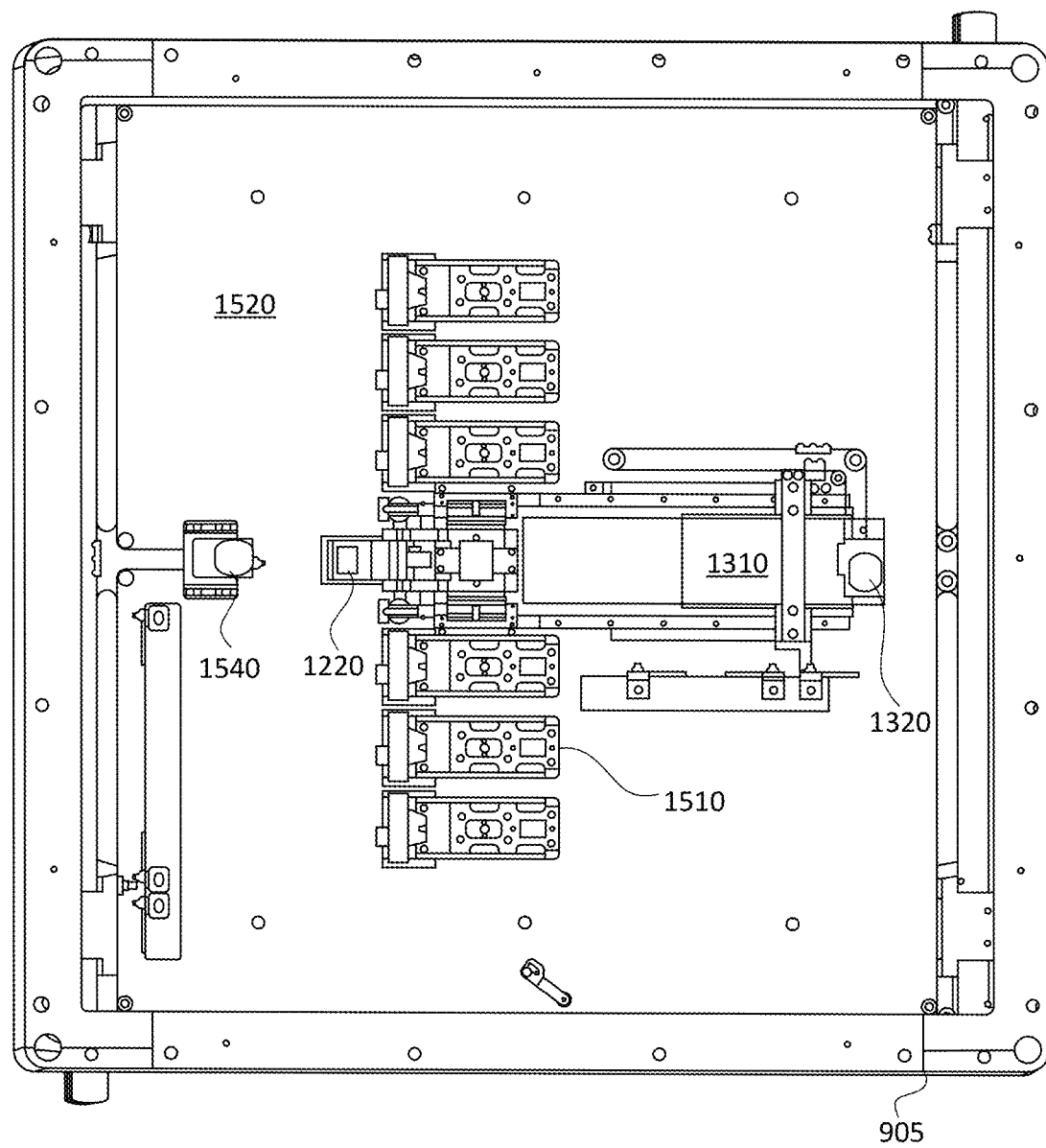
FIG. 15B is a bottom-up view of the component-carrying surface of the parking plate, according to some embodiments.

FIG. 15A is a bottom-perspective view of a parking plate 905 of the base station 130, in accordance with some embodiments. As discussed above, the parking plate 905 includes two surfaces opposing each other. The top surface is the landing surface 975 that is illustrated extensively in FIG. 9G. The bottom surface is a component-carrying surface 1520 that forms the ceiling of the bottom compartment 909 of the base station 130. FIG. 15B is a bottom-up view of the component-carrying surface 1520 of the parking plate 905, according to some embodiments. Various components may be carried on the component-carrying surface 1520, including a series of battery charging sites 1510, the gripper motor 1220, the shutter panel 1310, the shutter motor 1320, and the pusher motor 1540. In the embodiment shown in FIG. 15A, there are six battery charging sites 1510 that are aligned linearly to form a series. A battery charging site 1510 may simply be referred to as a charger. Each battery charging site 1510 allows a battery pack (not shown in FIG. 15A or 15B) to be removably attached to the battery charging site 1510 and charged there. Other components may also be mounted and suspended from the component-carrying surface 1520 of the parking plate 905. For example, in some embodiments, a battery pack carrier 912 may be mounted and suspended from the component-carrying surface 1520. The mounting of the battery pack carrier 912 is not shown in FIG. 15A or FIG. 15B but is shown in other figures such as FIG. 20.

The various components shown in FIGS. 15A and 15B are illustrated as being mounted on the same parking plate 905. The advantages of such an arrangement will be discussed in further detail below. In some embodiments, various internal components may be mounted to other structural components, such as one or more frames 902 or walls 906. For example, in some embodiments, the battery charging sites 1510 may be mounted to a location that is attached to a frame 902.

Figure 16A:
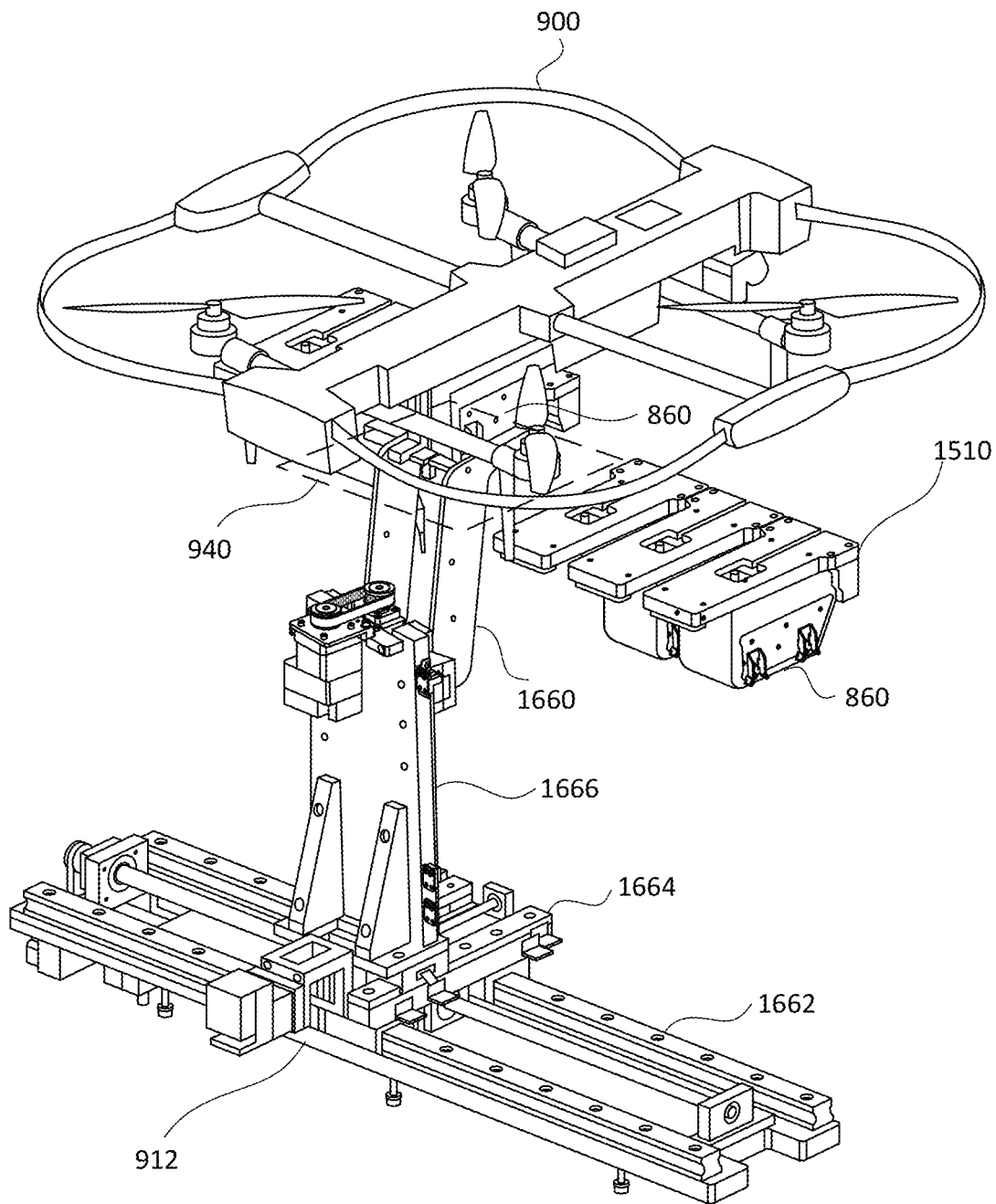
FIG. 16A shows an isolated view of the battery pack carrier, some examples of battery charging sites, and the drone, in accordance with some embodiments.
Figure 20:
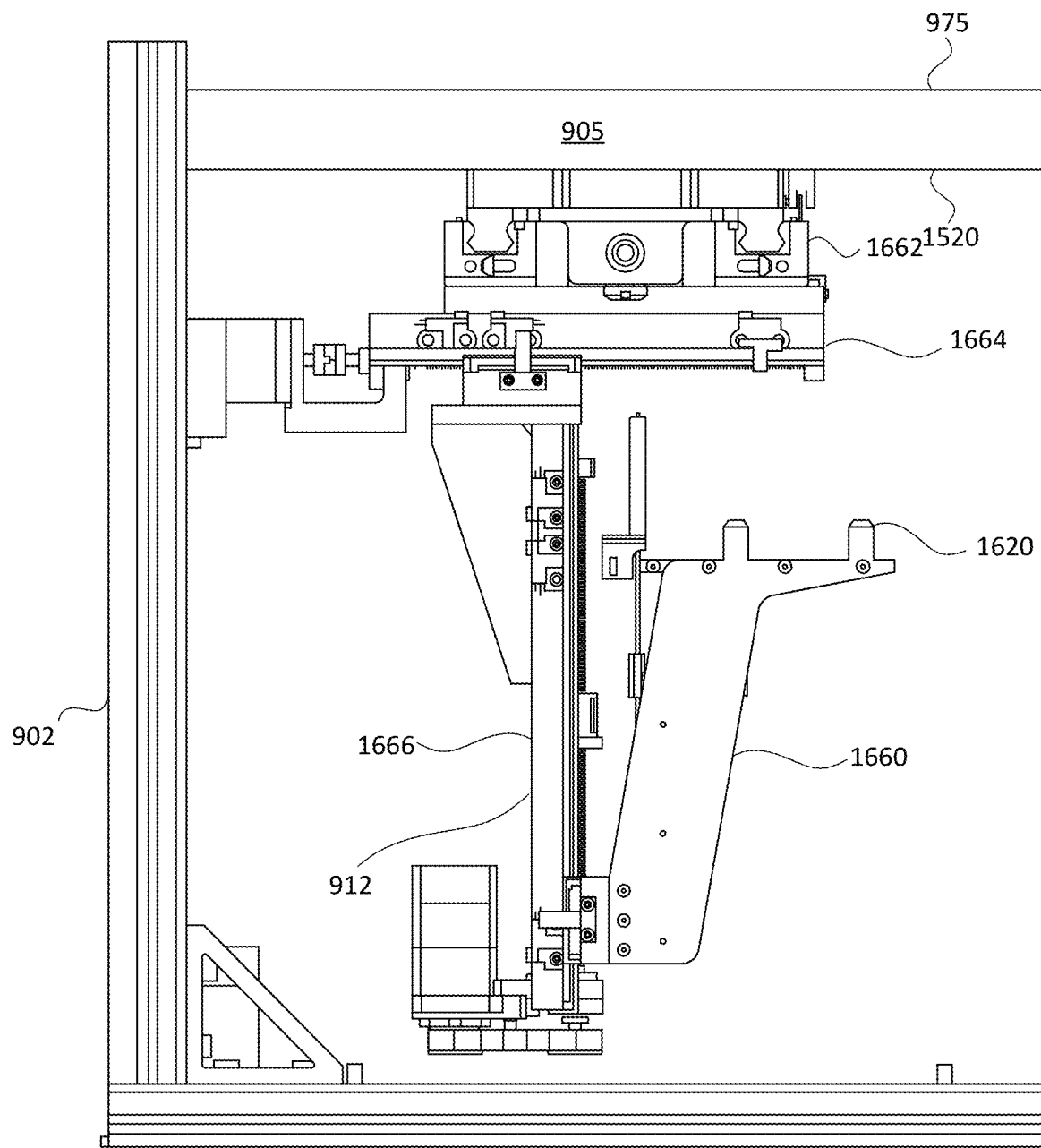
FIG. 20 is a side view of an example base station showing a battery pack carrier suspending from a parking plate, in accordance with some embodiments.
Figure 21:
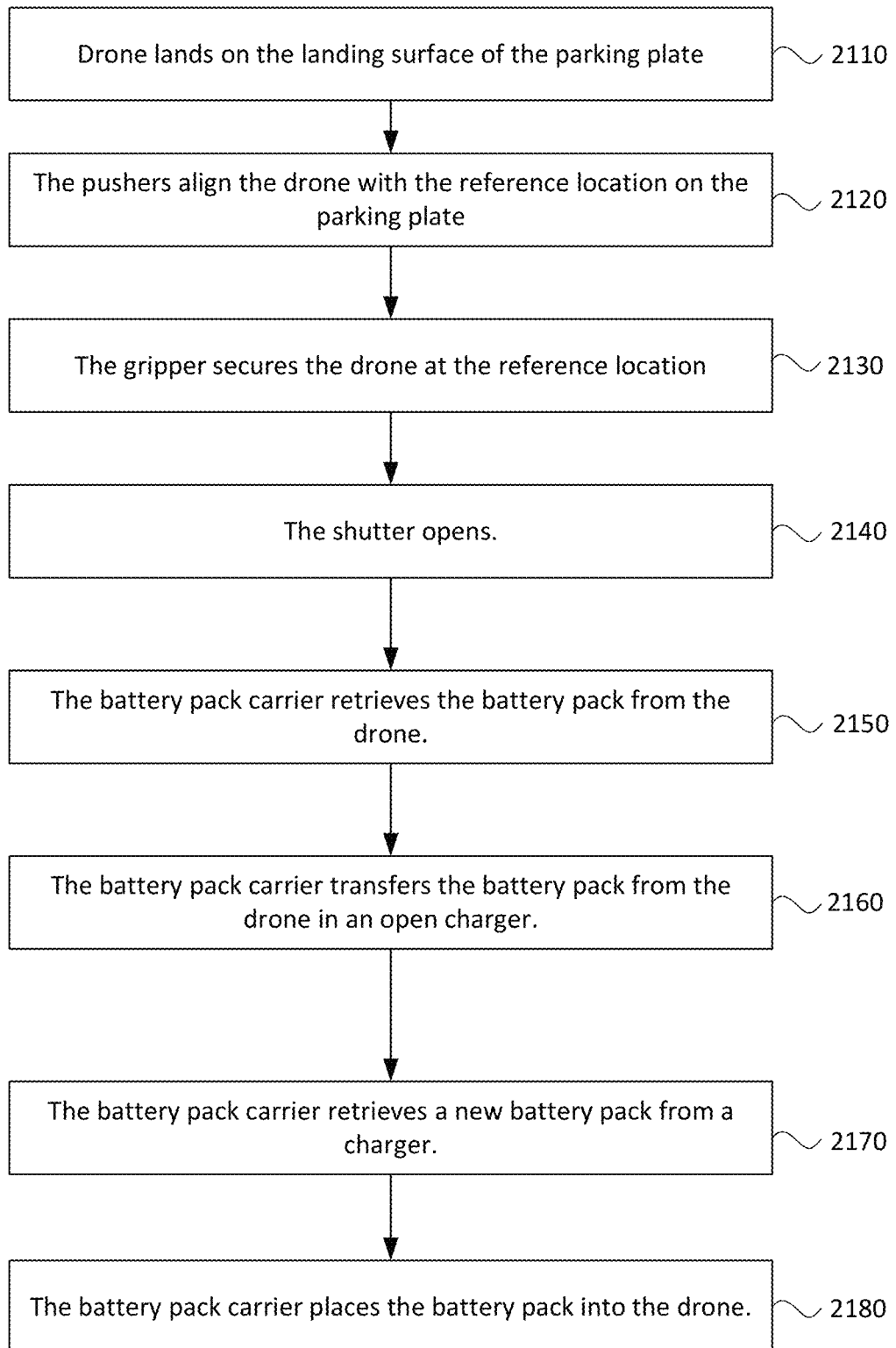
FIG. 21 is a flowchart for a method of swapping the batteries of a drone, in accordance with some embodiments.

FIG. 16A shows an isolated view of the battery pack carrier 912, some examples of battery charging sites 1510, and the drone 900, in accordance with some embodiments. In FIG. 16A, mounting structures such as the parking plate 905 or any frame 902 are not shown. The battery pack carrier 912 is a robotic arm attached to another portion of base station 130 such as the frame 902 and/or the component-carrying surface 1520 (as shown in FIGS. 20 and 21). To perform battery sway for the drone 900, the battery pack carrier 912 is movable among the battery charging sites 1510 and the shutter 940, which is conceptually illustrated as a dash-lined box in FIG. 16A. In some embodiments, after the drone 900 is landed and secured by the pushers 925 and the gripper 935, the shutter 940 is opened and the arm portion 1660 of the battery pack carrier 912 moves through the shutter 940 to reach the battery pack 860 currently carried by the drone 900. At the base station 130, not all sites in the series of battery charging sites 1510 may be carrying and charging battery packs 860. For example, in FIG. 16A, two of the right battery charging sites 1510 are illustrated as each charging a battery pack 860. The left battery charging site 1510 that is closest to the drone 900 is empty. The battery pack carrier 912 may move the arm portion 1660 that carries the battery pack 860 taken from the drone 900 to an empty battery charging site 1510. In turn, the battery pack carrier 912 may move to another battery charging site 1510 and carry a freshly charged battery pack 860 back to the shutter 940 and install the battery pack 860 to the drone 900. After the battery sway, the drone 900 may take off and perform various storage site duties as discussed above.

The battery pack carrier 912 may be movable in three dimensions, such as the lateral direction (e.g., the direction where the series of battery charging sites 1510 are aligned), the longitudinal direction and the vertical direction. In some embodiments, the shutter 940, the drone 900 landed with a used battery pack 860, and the battery charging sites 1510 may be aligned in the longitudinal direction so that the battery pack carrier 912 only needs to move in the lateral direction to a smaller extent. The battery pack carrier 912 may include sensors to detect the forward limit, rear limit and home position along each axis of movement. In some embodiments, the sensors are travel photo sensors.

The three-dimensional movements of the battery pack carrier 912 may be achieved by one or more types of actuating and movement components, such as motors, tracks, mechanical arms, pivotal hinges, rotational joints, etc. For example, in the example shown in FIG. 16A, the battery pack carrier 912 moves along each axis by moving along a track and rod. Each robotic arm track may be mounted on another track laid at a 90-degree angle to add an additional axis of motion. Alternatively, or additionally, one or more movement in a dimension may be achieved using a robotic arm that is paired with one or more pivotal hinges and/or one or more rotational joints. In FIG. 16A, the battery pack carrier 912 may include a lateral track 1662, a longitudinal track 1664, and a vertical track 1666. The lateral track 1662 may be generally parallel with the alignment of the battery charging sites 1510. The lateral track 1662 may provide the largest extent of movement compared to other axes.

In the example shown in FIG. 16A, one of the tracks may provide the main mechanical support to the majority of the components of the battery pack carrier 912. For example, the lateral track 1662 may support the rest of the components of the battery pack carrier 912. In some embodiments, the lateral track 1662 may be mounted to the bottom of the base station 130, to one or more frames 902, and/or to other rigid structural components of the base station 130. In some embodiments, to further secure the battery pack carrier 912, there can be multiple mounting points for the lateral track 1662. In an embodiment that will be discussed further below in FIG. 20, the lateral track 1662 (and the battery pack carrier 912) may be mounted to the parking plate 905 so that the battery pack carrier 912 suspends from the component-carrying surface 1520 of the parking plate 905.

Figure 16B:
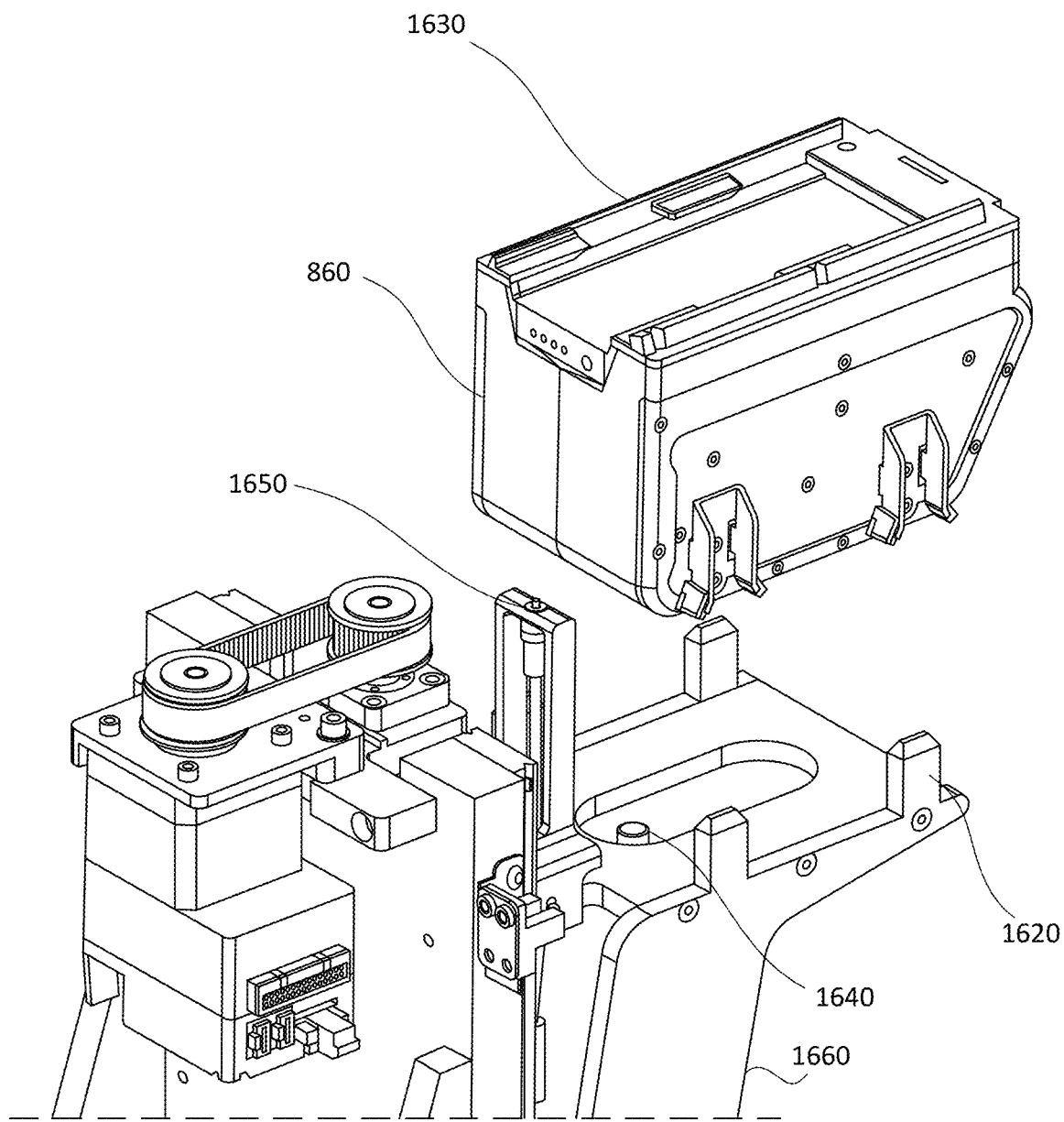
FIG. 16B is a partial and isolated view of a battery pack carrier that is about to carry a battery pack, in accordance with some embodiments.

FIG. 16B is a partial and isolated view of a battery pack carrier 912 that is about to carry a battery pack 860, in accordance with some embodiments. An end effector is mounted on the end of the arm portion 1660 of the battery pack carrier 912 to hold the battery pack 860 during pick up, placement and transfer. The end effector has sensors mounted for battery detection and battery latch detection as discussed further below. In some embodiments, the end effector may include battery latch prongs 1620 which mate and complement with battery latch slots 1630 on the battery pack 860. The four battery latch prongs 1620, two on each side, secure the battery pack 860 on the end effector which the battery pack carrier 912 is moving. Alternatively, or additionally, the battery pack carrier 912 may include a sliding system or a rail system which moves the battery pack 860 to the shutter 940, as well as setting the battery pack 860 into and out of the battery charging site 1510.

To carry a battery pack 860, the battery pack carrier 912 includes a battery detection switch 1640 and a battery lock-latch switch 1650. In some embodiments, the battery detection switch 1640 is a touch switch. In some embodiments, the battery lock-latch switch 1650 is a touch switch. The battery detection switch 1640 detects whether a battery is present on the arm portion 1660. The battery lock-latch switch 1650 confirms that the battery pack 860 is secured and 830 latched to keep the battery pack in place and plugged into the drone. The movements of battery packs 860 are controlled by a computer control system housed in the enclosure 910 of the cabinet 903. The battery pack carrier 912 retrieves a battery pack 860 from a battery charging port 1510 by detecting that the battery is present using the battery present switch 1640, and then securing the battery with the 830 battery lock-latch on the drone.

Figure 17B:
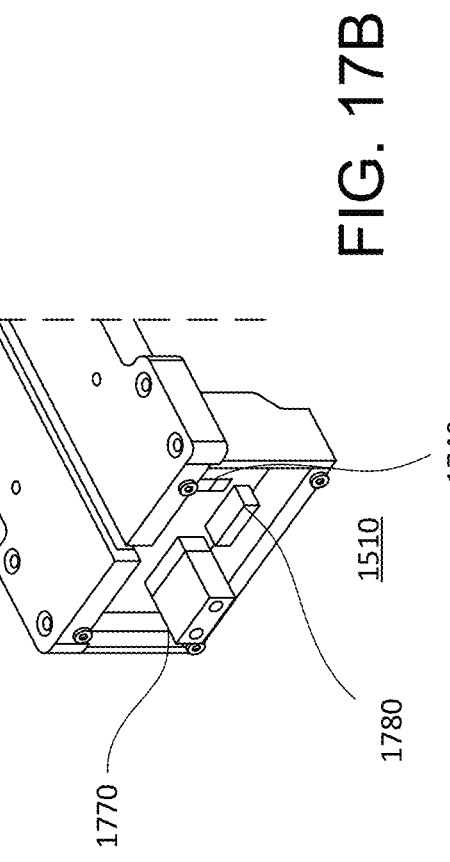
FIGS. 17A, 17B, and 17C show various perspective view of a battery charging site, according to some embodiments.
Figure 17A:
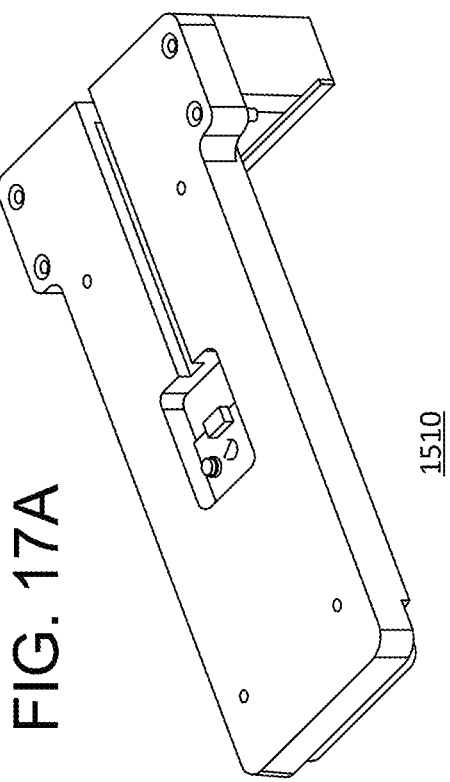
Figure 17C:
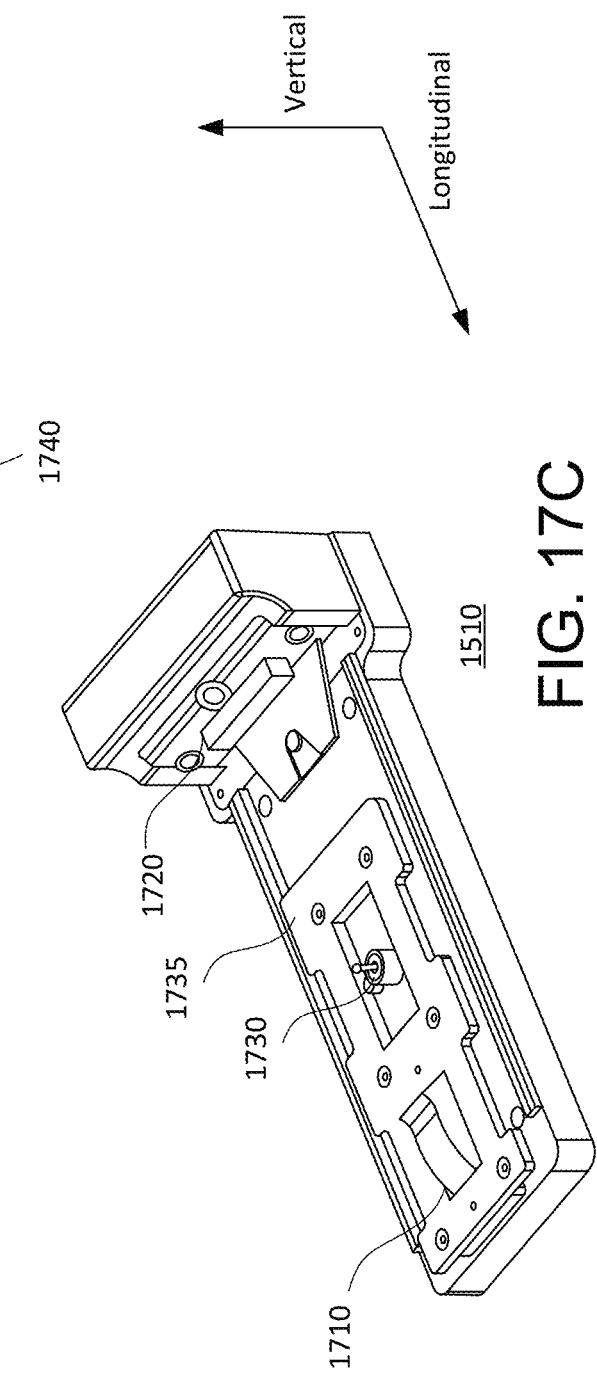

FIGS. 17A, 17B, and 17C show various perspective views of a battery charging port 1510, according to some embodiments. FIG. 17B is a partial back view of the battery charging port 1510 and FIG. 17C is a flipped view of the battery charging port 1510, in accordance with some embodiments. The battery charging port 1510 includes a battery lock-latch 1710, a power port 1720, a touch switch 1730, and a bracket 1735, which may be referred to as a slide guide and has the same structure as the slide guide 820.

The battery lock-latch 1710 and the bracket 1735 may cooperatively hold a battery pack 860 mechanically. For example, the bracket 1735 may be suspended from the surface of the battery charging site 1510, thereby creating a channel (e.g., rail space) for the battery pack 860 to slide in. As such, the bracket 1735 may hold the battery pack 860 in place in the vertical direction. The battery lock-latch 1710 may be configured to mechanically hold a battery pack 860 in place with the battery charging site 1510 in the longitudinal direction. The battery lock-latch 1710 may be a spring-loaded switch to clip the battery pack 860 in place. The extruding portion of the battery lock-latch 1710 mechanically latches to the battery pack 1510. For example, in the embodiment shown in FIG. 17C, the battery lock-latch is a rounded portion which can depress into the battery charging site 1510, and pop up to prevent the battery pack 860 from sliding outward in the longitudinal direction. In some embodiments, the rigid frame of the battery latch switch 1650 (shown in FIG. 16B) may serve as an actuator to depress the battery latch 1710.

The power port 1720 is configured to provide power to the battery pack 860 to charge the battery pack 860. After the battery pack 860 is secured within the battery charging port 1510, the power port 1720, through the battery charging port 1510, provides charging such as an 18-volt charging capacity. Each battery charging site 1510 is configured to provide power to a battery pack 860 being charged.

A battery charging port 1510 includes a battery plug-in touch switch 1740 which provides signals indicating whether the battery is in place and plug-in. The battery charging port 1510 may also include a top-contact sensor 1730 which detects when the battery is in contact with the battery charging port 1510 (note that FIG. 17C is flipped) of the battery charging port 1510, which indicates that the battery pack 860 is ready to be slid into the power port 1720 supported by the bracket 1735 vertically and secured in place by the battery lock-latch 1710.

The power plug connector 1770 and the power monitoring connector 1780 connect the battery charging site 1510 to the electronics and other systems within the enclosure 910 which monitor and run the subsystems of the base station 130.

In some embodiments, each of the battery charging sites 1510 in the base station 130 has an identical or very similar structure as the battery site of the aerial drone 600. The mechanism and structure of how a battery pack 860 is secured to a battery charging site 1510 is the same as the structure and discussion of the battery attachment zone 655 of the aerial drone 600 in FIG. 8A through FIG. 8E.

The battery pack carrier 912 moves a used battery pack 860 from the drone 900 to set the used battery pack 860 into a battery charging site 1510 and in turn remove a newly charged battery pack 860 from another battery charging site 1510. When a battery pack 860 is set into a battery charging site 1510, the battery is moved vertically until the top-contact sensor 1730 is engaged by the contact of the battery pack 860. The battery pack 860 may thus be slid in with the bracket 1735 longitudinally until the battery plugged in sensor 1730 is engaged. At the fully connected position longitudinally, the battery latch 1710 pops back up and holds the battery pack 860 in place. Once the battery pack 860 is both in position and secured, the power port 1720 engages to power and charge the battery pack 860.

A battery pack 860 is removed from the charger through the same actions in reverse. The battery latch 1710 is first depressed and the battery pack 860 is slid away longitudinally from the power port 1720. At an appropriate longitudinal position, the top-contact sensor 1730 may indicate that the battery pack 860 is slid far enough away from the power port 1720 and is at the right position to be detached from the bracket 1735. In turn, the arm portion 1660 moves downward and the 860 is carried away from the battery charging site 1510.

FIGS. 18A and 18B are conceptual side views showing how a battery pack 860 is removed from a drone 900, in accordance with some embodiments. FIGS. 18A and 18B show the battery pack carrier 912 carrying the battery pack 860 in the process of exchanging the battery packs 860. The battery pack carrier 912 is configured to remove a first battery pack 860 from the drone 900 and move the first battery pack 860 to a first battery charging site 1510. The battery pack carrier 912 is configured to carry a second battery pack 860 from a second battery charging site 1510 to the drone 900 and install the second battery pack 860 to the drone 900. FIG. 18A shows the battery pack 860 pushed against the metal rail of the drone 900, making contact with the drone's sensor detecting the presence of the battery pack 860, and is in the motion of sliding the battery pack 860 along the metal rail, to make contact with the drone's battery plugin which detects that the battery pack 860 is plugged in. FIG. 18B shows the battery pack carrier 912 as it carries the battery pack 860 further away from the drone 900, coming through the shutter 940, and towards one of battery charging sites 1510 (not shown in FIG. 18A or 18B).

Figure 19:
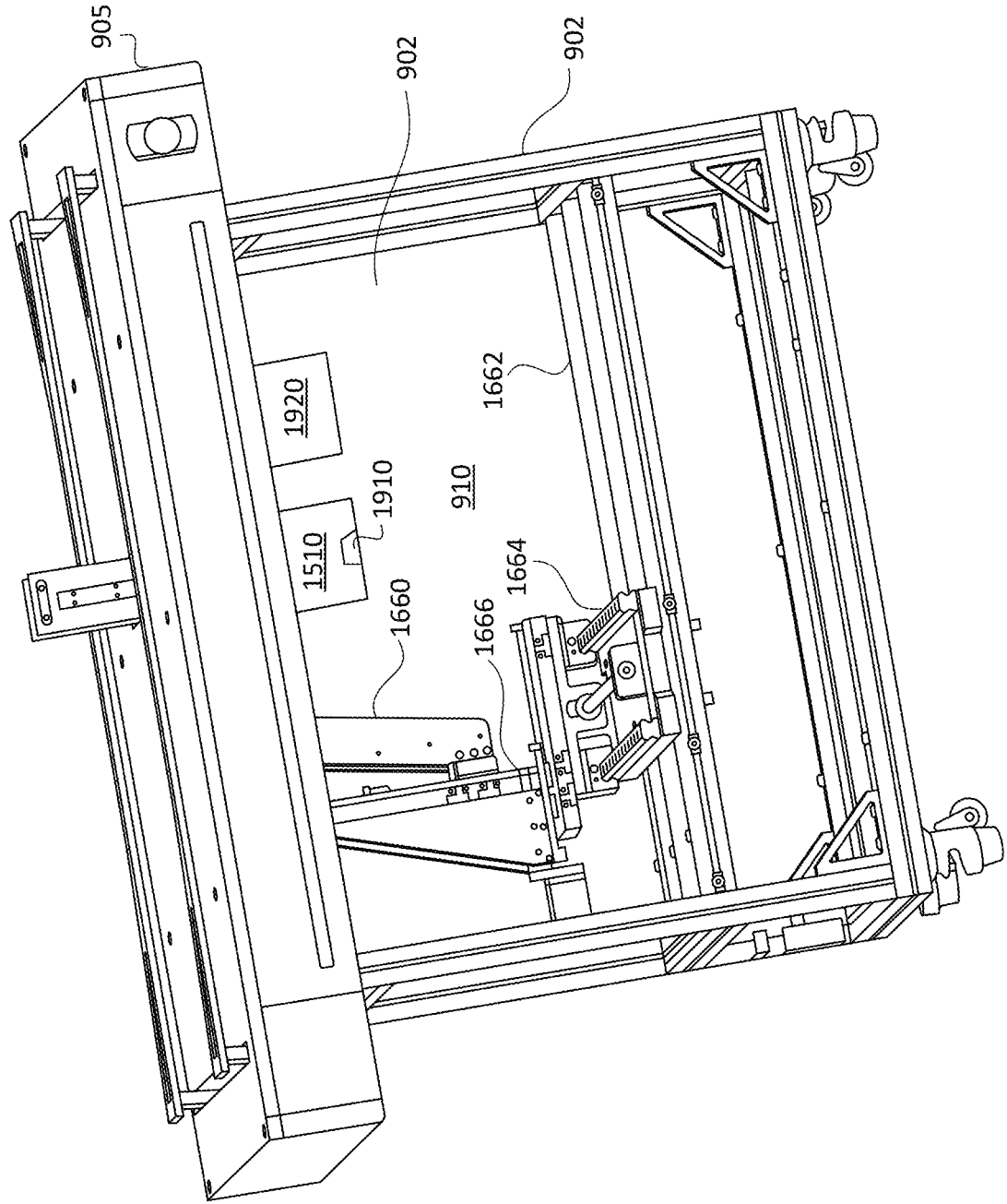
FIG. 19 shows a perspective view of an example way to construct a battery pack carrier, in accordance with some embodiments.

FIG. 19 shows a perspective view of an example way to construct a battery pack carrier 912, in accordance with some embodiments. FIG. 19 shows the frame 902, the parking plate 905, and the battery pack carrier 912 that is mounted to the frame 902, according to some embodiments. The battery pack carrier 912 is movable along three independent axes. The battery pack carrier 912 may be mounted to frame 902. For example, the lateral track 1662 is securely mounted to the frame 902. The lateral track 1662 may carry the longitudinal track 1664 that in turn carries the vertical track 1666, thus allowing three-dimensional movement of the arm portion 1660.

FIG. 19 also illustrates an internal temperature regulation system for the base station 130, in accordance with some embodiments. The base station 130 has a cabinet 903 that includes a parking plate 905 and one or more walls 906 (not shown in FIG. 19) forming an enclosure 910. A plurality of battery charging sites 1510 (chargers) are carried within the enclosure 910. The battery charging site 1510 is configured to provide power to a battery pack being charged at the charger. A temperature sensor 1910 may be carried within the enclosure at a suitable location to measure the temperature with the enclosure 910. The temperature sensor 1910 may be located near the battery charging site 1510 so that the temperature of the battery packs 860 may be measured more accurately. The base station 130 may also include a temperature regulator 1920, a cooling component such as an air mover that takes the form of a fan, a heatsink as a temperature reservoir, a heater for increasing the temperature, or a combination of various temperature regulating components. The temperature regulator 1920 may be configured to regulate the temperature within the enclosure 910 to maintain the temperature of a plurality of battery packs charged at the chargers within a temperature range. For example, the temperature regulator 1920 may be controlled by a processor (which may be located in the base station 130 or at a computer of the storage site) to be switched on and off based on the temperature measured by the temperature sensor 1910.

In some embodiments, the base station 130 may include a computer such as a processor and memory that is used to control and automate various operations discussed in this disclosure. The computer may also download data from the drone 900 to the base station 130. The components of the computers may be further described in FIG. 22 and is not illustrated as being carried in the enclosure 910 in any figures.

FIG. 20 is a side view of an example base station 130 showing a battery pack carrier 912 suspending from a parking plate 905, in accordance with some embodiments. FIG. 20 shows the parking plate 905 includes the top surface which may be referred to as the landing surface 975 and the bottom surface which may be referred to as the component-carrying surface 1520. The lateral track 1662 of the battery pack carrier 912 is mounted from the component-carrying surface 1520 and the rest of the components of the battery pack carrier 912, including the longitudinal track 1664, the vertical track 1666, and the arm portion 1660 are suspended from the lateral track 1662. In this embodiment, the battery charging sites 1510 are also mounted and suspended from the component-carrying surface 1520 of the parking plate 905, but are not shown in this particular figure for the illustration of the battery pack carrier 912. By mounting the battery pack carrier 912 on the same plane as the battery charging site 1510 and the drone alignment components such as the pushers 925 and gripper 935, the design minimizes the opportunities for the force of the battery pack carrier 912 to move or force a component of the base station 130 out of alignment because the components for battery swap and the components for drone alignments are mounted on the same structural component (the parking plate 905). In some situations, the battery pack carrier 912 creates a force by placing the battery pack 860 into drone 900. The force may push the drone or the parking plate 905 and increases the chances of misalignment. By mounting the battery pack carrier 912 on the same parking plate 905 where the drone 900 is parked, when such forces occur, the battery pack carrier 912 remains in alignment with the rest of the components carried by the parking plate 905.

FIG. 21 is a flowchart for a method of swapping the batteries of a drone, in accordance with some embodiments. Other embodiments may include more, fewer, or different steps from those illustrated in FIG. 21, and the steps may be performed in a different order from that illustrated in FIG. 21. These drone alignment and battery sway steps may be performed by the base station 130 automatically. In some embodiments, each of these steps may be performed automatically by a computing system that controls the components of the base station 130 without human intervention.

The drone 900 lands 2110 on the landing surface 975 of parking plate 905. The alignment sensor 945 tracks the movement of the drone 900 as it approaches and lands on the parking plate 905. The pushers 925, glide along track 930, to push and align 2120 the drone 900 towards a reference location 965. The gripper 935 grips the drone 900 and secures 2130 the drone 900 at reference location 965 in a designated position and ensuring a constant flow of power during the battery swap through the detection ports 1224. The shutter 940 opens 2140, providing the battery pack carrier 912 access to the drone 900. The battery pack carrier 912 moves to latch to the battery pack 860, retrieve 2150 the battery pack 860 from the drone 900, transfer 2160 the battery pack 860 to an open battery charging site 1510, retrieve 2170 a charged battery pack 860 from another battery charging site 1510, and place 2180 the new charged battery pack 860 in the drone 900. The battery pack carrier 912 moves back into the enclosure 910. The shutter 940 closes and the gripper 935 releases.

Computing Machine Architecture

Figure 22:
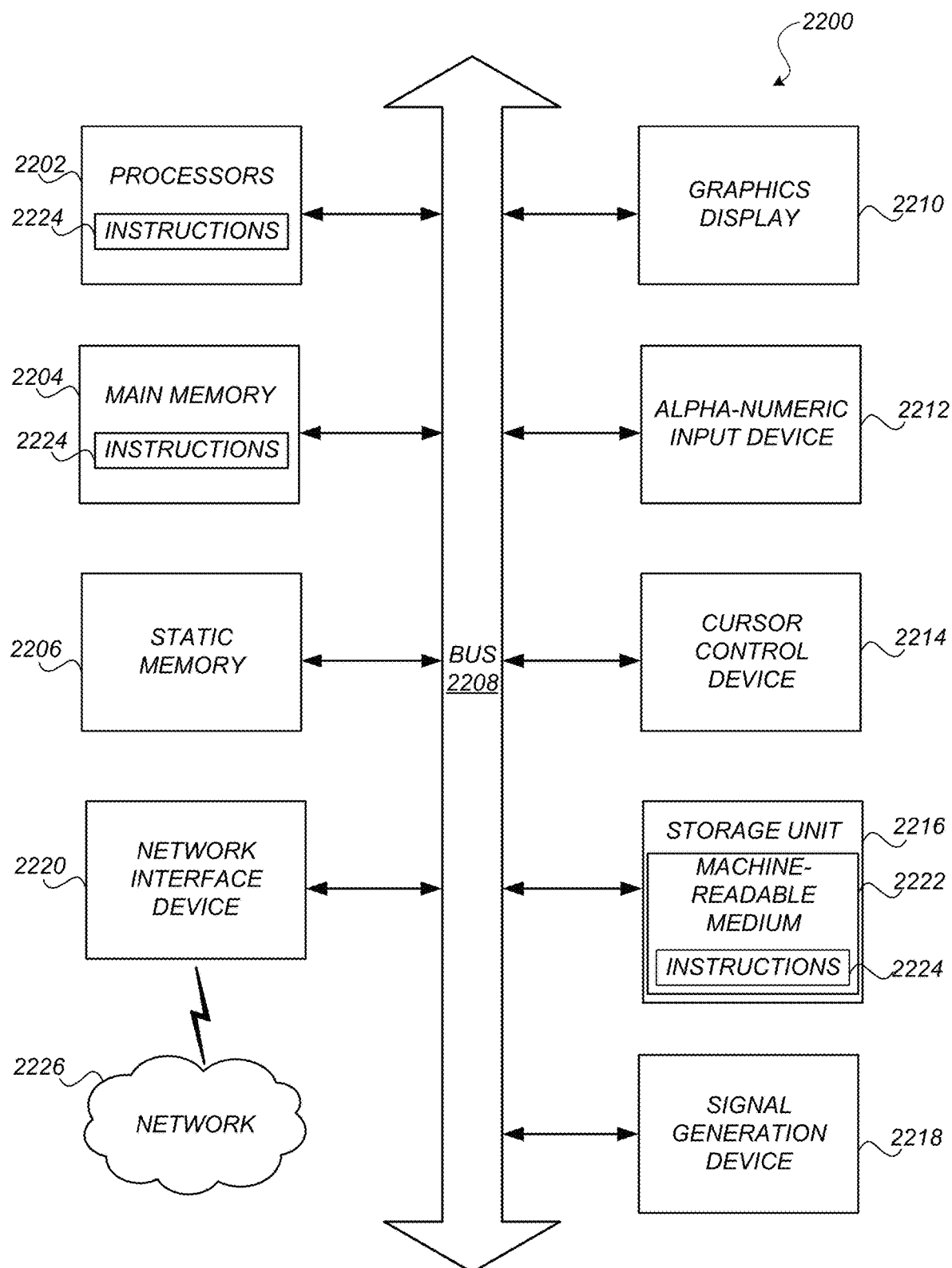
FIG. 22 is a block diagram illustrating components of an example computing machine, in accordance with some embodiments.

FIG. 22 is a block diagram illustrating components of an example computing machine that is capable of reading instructions from a computer-readable medium and execute them in a processor (or controller). A computer described herein may include a single computing machine shown in FIG. 22, a virtual machine, a distributed computing system that includes multiples nodes of computing machines shown in FIG. 22, or any other suitable arrangement of computing devices.

By way of example, FIG. 22 shows a diagrammatic representation of a computing machine in the example form of a computer system 2200 within which instructions 2224 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a network deployment, the machine may operate in the capacity of a server machine or a client machine in a server-client network environment, or as a peer machine in a peer-to-peer (or distributed) network environment.

The structure of a computing machine described in FIG. 22 may correspond to any software, hardware, or combined components shown in FIG. 1, including but not limited to, the inventory management system 140, the computing server 150, the data store 160, the user device 170, and various engines, modules, interfaces, terminals, and machines. While FIG. 22 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 2224 that specify actions to be taken by that machine. Further, while only a single machine is illustrated, the term "machine" shall also be taken to include any collection of machines that individually or jointly execute instructions 2224 to perform any one or more of the methodologies discussed herein.

The example computer system 2200 includes one or more processors (generally, processor 2202) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 2204, and a non-volatile memory 2206, which are configured to communicate with each other via a bus 2208. The computer system 2200 may further include graphics display unit 2210 (e.g., a plasma display panel (PDP), a liquid crystal display (LCD), a projector, or a cathode ray tube (CRT)). The computer system 2200 may also include alphanumeric input device 2212 (e.g., a keyboard), a cursor control device 2214 (e.g., a mouse, a trackball, a joystick, a motion sensor, or other pointing instrument), a storage unit 2216, a signal generation device 2218 (e.g., a speaker), and a network interface device 2220, which also are configured to communicate via the bus 2208.

The storage unit 2216 includes a computer-readable medium 2222 on which is stored instructions 2224 embodying any one or more of the methodologies or functions described herein. The instructions 2224 may also reside, completely or at least partially, within the main memory 2204 or within the processor 2202 (e.g., within a processor's cache memory) during execution thereof by the computer system 2200, the main memory 2204 and the processor 2202 also constituting computer-readable media. The instructions 2224 may be transmitted or received over a network 2226 via the network interface device 2220.

While computer-readable medium 2222 is shown in an example embodiment to be a single medium, the term "computer-readable medium" should be taken to include a single medium or multiple media (e.g., a centralized or distributed database, or associated caches and servers) able to store instructions (e.g., instructions 2224). The computer-readable medium may include any medium that is capable of storing instructions (e.g., instructions 2224) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

ADDITIONAL CONFIGURATION CONSIDERATIONS

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or temporarily configured circuitry (e.g., configured by software) may be driven by cost and time considerations.

The various operations of example methods described herein may be performed, at least partially, by one or more processors, e.g., processor 2202, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The features, embodiments, and variations illustrated in different figures, such as FIG. 1 through FIG. 22, may be combined to generate a specific embodiment, even without an explicit statement of combination of those features in this disclosure.

What is claimed is:

1. A base station for receiving a drone comprising a body and a plurality of legs, the base station comprising:
    a parking plate on which the drone is to be landed;
    a plurality of pushers slidable on the parking plate, the plurality of pushers configured to move from an expanded configuration to a contracted configuration to be physically in contact with the legs and mechanically push the legs of the drone to move the drone towards a reference location on the parking plate;
    a gripper carried by the parking plate, the gripper configured to removably secure the body of the drone in place relative to the reference location; and
    an alignment sensor carried by the parking plate and positioned at the reference location, the alignment sensor configured to detect whether a marker on the drone is in alignment with the reference location.

2. The base station of claim 1, wherein the gripper comprises two flaps, and each flap is configured to pivot from the parking plate to an erected position.

3. The base station of claim 1, wherein the gripper comprises a drone grip slot that is complementary with a tab protruding from the drone.

4. The base station of claim 1, wherein the marker on the drone is a QR code or another pattern configured to stand out as the marker.

5. The base station of claim 1, wherein the marker on the drone is an identifiable component of the drone.

6. The base station of claim 1, wherein each of the plurality of pushers have a plurality of leg notches that are configured to receive legs of the drone.

7. The base station of claim 1, wherein the plurality of pushers are configured to move along a set of tracks.

8. The base station of claim 1, wherein at least one of the pushers is an elongated bumper that comprises a tilted region, an orthogonal region, and a leg notch between the tilted region and the orthogonal region.

9. The base station of claim 1, further comprising a battery pack carrier configured to replace a battery pack carried by the drone.

10. The base station of claim 1, wherein the plurality of pushers are moveable between an expanded configuration and a contracted configuration that moves the drone towards the reference location.

11. The base station of claim 1, wherein parking plate forms a ceiling of a bottom compartment of the base station.

12. The base station of claim 11, wherein the bottom compartment carries one or more battery charging sites and a battery pack carrier.

13. The base station of claim 12, wherein the bottom compartment further carries a temperature regulator that is configured to regulate a temperature range of the bottom compartment.

14. The base station of claim 1, wherein the gripper comprises a detection port that is configured to detect whether the drone is secured with the gripper.

15. The base station of claim 14, wherein the detection port further comprises data transmission pins configured to download data from the drone to the base station.

16. The base station of claim 1, wherein the gripper is configured to secure the body of the drone subsequent to the alignment sensor detecting the marker on the drone being in alignment with the reference position.

17. A method for receiving a drone at a base station, the drone comprising a body and a plurality of legs, the method comprising:
    receiving the drone on a parking plate of the base station;
    pushing a plurality of pushers that are slidable on the parking plate from an expanded configuration to a contracted configuration to be physically in contact with the legs and mechanically push the legs of the drone to move the drone towards a reference location on the parking plate;
    using an alignment sensor to detect whether a marker on the drone is in alignment with the reference location, the alignment sensor carried by the parking plate and positioned at the reference location; and
    securing, using a gripper carried on the parking plate, the body of the drone in place relative to the reference location.

18. The method of claim 17, wherein securing, using the gripper, the body of the drone comprises pivoting from a flat configuration to an erected configuration.

19. The method of claim 17, further comprising swapping a battery pack of the drone after the drone is secured by the gripper.

20. The method of claim 17, wherein the gripper comprises a detection port that is configured to detect whether the drone is secured with the gripper and the detection port further comprises data transmission pins configured to download data from the drone to the base station.

* * * * *